(12) United States Patent
Yamaguchi

(10) Patent No.: US 6,519,471 B1
(45) Date of Patent: Feb. 11, 2003

(54) PORTABLE ELECTRONIC MAIL APPARATUS AND STORAGE MEDIUM STORING ELECTRONIC MAIL PROGRAM

(75) Inventor: Yoshito Yamaguchi, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/367,289

(22) PCT Filed: Dec. 25, 1998

(86) PCT No.: PCT/JP98/05911
§ 371 (c)(1),
(2), (4) Date: Aug. 17, 1999

(87) PCT Pub. No.: WO99/34312
PCT Pub. Date: Jul. 8, 1999

(30) Foreign Application Priority Data

Dec. 27, 1997 (JP) .............................................. 9-368334

(51) Int. Cl.⁷ ................................................ H04Q 7/20
(52) U.S. Cl. ........................ 455/517; 455/412; 455/414; 709/200; 709/203
(58) Field of Search .................... 455/412, 403, 455/413, 414, 458, 459, 514, 575, 466, 39, 500, 517; 379/88.25, 88.26, 100.08, 93.24; 709/206, 207, 225, 244, 229, 202, 219, 231, 200, 201, 203, 217, 218; 340/7.51, 7.52, 7.55, 7.24

(56) References Cited

U.S. PATENT DOCUMENTS

| | | | |
|---|---|---|---|
| 5,487,100 A | | 1/1996 | Kane |
| 5,754,778 A | * | 5/1998 | Shoujima .................... 709/206 |
| 6,035,104 A | * | 3/2000 | Zahariev ................. 379/100.08 |
| 6,247,076 B1 | * | 6/2001 | Ono ............................ 709/206 |
| 6,334,140 B1 | * | 12/2001 | Kawamata ................... 707/500 |

FOREIGN PATENT DOCUMENTS

| | | |
|---|---|---|
| EP | 0 704 827 | 4/1996 |
| EP | 0 772 327 | 5/1997 |
| JP | 59-20557 | 2/1984 |
| JP | 2-86420 | 3/1990 |
| JP | 5-225084 | 9/1993 |
| JP | 6-342409 | 12/1994 |
| JP | 6-350642 | 12/1994 |
| JP | 8-163269 | 6/1996 |
| WO | WO 98/00787 | 1/1998 |

OTHER PUBLICATIONS

H. Bogeholz; "Ungebunden—Mit Organizer und Handy unterwegs"; vol. 1, Jan. 1997, pp. 186–191.

J. Miller et al; "Accessing Messages Your Way"; 1995; pp. 6–9; vol. 10, No. 1.

* cited by examiner

Primary Examiner—Nay Maung
Assistant Examiner—Jean A Gelin
(74) Attorney, Agent, or Firm—Frishauf, Holtz, Goodman & Chick, P.C.

(57) ABSTRACT

In a portable electronic mail apparatus which receives and transmits electronic mails, it is determined, if a mail is received, whether the RAM which is to store a received mail has an empty capacity to store the received mail, a volume of the received mail is equal to or smaller than a predetermined volume, a mail address of a transmitter is a predetermined address, or a predetermined word is included in the mail and according to a result of the determination, the received mail is stored in the RAM, or a part of the mail is stored in the RAM and the received mail is transmitted to a predetermined destination.

9 Claims, 51 Drawing Sheets

RECEIVED MAIL LIST IMAGE

| ◎ | SATO ICHIRO | RE:THE CONFERENCE ON 2/26 | 97/01/30 10:30 |
|---|---|---|---|
| ◎ | TANAKA TARO | MEETING | 97/01/27  9:00 |
|   | SUZUKI YOSHIO | ALUMNI REUNION | 97/01/25 15:00 |
|   | FURUKAYA MAKOTO | CONGRATULATION | 97/01/12 17:00 |
|   |  |  |  |
|   | INAMOTO MASAO | HOW DO YOU DO ? | 97/01/03  9:00 |

FIG.50

WINDOW "A"

| UNSEAL | MAIL CREATION | RECEPTION | DELETION | TERMINATION |

FIG.51

UNSEAL IMAGE

FROM: Sato Ichiro

TO: Yamaguchi Yoshito

SUBJECT: RE:THE CONFERENCE ON 2/26

A CONFERENCE IS TO BE HELD ACCORDING TO THE DETAILS DESCRIBED BELOW. PLEASE ATTEND THE CONFERENCE.

NOTE
DATE/TIME    MARCH 1ST (SATURDAY) AM 10:00 TO 12:00
PLACE        1ST CONFERENCE ROOM
AGENDA       PROGRESS REPORT ON THEME "○○"
PERSONS TO BE ATTENDED   ○○○   ○○○   ○○○

WINDOW "E"

| DELETION | TERMINATION |

MAIL CREATION IMAGE

FROM    Yamaguchi Yoshito

TO

SUBJECT

FIG.54
WINDOW "F"
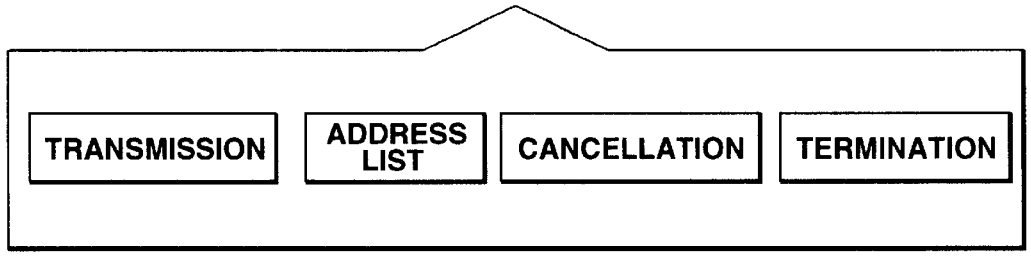
FIG.55
TRANSMISSION MAIL LIST IMAGE
| | | | |
|---|---|---|---|
| △ | Suzuki Yoshio | ATTEND ALUMNI REUNION | |
| △ | Sato Ichiro | 2/26 | |
| | Furuya Makoto | YOU'RE WELCOME | 97/01/13  8:00 |
| | Inamoto Masao | THANK YOU | 97/01/10 12:00 |
| | | | |
FIG.56
WINDOW "B"
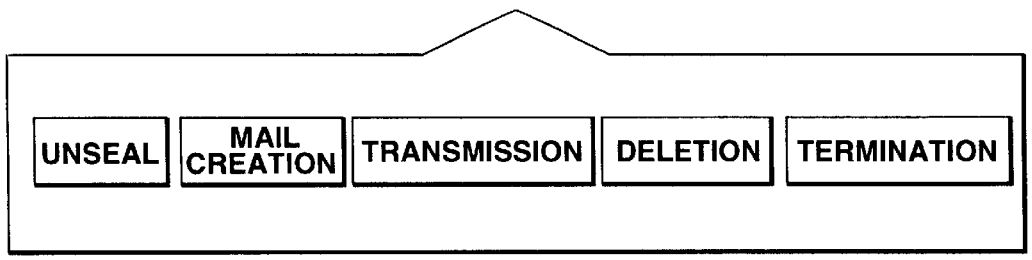

ADDRESS LIST IMAGE

| Sato Ichiro | i-sato |
|---|---|
| Tanaka Taro | t-tanaka |
| Yamada Juro | j-yamada |
| Furukawa Yasuo | y-furukawa |
|  |  |
| Suzuki Yoshiko | y-suzuki |

WINDOW "C"

NEW ADDRESS INPUT IMAGE

NAME

MAIL ADDRESS

WINDOW "D"

FIG.61

DETAILED DISPLAY

NAME

Sato Ichiro

MAIL ADDRESS i-sato@ ....

FIG.62

SETTING SELECTION DISPLAY

ADDRESS SETTING

PASSWORD SETTING

PASSWORD DISPLAY LIST IMAGE

ADDRESS SELECTION DISPLAY

PORTABLE ELECTRONIC MAIL APPARATUS AND STORAGE MEDIUM STORING ELECTRONIC MAIL PROGRAM

TECHNICAL FIELD

The present invention relates to a portable electronic mail apparatus which is used for transmission/reception of an electronic mail while being mainly carried by a user and a storage medium storing a program for the portable electronic mail apparatus.

BACKGROUND ART

Transmission/reception of an electronic mail, heretofore, have been performed by use of a desktop device such as a personal computer or a device inconvenient for movement between places. By progress in the semiconductor technology, however, there has been, in recent years, on the market a small-sized portable information terminal (hereinafter referred to as a portable terminal), of an electronic notepad size, which is provided with an electronic mail function which transmission/reception of an electronic mail can be performed. The portable terminal contains a communication capability or is adaptable for connection to a communication device such as a cordless telephone and the like. Therefore, by purchasing a portable terminal, a user can perform transmission/reception of an electronic mail in a variety of places.

A conventional portable terminal (portable electronic mail apparatus) provided with the above described electronic mail function, however, has the following problems.

A device of this kind having features of a small size and lightweight is naturally requested from a viewpoint of user's portable use. This request for the features causes a problem that a memory capacity is limited to a certain value, which in turn entails a small capacity, allotted to storage of an electronic mail.

If a memory capacity for an electronic mail is small, electronic mails cannot be stored in a very large number. Hence there arises a need that each time when an electronic mail comes to be unnecessary, the mail has to be erased in order to store an electronic mail which arrives next time. For this reason, the problem has come to the surface in the form of reduction in operability and convenience.

In the mean time, a portable terminal (portable electronic mail apparatus) has an advantage that a user can perform transmission/reception of an electronic mail in any place where the user wishes to, whereas this advantage works in an inverse way in cases. Hereinafter, this will be explained.

The user must pay attention of place when he or she reads the mail. For example, when a user who serves in a sales activity stays in an "A" company office who is one of the customers and the user retrieves and read an electronic mail sent from a "B" company who is a competitor to the "A" company or when a user wishes to retrieve and read a private electronic mail in the working time in office. In any of the above cases, it is undesirable that a received electronic mail is read by others.

A portable terminal has an especially high degree of danger to get lost since the terminal is used being carried by a user, which is another problem. If a portable terminal gets lost, there arise cases where a received mail cannot be read not only immediately after received, but forever according to circumstances. Especially when an important electronic mail has been sent, a damage to be caused by the loss can be immeasurably large.

There exists a danger as described above in a portable terminal. To avoid such a danger has been desired as well.

DISCLOSURE OF INVENTION

Accordingly, it is an object of the present invention to provide an electronic mail apparatus which has improved operability and degree of convenience.

According to a first aspect of the present invention, there can be provided a portable electronic mail apparatus comprising:

receiving means for receiving an electronic mail;

specific mail detecting means for detecting whether or not an electronic mail received by the receiving means is a specific mail which meets a specific condition;

transmitting means for transmitting an electronic mail received by the receiving means; and control means for controlling the transmitting means to transmit the specific mail to a predetermined destination.

With the first aspect, an electronic mail which is detected as the specific mail among received electronic mails is transmitted to a predetermined destination (an address to be transmitted or to be transferred) which is preset. Thereby, there can be read a mail, which has been transmitted to a mail address at another mail address.

According to a second aspect of the present invention, there can be provide a portable electronic mail apparatus comprising:

receiving means for receiving an electronic mail;

storage means for storing an electronic mail received by the receiving means;

specific mail detecting means for detecting whether or not an electronic mail received by the receiving means is a specific mail which meets a specific condition;

transmitting means for transmitting an electronic mail received by the receiving means; and control means for controlling the transmitting means to transmit an electronic mail which has been detected as the specific mail by the specific mail detecting means to a predetermined destination, while controlling the storage means to store an electronic mail which has not been detected as the specific mail by the specific mail detecting means.

With the second aspect, an electronic mail, which is not detected as a specific mail among received electronic mails, is stored. Thereby, there can be read an electronic mail, which is not detected as the specific mail.

According to a third aspect of the present invention, there can be provided a portable terminal, which comprises:

receiving means for receiving an electronic mail;

storage means for storing an electronic mail received by the receiving means;

specific mail detecting means for detecting whether or not an electronic received by the receiving means is a specific mail which meets a specific condition;

transmitting means for transmitting an electronic mail received by the receiving means; and control means for controlling the storage means to store only part of an electronic mail which has been detected as the specific mail by the specific mail detecting means, controlling the transmitting means to transmit the electronic mail to a predetermined destination, and controlling the storage means to store an electronic mail which has not been detected as the specific mail by the specific mail detecting means.

With the third aspect, there is left behind part of a received mail detected as the specific mail among received electronic mails while the received mail is transmitted to a predetermined destination (transfer address). Thereby, it can be at least recognized whether or not a mail detected as the specific mail has been received.

According to a fourth aspect of the present invention, there can be provided a storage medium storing a computer-readable program, the program comprising:

reception processing program code for receiving an electronic mail;

detection processing program code for detecting whether or not an electronic mail received by the reception processing program code is a specific mail which meets a specific condition:

transmission processing program code for transmitting an electronic mail received by the reception processing program code; and control processing program code for controlling an electronic mail detected as the specific mail by the detection processing program code to be transmitted by the transmission processing program code to a predetermined destination.

With the fourth aspect, an electronic mail, which has been detected as the specific mail among received electronic mails, is transmitted to a predetermined destination (transfer address). Thereby, there can be read an electronic mail, which has been transmitted to an mail address at other mail addresses.

According to a fifth aspect of the present invention, there can be provided a storage medium storing a computer-readable program, the program comprising:

reception processing program code for receiving an electronic mail;

storage processing program code for storing an electronic mail received by the reception processing program code in a memory;

detection processing program code for detecting whether or not an electronic mail received by the reception processing program code is a specific mail which meets a specific condition;

transmission processing program code for transmitting an electronic mail received by the reception processing program code; and control processing program code for controlling an electronic mail which has been detected as a specific mail by the detection processing program code to be transmitted by the transmission processing program code to a predetermined destination and controlling an electronic mail which has been detected as a non-specific mail by the detection processing program code to be stored by the storage processing program code in the memory.

With the fifth aspect, an electronic mail, which has not been detected as a specific mail among received mails, is stored. Thereby, there can be read an electronic mail, which is not detected as the specific mail.

According to a sixth aspect of the present invention, there can be provided a storage medium storing a computer-readable program, the program comprising:

reception processing program code for receiving an electronic mail;

storage processing program code for storing an electronic mail received by the reception processing program code in a memory;

detection processing program code for detecting whether or not an electronic mail received by the reception processing program code is a specific mail which meets a specific condition;

transmission processing program code for transmitting an electronic mail received by the reception processing program code; and control processing program code for controlling only part of an electronic mail which has been detected as the specific mail by the detection processing program code to be stored by the storage processing program code in the memory, controlling the electronic mail to be transmitted by the transmission processing program code to a predetermined destination, and controlling an electronic mail which has not been detected as the specific mail by the detection processing program code to be stored by the storage processing program code in the memory.

With the sixth aspect, there is left behind part of a received mail detected as the specific mail among received electronic mails while the received mail is transmitted to a transmitted side (transfer address). Thereby, it can be at least recognized whether or not there has been received a mail detected as a specific mail.

BRIEF DESCRIPTION OF DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 50 is a representation showing an example of a window "A";

FIG. 51 is a representation showing an example of display at the time of unseal processing;

FIG. 54 is a representation showing an example of a window "F";

FIG. 55 is a representation showing an example of transmitted mail list image;

FIG. 56 is a representation showing an example of a window "B";

FIG. 61 is a representation showing an example of a detailed display image;

FIG. 62 is a representation showing an example of a setting selection display image;

BEST MODE OF CARRYING OUT THE INVENTION

A preferred embodiment of an electronic mail apparatus according to the present invention will now be described with reference to the accompanying drawings.

Figure 1:
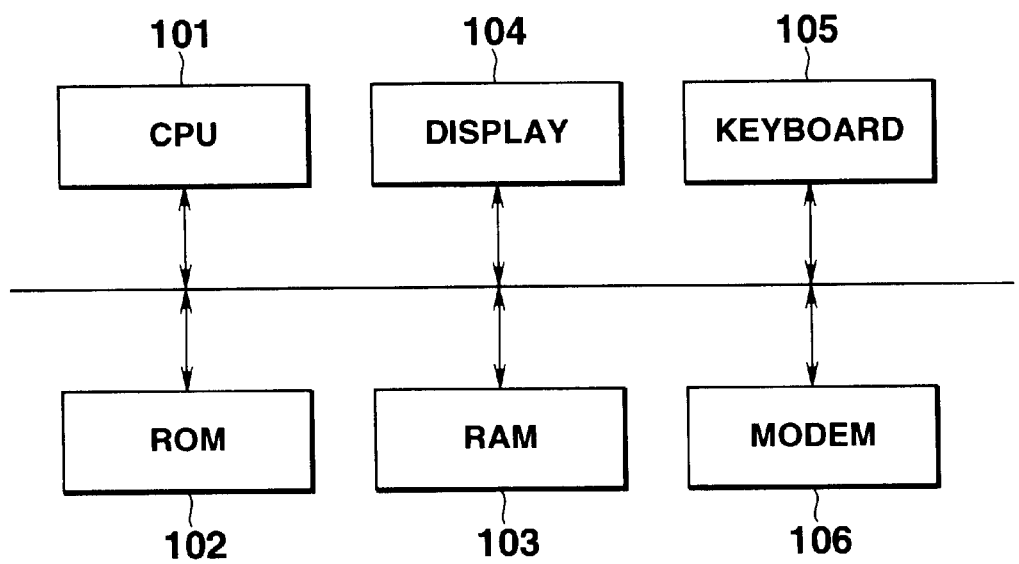
FIG. 1 is a block diagram showing a structure of a portable electronic mail apparatus according to an embodiment of the present invention.

FIG. 1 is a block diagram showing a structure of a portable electronic mail apparatus (hereinafter abbreviated as electronic mail apparatus) of an embodiment according to the present invention.

An electronic mail apparatus, as shown in FIG. 1, comprises CPU 101 which control an entire device thereof, ROM 102 storing a program to be executed by the CPU 101, various kinds of control data and image data for displaying an image, RAM 103 which is used as a working area for CPU 101 storing an electronic mail and the like, a display section 104 for displaying various kinds of information and an image, and a modem 106 which performs transmission/reception of data through a telephone line and a telephone network, both not shown.

Figure 2:
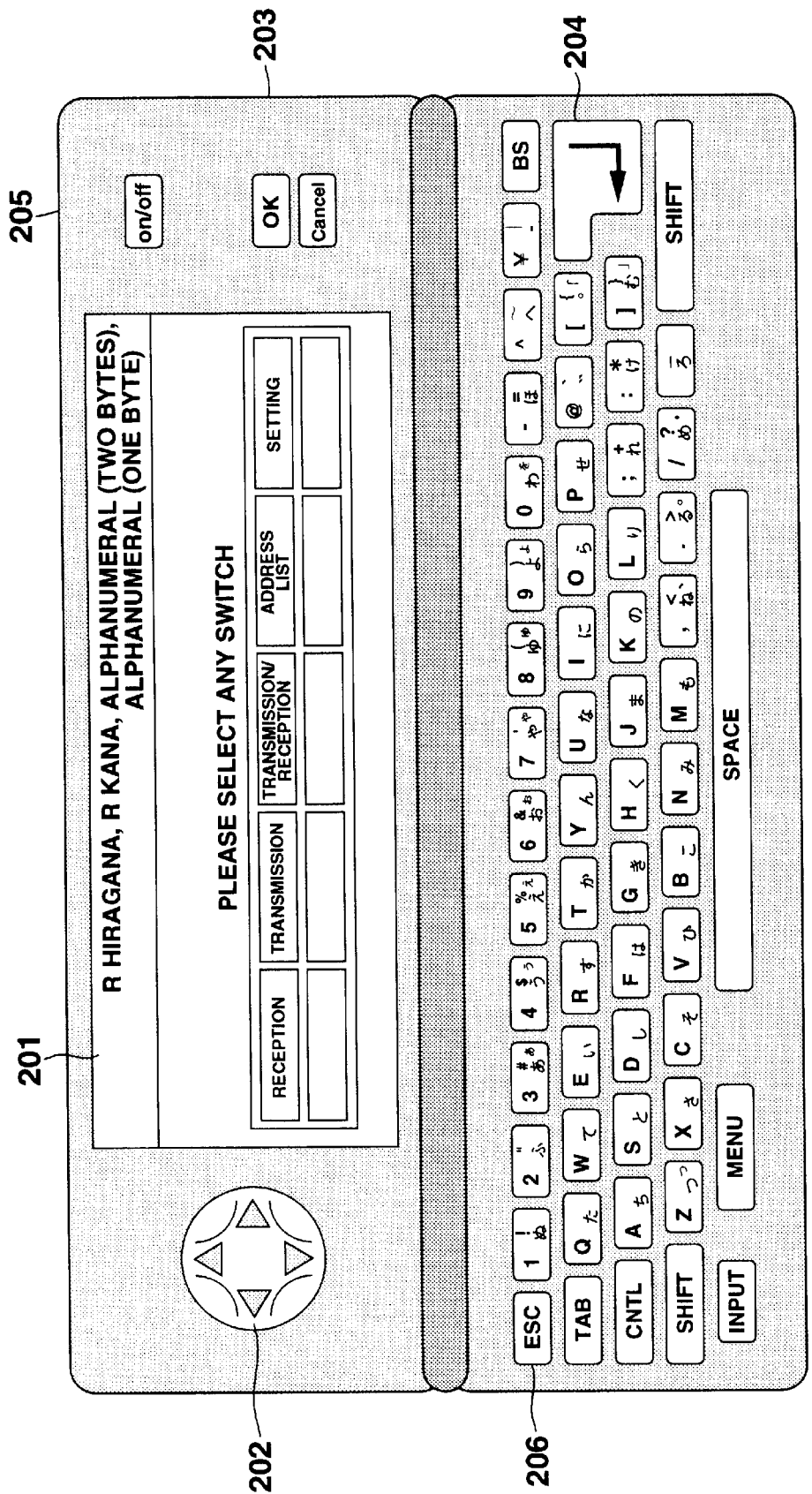
FIG. 2 is a view showing an outer appearance of the portable electronic mail apparatus according to the embodiment.

FIG. 2 is a view showing an outer appearance of an electronic mail apparatus.

The electronic mail-apparatus, as shown in FIG. 2, is a device which can be folded with an screen 201 inside. The electronic mail apparatus is, on the screen 201 side, provided with a cursor switch 202 for moving a cursor displayed on the screen 201, an OK switch 203 for displaying a window in which there are disposed various kinds of icons, a power switch 205 for performing ON/OFF of the power source and the like. On the other side which is opposed to the screen 201 when the electronic mail apparatus is fully folded, there are provided various kinds of switches mainly used for character input. Among them, an enter switch 204 is to determine selection of an icon in a window, an ESC switch 206 is to terminate an operation now going. These switches are those which are constituents of a keyboard 105. A terminal, which is not shown, for connecting a telephone line to the modem 106 is disposed on the side face of the body.

Operation will be described in the above structure.

If a user operates the power switch 205 to turn on the power source, the CPU 101 reads and executes a program stored in the ROM 102 to start control of the entire device. The control is performed in response to operation performed by the user on the keyboard 105 and reception of an electronic mail by the modem 106 while the RAM 103 is used as a working area.

With the power source in the state of ON, the CPU 101 displays a working image shown in FIG. 2 on the screen 201. The display is performed by procedures that, for example, the CPU 101 reads image data stored in the ROM 102 and writes the data in a memory in the display section 103, or, after the reading the image data, processes the image data to create a second image data and then writes the second image data in the memory. Other images are displayed in the same way as these procedures.

The working image displayed at the time is a mode selection image and on the image, there are disposed a plurality of icons which are used for designating an operation content. Only one of the plurality of icons is different from the others in the display state, which is a now selected icon. The icon is changed according to operation on the cursor switch 202 and when the Enter key 204 is operated, there is selected a function of an icon which assumes a different display state from others. After a user operates the cursor switch 202 as needed, the user further operates the OK switch 203 to thereby select a desired operation content and start the operation.

After the start of the operation as in the above described way, the CPU 101 performs, according to operation conducted on the keyboard 105, switch of display images in comply with operational procedures respectively defined for operation contents, display of characters (here, which means all that can be input from the keyboard 105) input through the keyboard 105 by the user, in addition transmission of an electronic mail and the like. A received (downloaded) electronic mail through the modem 106 is stored in the RAM 103 or transmitted (transferred) to a designated transmitted side.

Among the icons, which are disposed on the mode selection image, there are "reception record" icon, "transmission record" icon, "transmission/reception" icon, address list icon, "setting" icon and the like. If a user wishes to read a received electronic mail, the user selects the "reception record" icon. If a user wishes to read transmitted electronic mail in the past, the user selects the "transmission record" icon. If a user wishes to read the registered addresses, the user selects the address list icon. If a user wishes to transmission of a non-transmitted mail and reception of a mail together, the user selects the "transmission/reception" icon. If a user wishes to set what mail should be transmitted among received mails, the user selects the "setting" icon.

Figure 3:
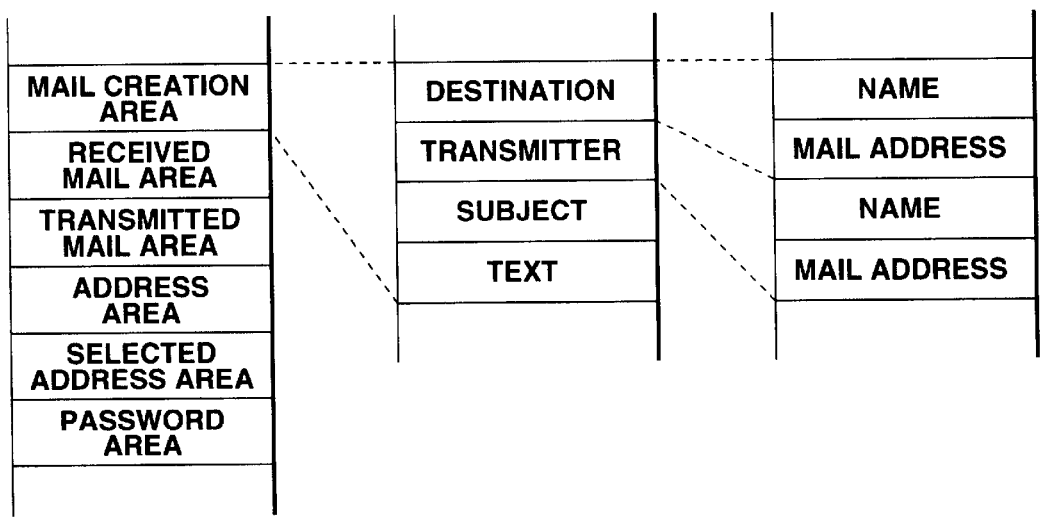
FIG. 3 is a representation showing a data structure of electronic mail related data stored in RAM.

In order to enable operations which are respectively assigned to the icons to be performed, the CPU 101 stores electronic mail related data in the ROM 103 in such a manner as shown in FIG. 3. In areas of the ROM 103, data described below are stored.

A mail creation area is an area which is used in the cases where an electronic mail is newly created, a received mail and the like is temporarily stored and to be detailed, storing data of a receiver, a transmitter, a subject, a text and the like. Data of each of the receiver and the transmitter include a name, a mail address and the like.

Figure 4:
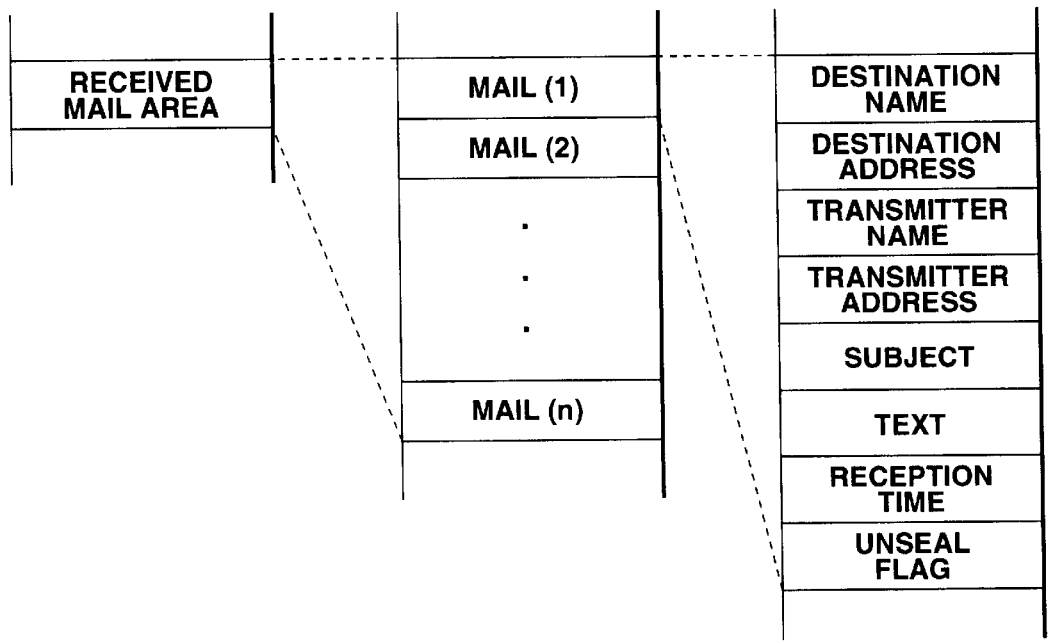
FIG. 4 is a representation showing a data structure of data stored in a received mail area.

A received mail area is an area storing mails received (downloaded) in the past by the electronic mail apparatus and electronic mails are separately stored as individual mails each as a mail unit as shown in FIG. 4. Each of data of electronic mails MAIL(n) (n is an integer) include the data stored in the mail creation area, and a reception time and an unseal flag as control data which are attribute of the data. The reception time is data, which shows a time when a server, not shown, receives a mail. The "n" is a value which is sequentially assigned in the chronological order of reception time with "1" as an initial value. The unseal flag is to indicates whether or not a user has read an electronic mail attached with the flag, that is whether or not the electronic mail has been unsealed. As a value for the flag, if an electronic mail has not been unsealed, "0" is stored in the flag and if an electronic mail has been unsealed, "1" is stored in the flag.

A transmitted mail area is an area storing electronic mails, which were transmitted in the past by the electronic mail apparatus. The transmitted electronic mails are separately stored as individual mails as shown in FIG. 4. Data MAIL(n) (n is an integer) of each electronic mail includes data stored in the mail creation area, and a transmission time and a transmitted flag as control data added thereto. The transmission time is data showing a time when an electronic mail attached with the flag was transmitted. The "n" is a value which is sequentially attached in the chronological order of transmission time or time to try to transmit with "1" as an initial value. The transmitted flag is data to indicate whether or not an electronic mail attached with the flag has actually been transmitted. As a value of the flag, if the electronic mail has been transmitted, "1" is stored in the flag and if not, "0" is stored in the flag.

Data in mails each as a unit stored in the received mail area and the transmitted mail area are, hereinafter, expressed for convenience such that for the case where an expression is used in the sense of one mail, the expression assumes the form using parentheses like data MAIL(n) and for the other cases, the expression assumes the form like data mail.

Figure 6:
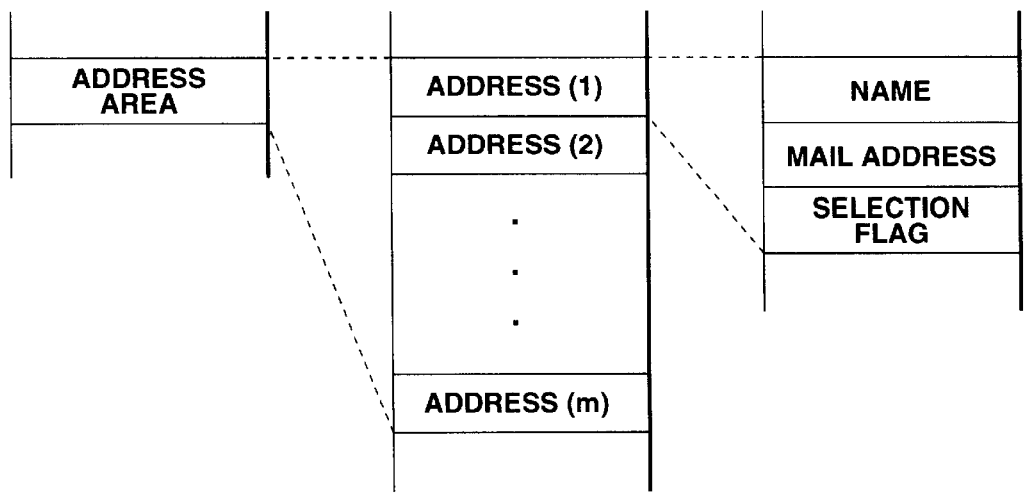
FIG. 6 is a representation showing a data structure of data stored in an address area.

An address area, as shown in FIG. 6, is an area storing data, which a user inputs for each mail address as a unit. One unit data include name, a mail address and a selection flag. The selection flag is a flag which indicates whether or not a user selects to transfer (transmit) a mail which has been sent from a mail address attached with the flag to another mail address. If selected to be transferred, "1" is stored in the flag and if not selected to be transferred, "0" is stored in the flag.

Figure 7:
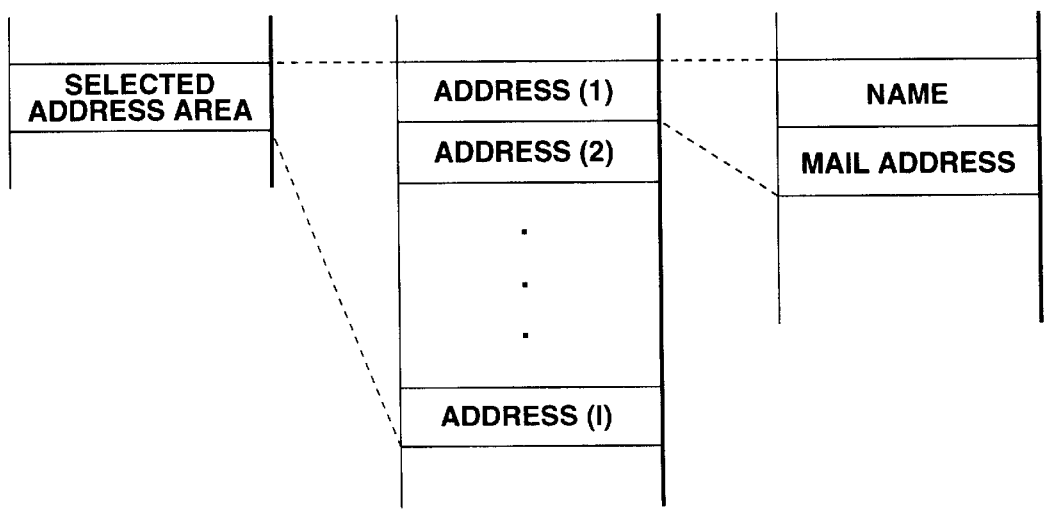
FIG. 7 is a representation showing a data structure of data stored in a selected address area.

A selected address area is an area storing data with a selection flag having a value of "1" in the address area shown in FIG. 6 after selected in the address area shown in FIG. 6. In this area, data of each mail address is separately stored in addresses as a unit as shown in FIG. 7. Data of one unit include name and a mail address.

Unit data stored in the address area and the selected address area are, hereinafter, expressed for convenience such that for the case where an expression is used in the sense of one unit data, the expression assumes the form using parentheses like ADDRESS(n) and for the other cases, the expression assumes the form like address.

Figure 8:
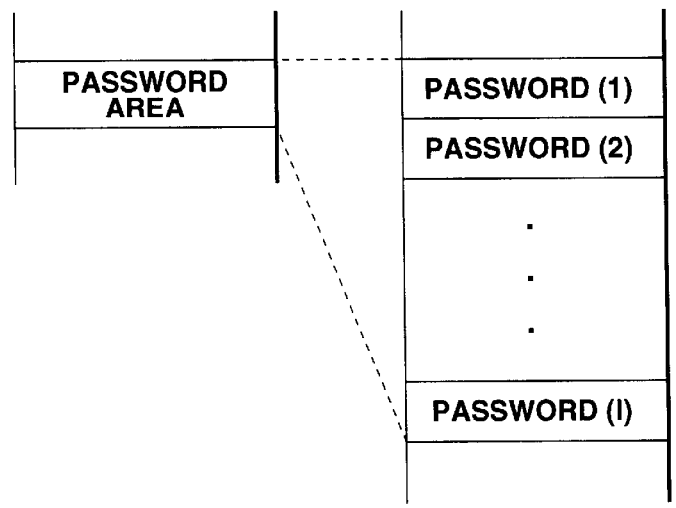
FIG. 8 is a representation showing a data structure of data stored in a password area.

A password area is an area storing a password (keyword) which a user has registered. In the area, there are stored data in passwords each as a unit as shown in FIG. 8. Unit data stored in the password area are, hereinafter, expressed for convenience such that for the case where an expression is used in the sense of one unit data, the expression assumes the form using parentheses like PASSWORD(n) and for the other cases, the expression assumes the form like password.

Other than the above examples, there is allotted in the RAM 103 an area storing an address data of a transfer address to which a received mail is transferred, though especially not shown. If it is determined that a received mail is transferred, transfer address data thereof is read out and used as a receiver address of the received mail.

The CPU 101 refers to stored data in the selected address area or the password area among data stored in the RAM 103 and determines whether or not a received mail is transferred and according to the determination result, the received mail is transferred.

The operation of the CPU 101 will be described with reference to various kinds of operation flowcharts shown in FIGS. 9 to 48 and various kinds of representations shown in FIGS. 49 to 64 in a detailed manner. Each of the flowcharts shows an operation for processing which is realized by an execution of a program stored in the ROM 102.

Figure 9:
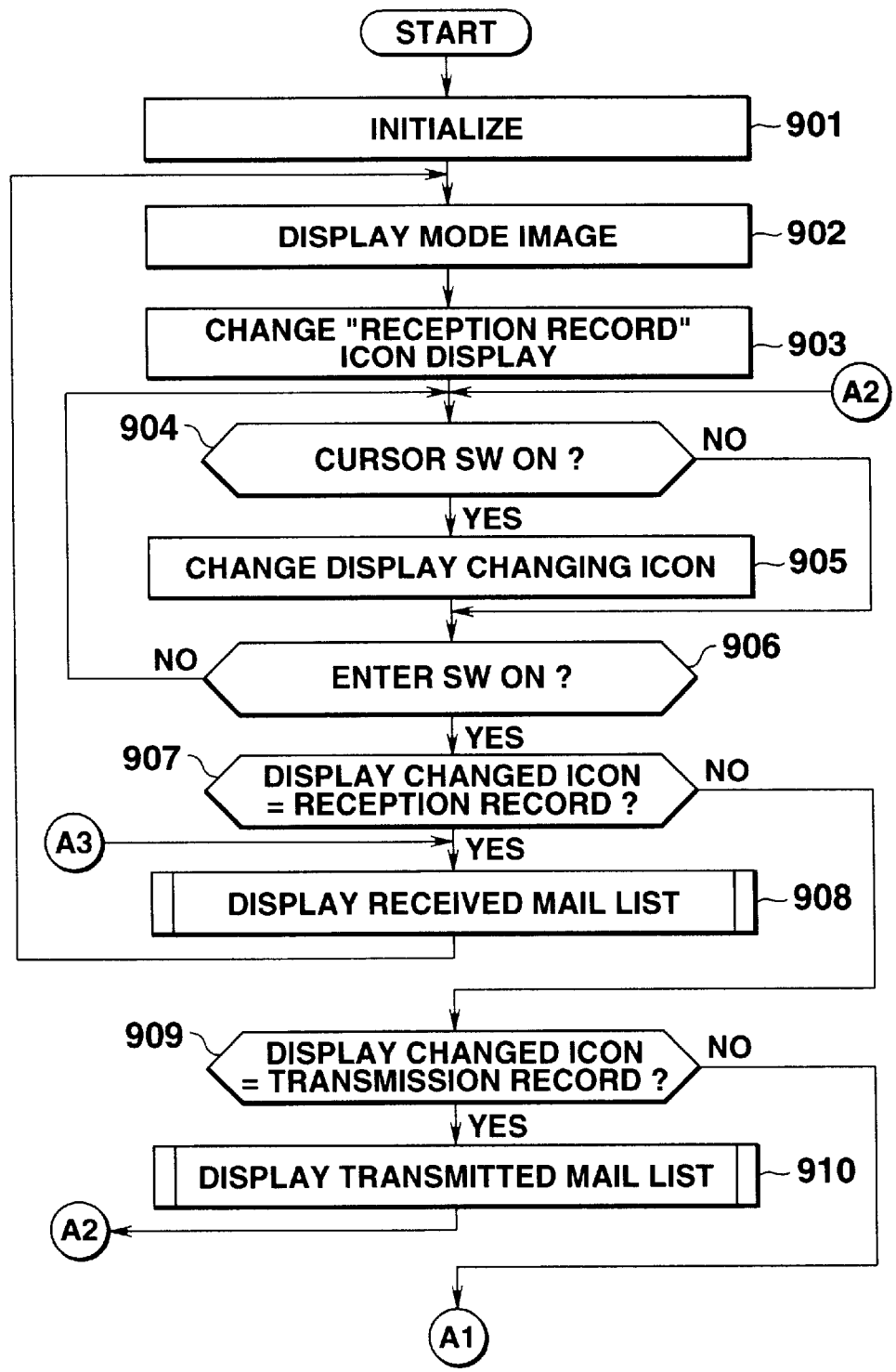
FIG. 9 is a flowchart for operation of overall processing.
Figure 10:
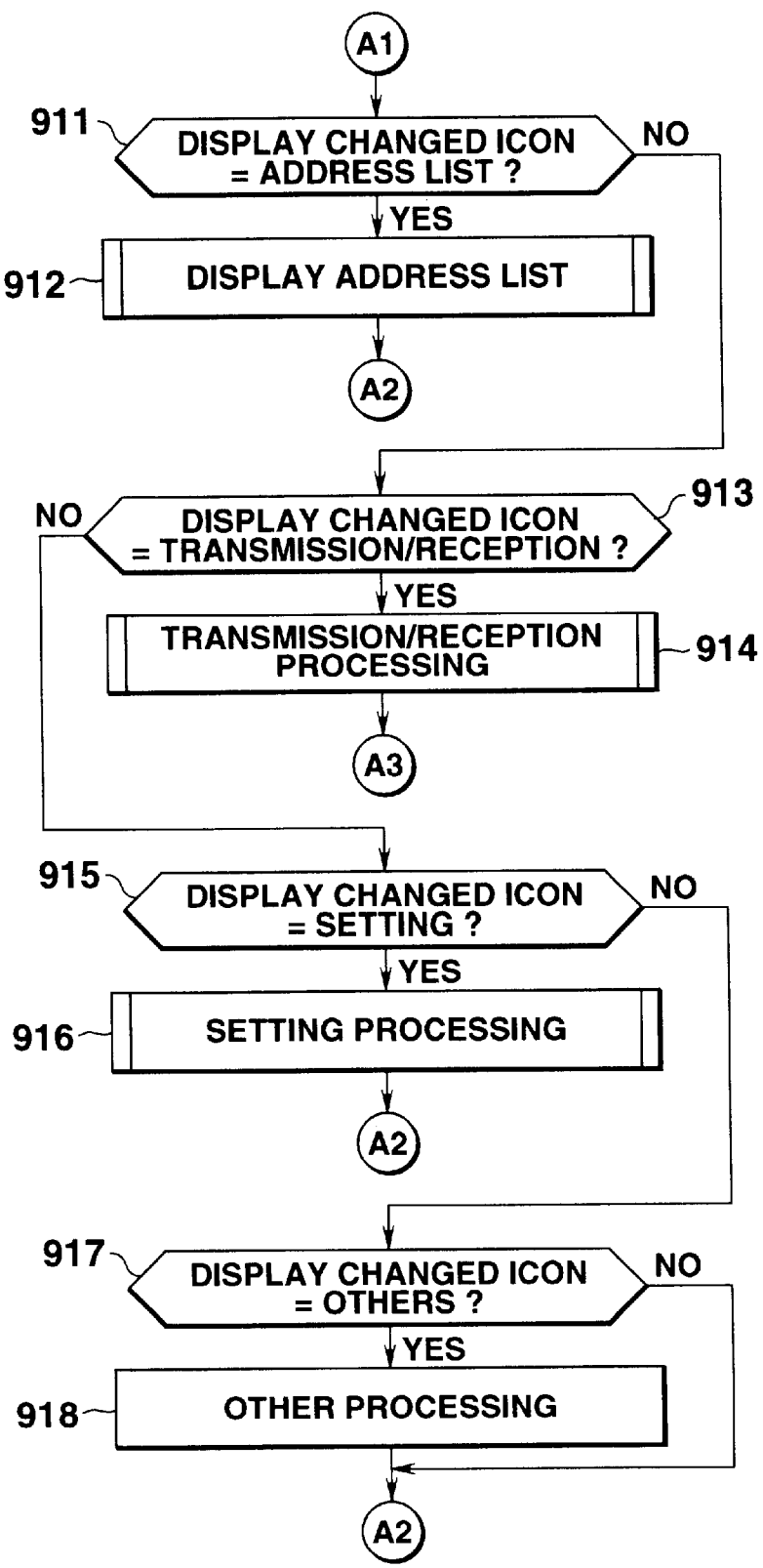
FIG. 10 is a flowchart for operation of overall processing (continuation)
Figure 11:
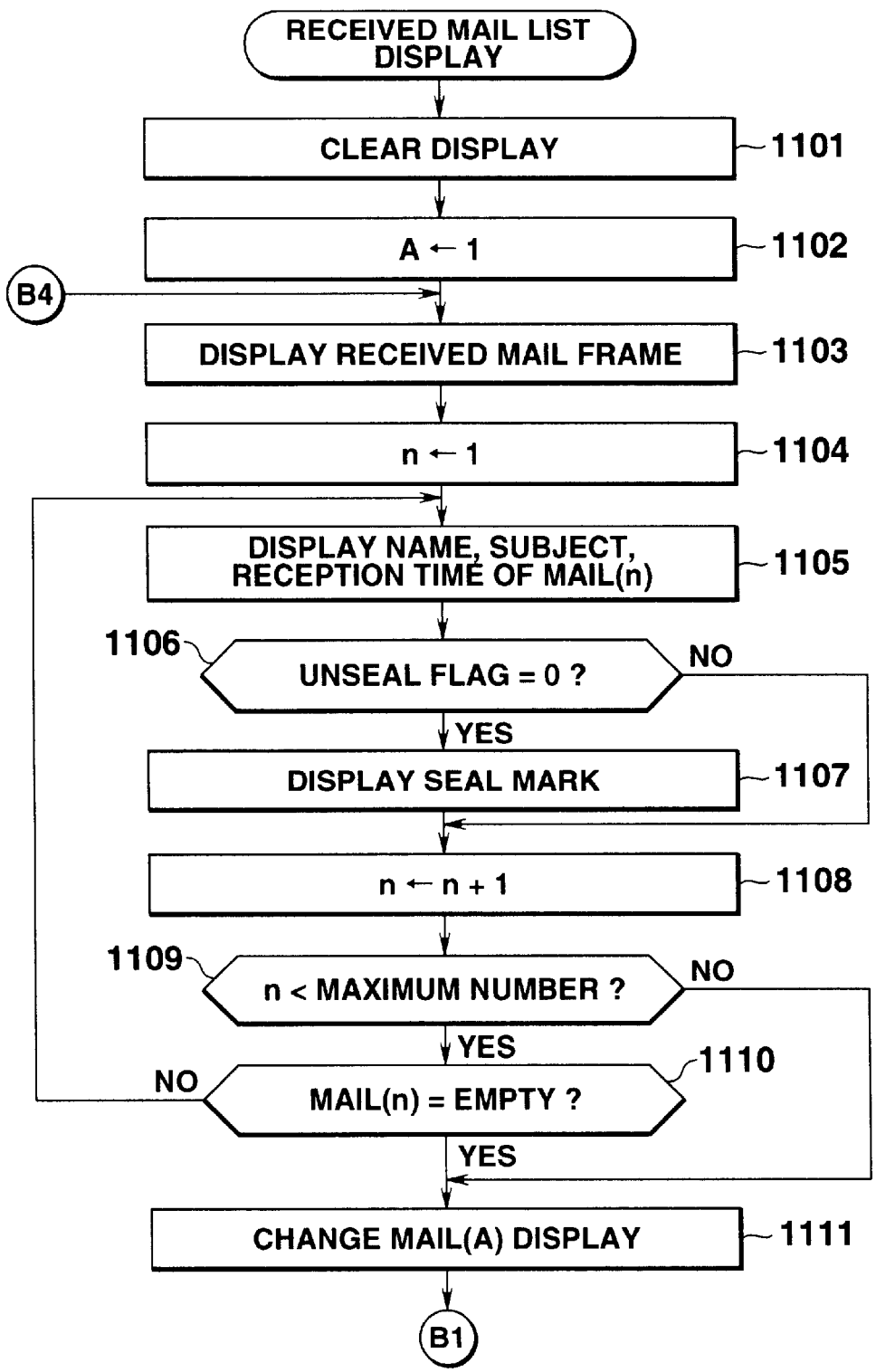
FIG. 11 is a flowchart for operation of received mail list display processing.
Figure 12:
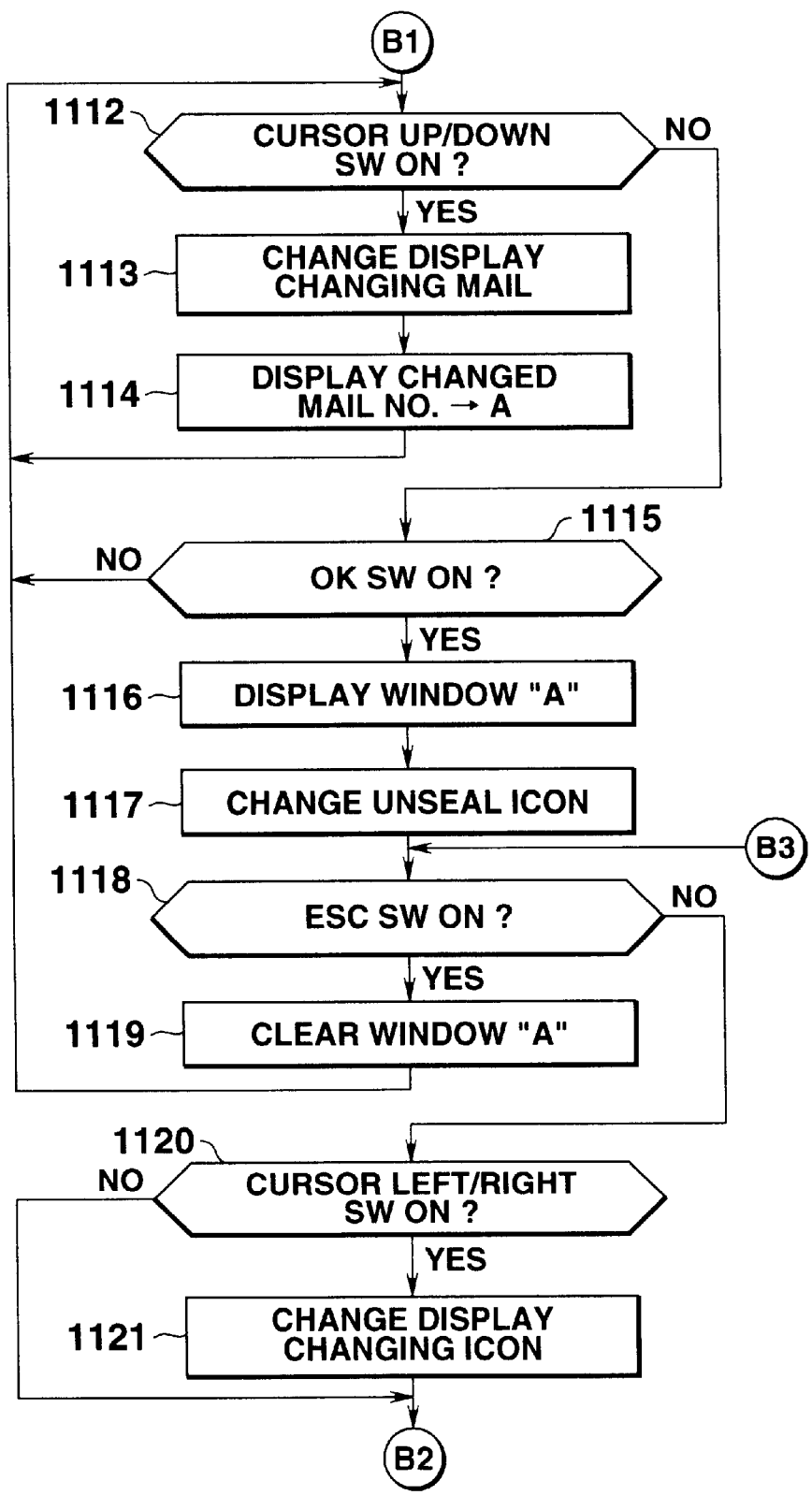
FIG. 12 is a flowchart for operation of received mail list display processing (continuation 1)
Figure 13:
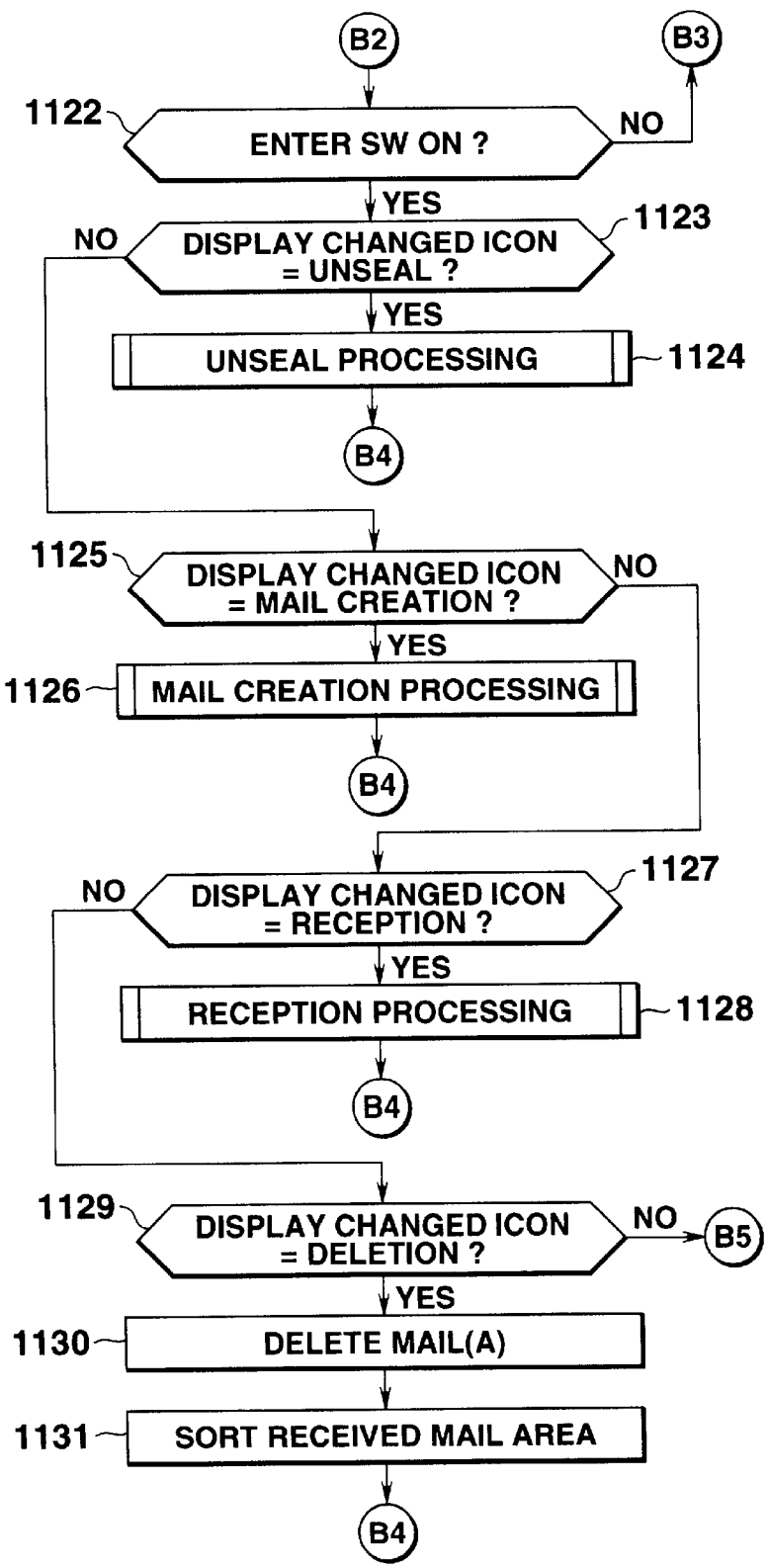
FIG. 13 is a flowchart for operation of received mail list display processing (continuation 2)

FIGS. 9 and 10 are flowcharts of operation of overall processing. First, detailed description will be given with reference to FIGS. 9 and 10.

If an power source is turned on by operating the electric switch 205 shown in FIG. 2 of an electronic mail apparatus, the CPU 101 starts execution of a program stored in the ROM 102 and performs initialization at step 901. By the initialization, the electronic mail apparatus is set in a predetermined initial condition, or an initial state preset by a user. Thereafter, program flow goes to step 902.

At step 902, there is performed display of a mode selection image shown in FIG. 2. At step 903 which follows step 902, there is changed a display state of a "reception record" icon (the icon is an icon which is now selected), which is one of a plurality of icons which have been displayed. Thereafter, program flow goes to step 904.

At step 904, it is determined whether or not the cursor switch 202 has been operated. The cursor switch 202 is a composite switch composed of 4 switches, upper and lower, and left and right. If one of the switches has been operated by a user, in which a determination result is resulted in YES, then program flow goes to step 905. If any of the switches is not operated by a user, in which a determination result is resulted in NO, then program flow goes to step 906.

At step 905, there is performed a change of an icon whose display state is changeable according to operation on the cursor switch 202 by the user. Thereafter, program flow goes to step 906.

At step 906, it is determined whether or not the enter switch 204 has been operated. If a user has operated the enter switch 204, in which a determination result is resulted in YES and program flow goes to step 907. If a user has not operated the switch, in which a determination result is resulted in NO and program flow returns to step 904.

In a condition where a mode selection screen image is displayed, a processing loop formed by steps 904 to 906 is repeated until the user operates the enter switch 204. Thereby, there can be changed an icon whose display state is changeable according to operation on the cursor switch 202 in an arbitrary way.

At steps 907 to 918, a user judges an icon which has been selected when he or she operates the enter switch 204 and there is performed processing to realize a function assigned to the icon.

More specifically, if a selected icon is the "reception record" icon, in which a determination result at step 907 is YES, there is executed received mail list display processing at step 908. If a selected icon is the "transmission record" icon, in which a determination result at step 907 is NO and a determination result at step 909 is YES, there is executed transmitted mail list display processing at step 910. If a selected icon is the address list icon, determination results at steps 907 and 909 are NO and a determination result at step 911 is YES, there is executed address list display processing at step 912. If a selected icon is the "transmission/reception" icon, in which all determination results at steps 907, 909 and 911 are NO and a determination result at step 913 is YES, there is executed transmission/reception processing at step 914. If a selected icon is the "setting" icon, in which all determination results at steps 907, 909, 911 and 913 are NO and a determination result at step 915 is YES, there is executed setting processing at step 916. If a selected icon is another icon, where all determination results at steps 907, 909, 911, 913 and 915 are NO and a determination result at step 917 is YES, there is executed one of other processings at step 918.

After execution of the received mail list display processing at step 908, program flow returns to processing at step 902. After executions of the transmitted mail list display processing at step 910, the address list display processing at step 912 of FIG. 10, the setting processing at step 916 or another processing at step 918, program flow returns to step 904. After execution of the transmission/reception processing program at step 914, program flow returns back to step 908. Thereafter, the following processings are repeated in a similar way.

Hereafter, detailed description will be given to various sub-routine processings executed in the overall processing described above.

FIGS. 11 to 14 show a flowchart for operation of received mail list display processing executed at step 908 in the overall processing. The processing will be described in a detailed manner with reference to FIGS. 11 to 14.

If a function of the "reception record" icon is selected, there can be performed operation associated with reception of a mail in which a received mail is read and a mail is newly received. The received mail list display processing is a processing which is performed to realize the operations.

First, at step 1101, there is cleared a display of the screen 201. Then, at step 1102 which follows step 1101, "1" is substituted in a pointer "A" which is a variable. The pointer "A" is used for management of an electronic mail, which is regarded as being effective among received electronic mails. After "1" is substituted in the pointer "A," program flow goes to step 1103. Clearing of the display of the screen 201 is performed by clearing a storage area of image data by the CPU 101 which are displayed on the screen 201 allotted in a memory of the display section 104, for example.

Figures 48, 49:
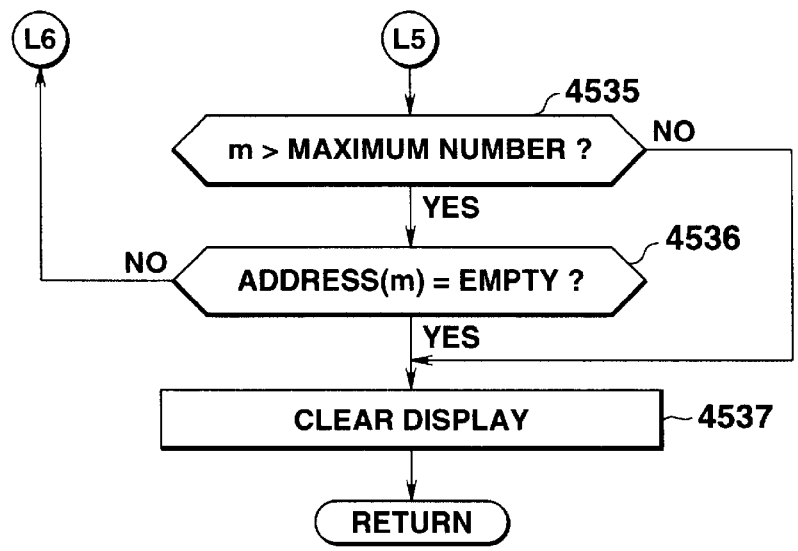
FIG. 48 is a flowchart for operation of address setting processing (continuation 3)
FIG. 49 is a representation showing an example of a received mail list image.

After a function of the "reception record" icon is selected, a received mail list image is displayed as shown in FIG. 49. At step 1103, a screen frame of the image is displayed. At step 1104 which follows step 1103, "1" is substituted in a variable "n" in order to sequentially display lists of received mails. Thereafter, program flow goes to step 1105.

In a processing loop formed by steps 1105 to 1110, lists of received mails are sequentially displayed to find a received mail list corresponding to the variable "n" until there is left behind no received mail which is an object for search or until the number of lists of received mails displayed reaches the maximum thereof which can be displayed in the screen 201, while the variable "n" is incremented by one.

At step 1105, data MAIL(n) of a received mail corresponding to a value of the variable "n" is read out from the received mail area shown in FIG. 4 in the RAM 103 and name of a transmitter, a subject and a reception time in the data is displayed in a display area in the screen 201 specified by a value of the variable "n".

At step 1106, which follows step 1105, it is determined whether or not a value of the unseal flag in the data is "0". If the electronic mail has not been unsealed by a user, in which a determination result is YES and program flow goes to step 1107. If the electronic mail has been unsealed by a user, in which a determination result is NO and program flow goes to step 1108. At step 1107, there is displayed a mark (a double circle mark in FIG. 49) which indicates that the electronic mail has not been unsealed. Thereafter, program flow goes to step 1108.

At step 1108, it is regarded that a display for one electronic mail has been completed and a value of the variable "n" is incremented by one. Thereafter, program flow goes to step 1109 and it is determined whether or not a value of the variable "n" is equal to or less than the maximum number of received mail lists which can be displayed in the screen 201. If display of received mail lists in the maximum number has been completed, in which a determination result is NO, program flow goes to step 1111. If the display of received mail lists has not been completed, in which a determination result is YES and program flow goes to step 1110.

At step 1110, it is determined whether or not data MAIL (n) corresponding to a value of the variable "n" is stored in the received mail area. If the data is stored in the received mail area, in which a determination result is NO and program flow returns to step 1105. If the data is not stored, a determination result is YES and program flow goes to step 1111.

At step 1111, there is changed a display state of a list, which is specified by a value of a pointer "A". Thereafter, program flow goes to step 1112 of FIG. 12. By the completion at step 1111, there is completed display of a received mail list image which is displayed after selection of a function of the "reception record" icon. A list which is different from other lists in display state is a list which is currently effective.

At step 1112 through steps thereafter, processings are performed according to operations on various kinds of switches by the user.

At step 1112, it is determined whether or not one of upper and lower switches of the cursor switch 202 has been turned on. If a user has operated one of the upper and lower switches, in which a determination result is YES and program flow goes to step 1113. If a user has not operated any of the switches, in which a determination result is NO and program flow goes to step 1115.

At step 1113, there is changed a list whose display state is different from others according to operation on the upper and lower switches. At step 1114 which follows step 1113, a value of the pointer "A" is updated in response to the change. The update is performed by changing a value of a list whose display state is thus far different from others into a value of a list whose display state is newly changed so as to be different from others. After the change is completed, program flow returns to step 1112.

On the other hand, at step 1115, it is determined whether or not the OK switch 203 is turned on. If a user has operated the OK switch 203, in which a determination result is YES and program flow goes to step 1116. If a user has not operated the OK switch 203, in which a determination result is NO and program flow returns to step 1112.

At step 1116, a window "A" shown in FIG. 50 is displayed on a received mail list image shown in FIG. 49 in an overlapping manner. The window "A" is a window in which there are disposed operation items which are performed on an electronic mail of a list, as an object, which has been selected if the OK switch 203 is operated and a plurality of icons which indicate 1operation items which can be performed at the time. After display of the window "A", program flow goes to step 1117 and a display state of the "unseal" icon is changed to another state. Thereafter, program flow goes to step 1118.

After display of the window "A", a user designates an operation content through an icon. The designation of an operation content and the operation which has been designated are realized by executing processing from step 1118 through steps thereafter.

At step 1118, it is determined whether or not the ESC switch 206 has been turned on. If a user has operated the ESC switch 206, in which a determination result is YES and program goes to step 1119. If a user has not operated the ESC switch 206, in which a determination result is NO and program flow goes to step 1120. At step 1119, there is cleared a display in the window "A" on the assumption that the user does not perform operations, which are indicated by icons disposed in the window "A". Thereafter, program flow returns to step 1112.

At step 1120, it is determined whether or not one of left and right switches of the cursor switch 202 has been turned on. If a user has operated one of left and right switches, in which a determination result is YES and program flow goes to step 1121. If a user has not operated any of left and right switches, in which a determination result is NO and program flow goes to step 1122 of FIG. 13. At step 1121, there is performed a change of icon whose display state is changeable from others according to the operation of the left and right switches. Thereafter, program flow goes to step 1122.

At step 1122, it is determined whether or not the Enter key 204 has been turned on. If a user has operated the Enter key 204, in which a determination result is YES and program flow goes to step 1123. If a user has not operated the Enter key 204, in which a determination result is NO and program flow returns to step 1118 of FIG. 12.

At step 1123 through steps thereafter, a user specifies an icon (whose display state has been different from others) which has been selected if the user operates the enter switch 204 and there is performed processing to realize a function which has been assigned to the selected icon.

More specifically, if the selected icon is the "unseal" icon, in which a determination result at step 1123 is YES, unseal processing is executed at step 1124. If the selected icon is the "mail creation" icon, in which determination result at step 1123 is NO and a determination result at step 1125 is YES, mail creation processing is executed at step 1126. If the selected icon is the "reception" icon, in which determination results at steps 1123 and 1125 are both NO and a determination result at step 1127 is YES, there is executed reception processing at step 1128. After processings at step 1124, 1126 or 1128 are completed, program flow returns to step 1103 of FIG. 11.

If the selected icon is the "deletion" icon, in which determination results at steps 1123, 1125 and 1127 are NO and a determination result at step 1129 is YES, program flow goes to step 1130. At step 1130, there is performed deletion of data MAIL(n) of an electronic mail specified by a value of the pointer "A". At step 1131 which follows step 1130, there is performed sorting in the received mail area in response to the deletion. Thereafter, program flow returns to step 1103 of FIG. 11.

Figure 14:
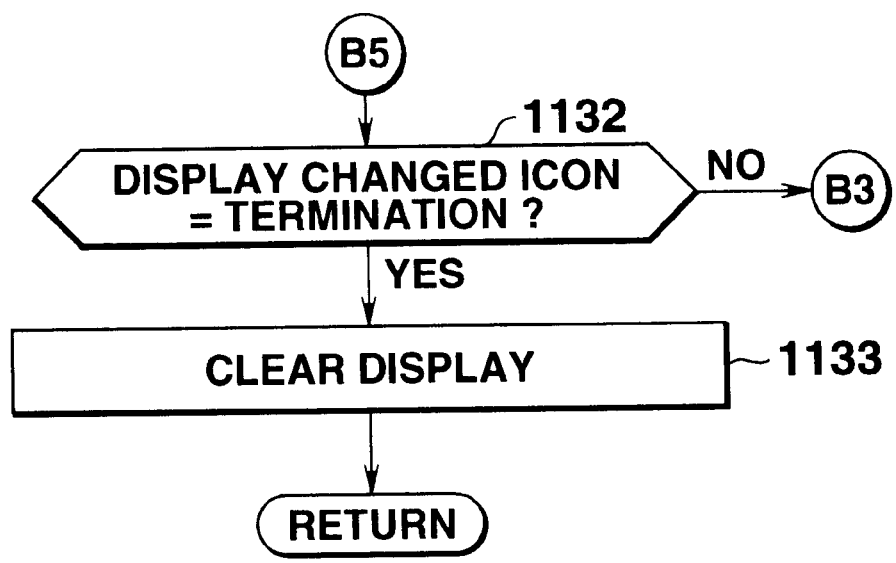
FIG. 14 is a flowchart for operation of received mail list display processing (continuation 3)

If the selected icon is the "termination" icon, in which determination results at steps 1123, 1125, 1127 and 1129 are NO and a determination result at step 1132 of FIG. 14 is YES, program flow goes to step 1133. At step 1133, there is cleared an image which is currently displayed on the screen 201 on the assumption that a user has instructed termination of operation on a function assigned to the "reception record" icon. Thereafter, a series of processings are terminated.

As described above, if a function of the "reception record" icon is selected, a user can not only read a content of an electronic mail but perform mail creation, reception and deletion of a received mail.

Then, various sub-routine processings executed in the received mail list display processing will be described with reference to operation flowcharts shown in FIGS. 15 to 23.

Figure 15:
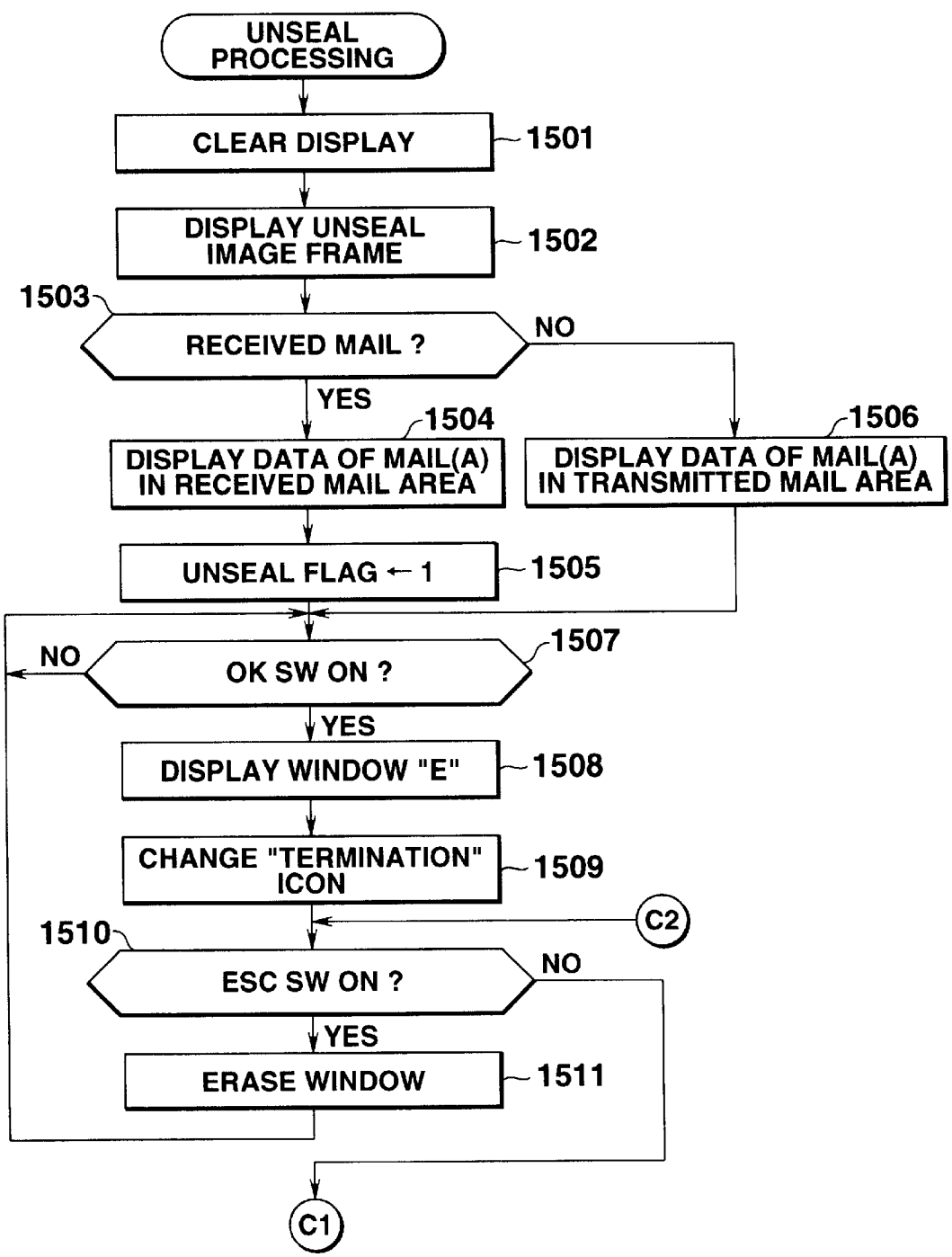
FIG. 15 is a flowchart for operation of unseal processing.
Figure 16:
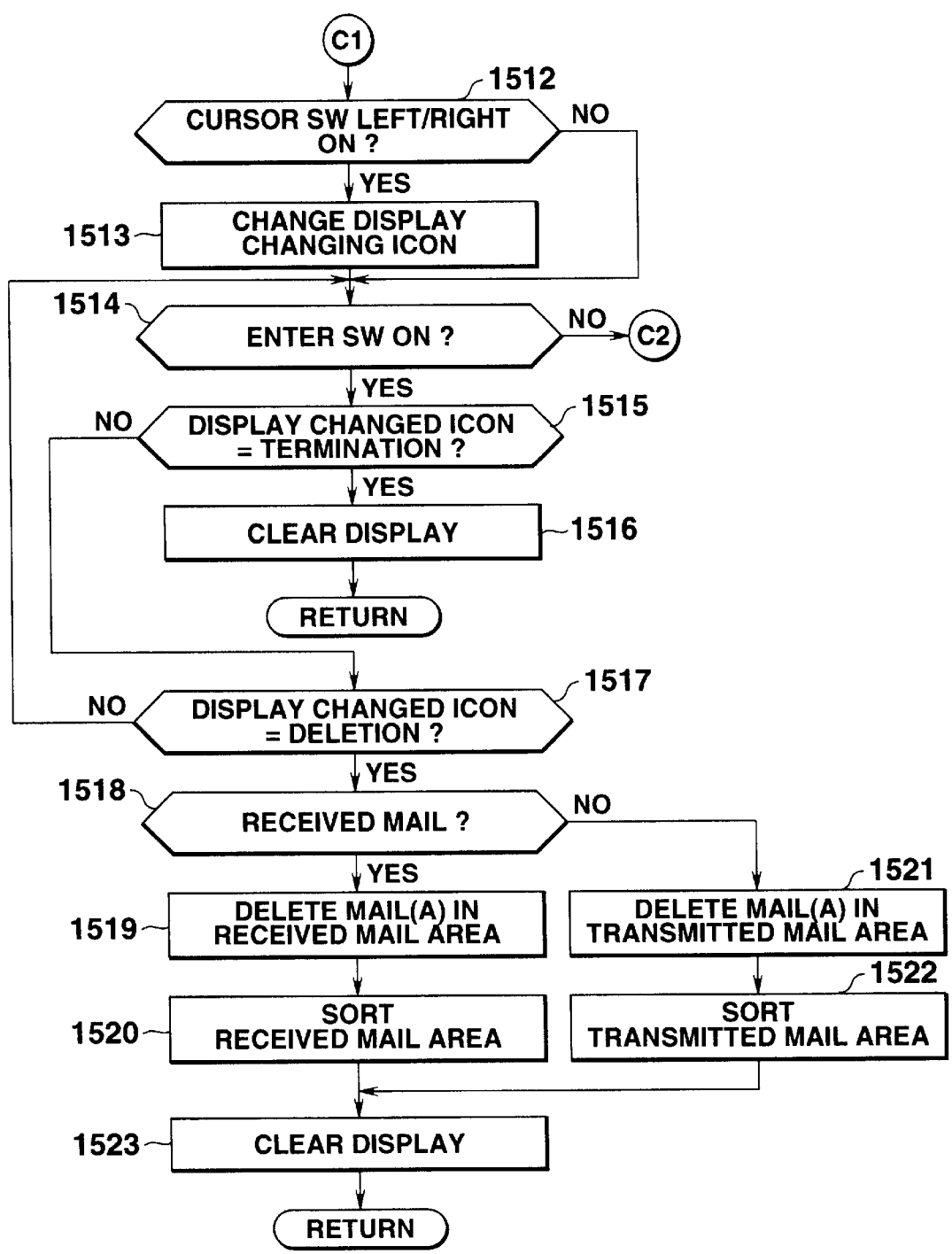
FIG. 16 is a flowchart for operation of unseal processing (continuation)
Figure 17:
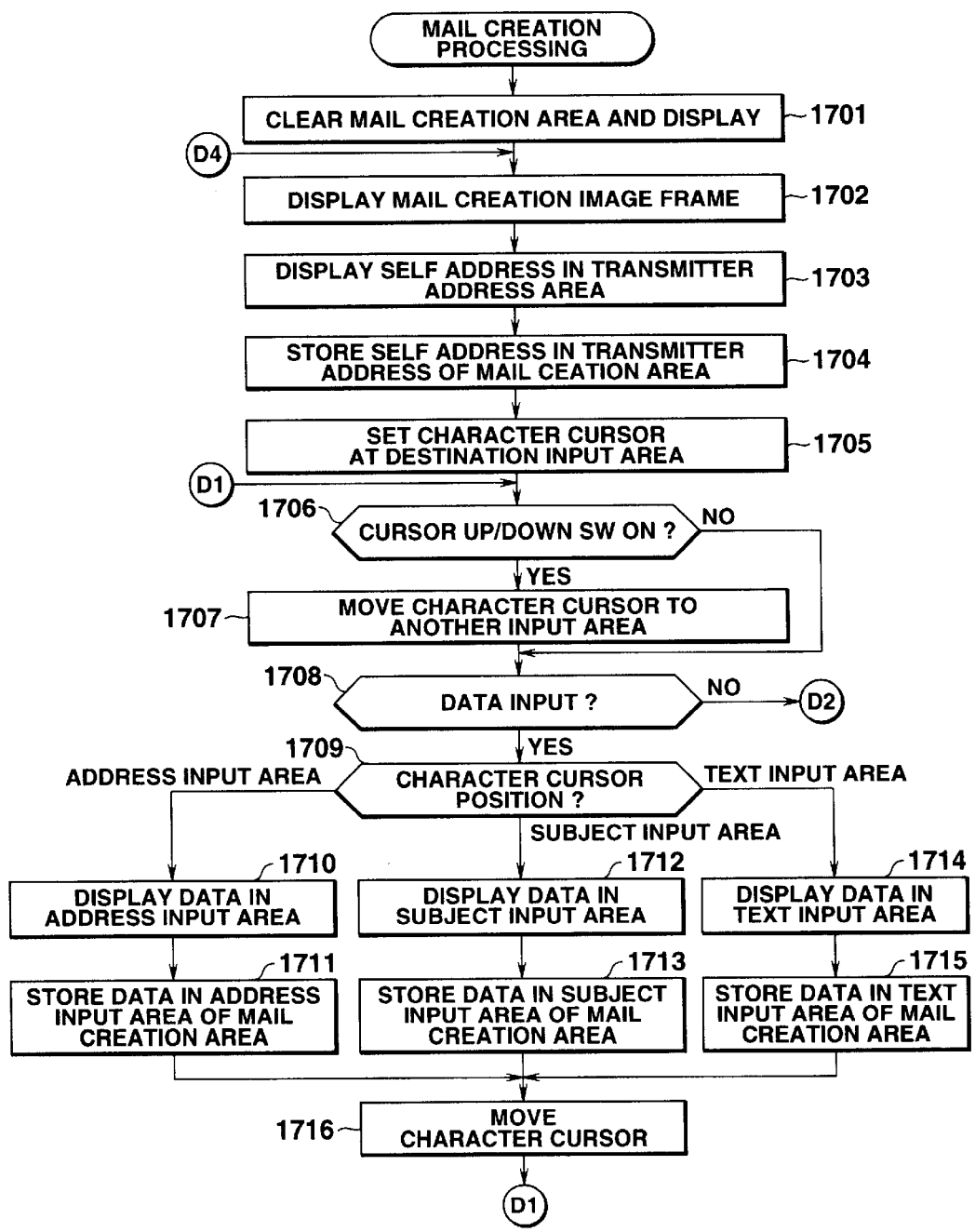
FIG. 17 is a flowchart for operation of mail creation processing.
Figure 18:
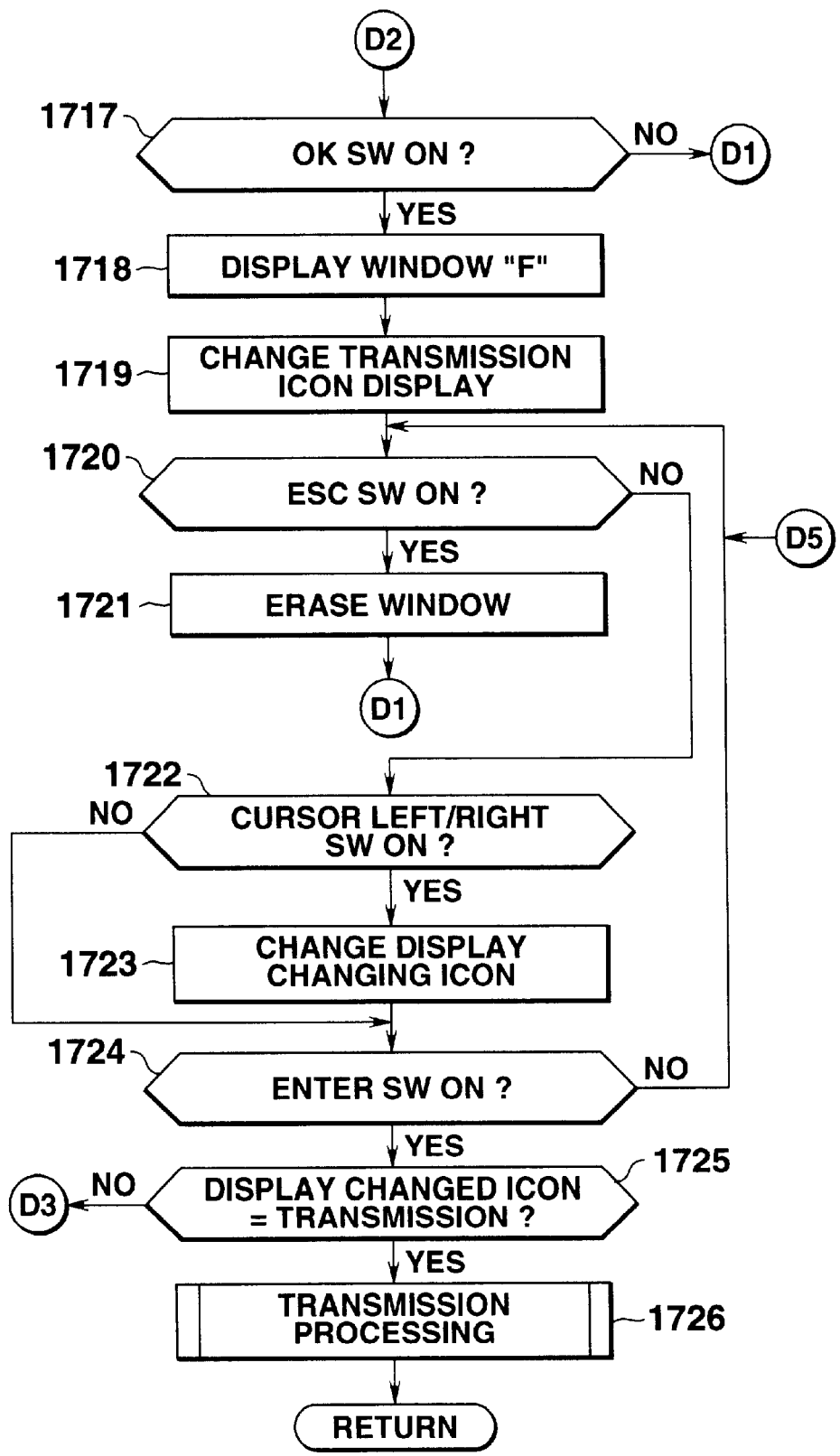
FIG. 18 is a flowchart for operation of mail creation processing (continuation 1)
Figure 19:
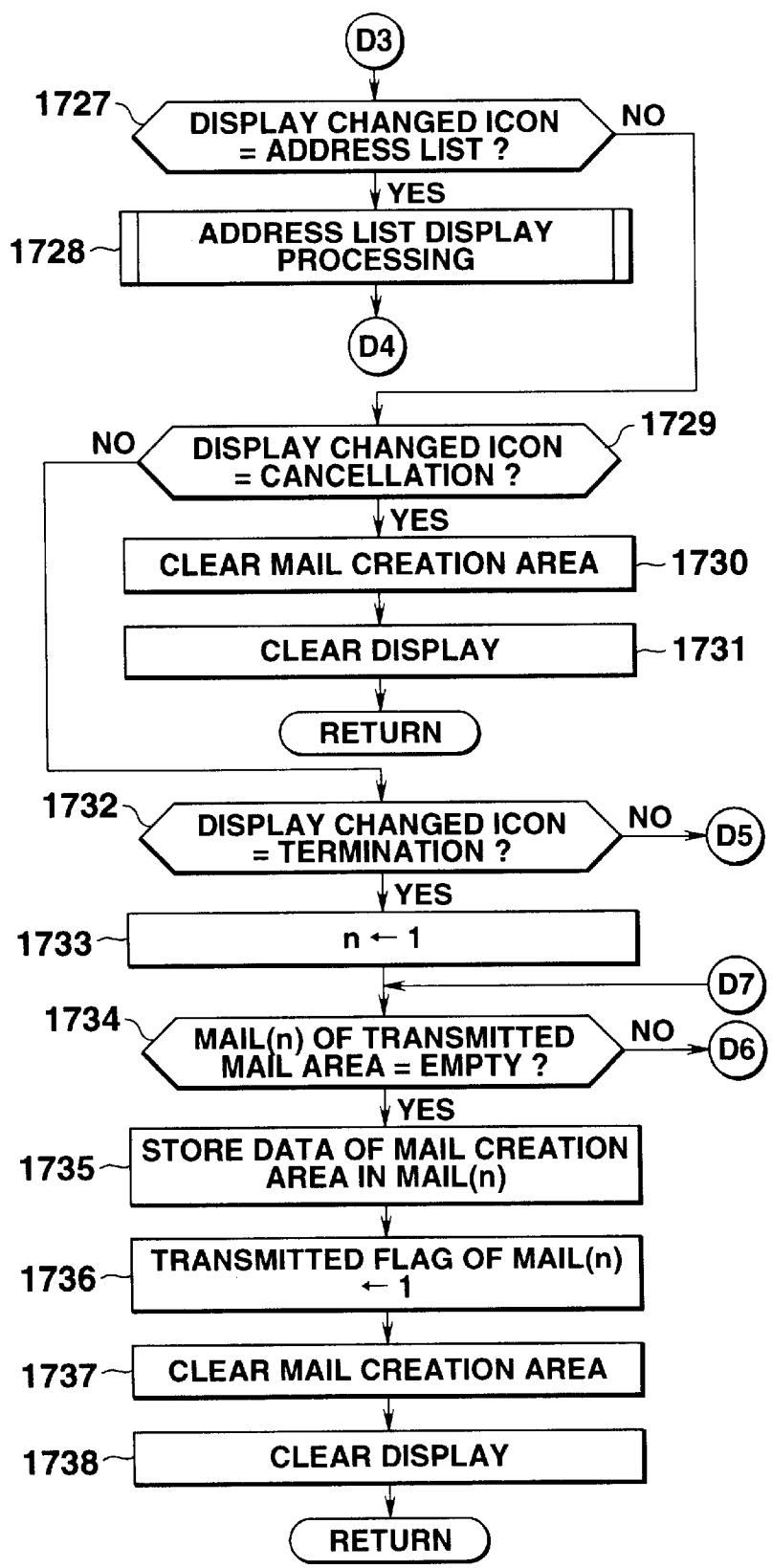
FIG. 19 is a flowchart for operation of mail creation processing (continuation 2)

FIGS. 15 and 16 show a flowchart for operation of unseal processing executed as step 1124. First, the detail of the unseal processing will be descried with reference to FIGS. 15 and 16.

The unseal processing is processing in which a user can read contents of a received mail, a transmitted mail or a non-transmitted mail. In the unseal processing, a value of the pointer "A" is given from call processing for the unseal processing as an argument (hereinafter referred to as argument "A").

At step 1501, the screen 201 is cleared. After the clearing, program flow goes to step 1502 and there is performed display of a screen frame of an unseal screen image shown in FIG. 51. Thereafter, program flow goes to step 1503.

At step 1503, it is determined whether or not an object whose content is displayed is stored in the received mail area. If data stored in the received mail area is displayed, in which a determination result is YES, program flow goes to step 1504. If data stored in the received mail area is not displayed, in which a determination result is NO, program flow goes to step 1506.

At step 1504, there is displayed transmitter name, receiver name, a subject and a text in data MAIL(A), specified by the argument "A", in the received mail area (see FIG. 4) as shown in FIG. 51. At step 1505, which follows step 1504, since a content of the data MAIL(A) has been displayed, "1" is substituted in the unseal flag. Thereafter, program flow goes to step 1507.

At step 1506, on the other hand, there is displayed transmitter name, receiver name, a subject and a text in data MAIL(A), specified by the argument "A", in the transmitted mail area (see FIG. 5) as shown in FIG. 51. Thereafter, program flow goes to step 1507.

At step 1507, it is awaited that the OK switch 203 is turned on. If a user has operated the OK switch 203, in which a determination result is YES, program flow goes to step 1508.

Figures 52, 53:
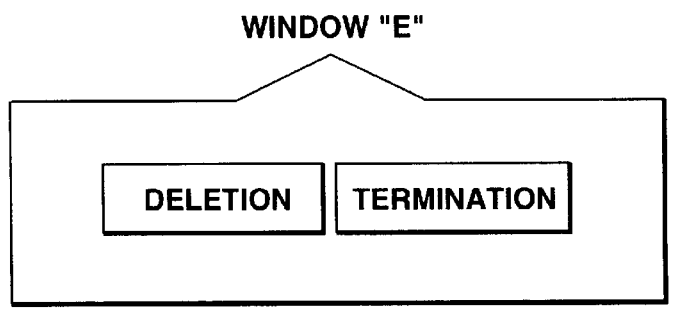
FIG. 52 is a representation showing an example of a window "E"
FIG. 53 is a representation showing an example of display at the time of mail creation processing.

At step 1508, there is displayed, as shown in FIG. 52, a window "E" in which there are disposed a plurality of icons which indicate operation items, which relates to mails now being unsealed, overlapping on the unseal image as shown in FIG. 51. At step 1509, which follows step 1508, there is performed a change in which a display state is made different from others using the "termination" icon as a selected icon. Thereafter, program flow goes to step 1510.

At step 1510, it is determined whether or not the ESC switch 206 has been turned on. If a user has operated the ESC switch 206, in which a determination result is YES, program flow goes to step 1511. If a user has not operated the ESC switch 206, in which a determination result is NO, program flow goes to step 1512 of FIG. 16.

At step 1511, the window "E" is erased on the assumption that a user has instructed not to perform operations on the functions of icons displayed in the window "E". Thereafter, program flow returns to step 1507.

At step 1512 of FIG. 16, on the other hand, it is determined whether or not one of the left and right switches of the cursor switch 202 has been turned on. If a user has operated one of the left and right switches, in which a determination result is YES, program flow goes to step 1513. If a user has not operated any of the left and right switches, in which a determination result is NO, program flow goes to step 1514.

At step 1513, there is performed a change of a selected icon whose display state is made different from others according to a switch which a user operates. If the left switch has been operated, there is performed a change of the deletion switch to a selected icon, while if the right switch has been operated, there is performed a change of the termination switch to a selected switch. Thereafter, program flow goes to step 1514.

At step 1514, it is determined whether or not the enter switch 204 has been turned on. If a user has operated the enter switch 204, in which a determination result is YES, program flow goes to step 1515. If a user has not operated the enter switch 204, in which a determination result is NO, program flow goes to step 1510 of FIG. 15. AS described above, after the window "E" is displayed, the left and right switches of the cursor switch 202, the enter switch 204 and the ESC switch 206 are only effective switches which are remained.

At step 1515 through steps thereafter, there is performed processing in which a kind of selected icon is specified and a function, which is assigned to the kind of icon, is realized.

First, at step 1515, it is determined whether or not a selected icon when the enter switch 204 is operated, is the termination switch. If a user has operated the enter switch 204 in a condition that the "termination" icon is a selected icon, in which a determination result is YES, program flow goes to step 1516. If a user has not operated the enter switch 204, in which a determination result is NO, program goes to step 1517.

At step 1516, there is cleared a display on the screen 201 on the assumption that a user has instructed termination of operation in which an unseal image as shown in FIG. 51 is displayed. Thereafter, a series of processings are terminated.

At step 1517 on the other hand, it is determined whether or not a selected icon is the deletion switch. If a user has operated the enter switch 204 in a condition that the deletion switch is the selected icon, in which a determination result is YES, program flow goes to step 1518. If a user has not operated the enter switch 204, that is, if another operation has been performed, in which a determination result is NO, program flow returns to step 1514.

At step 1518, it is determined whether or not an object whose content is currently displayed is data stored in the received mail area. If data stored in the received mail area has been displayed, in which a determination result is YES, program flow goes to step 1519. If data stored in the received mail area has not been displayed, in which a determination result is NO, program flow goes to step 1521.

At step 1519, there is deleted data MAIL(A) in the received mail area (see FIG. 4) specified by a value of the argument "A". At step 1520, which follows step 1519, there is sorted data MAIL stored in the received mail area in response to the deletion. After the sorting is completed, program flow goes to step 1523. By performing the sorting, data MAIL, which has been attached with a previous value larger than a value of the argument "A", is newly attached with a value less than the previous value by one.

At step 1521, there is performed deletion of data MAIL (A) in the transmitted mail area (see FIG. 5) specified by a value of the argument "A". At step 1522, which follows step 1521, there is sorted data MAIL stored in the transmitted mail area in response to the deletion. After the sorting, program flow goes to step 1523. By performing the sorting, data MAIL attached with larger previous values than a value of the argument "A" are newly attached with respective values less than the previous values by one.

At step 1523, a display on the screen 201 is cleared. Thereafter, a series of processings are terminated.

FIGS. 17 to 20 show a flowchart for operation of mail creation processing executed as step 1126 in the received mail list display processing. Then, a content of the processing will be described in detail with reference to FIGS. 17 to 20.

The mail creation processing is processing in which the mail creation area (see FIG. 3) in the RAM 103 is used as a working area, there are stored data input by a user operating the key board 105 in the RAM 103 while the data is classified according to kinds and a mail is transmitted.

At step 1701, there are cleared the mail creation area and a display on the screen 201. At step 1702, which follows step 1701, there is displayed a screen frame of a mail creation image shown in FIG. 53 on the screen 201. Thereafter, at step 1703, name of a user itself is displayed in the transmitter address area and at step 1704 which follows step 1703, name and a mail address of the user itself are respectively stored in the transmitter name and the transmitter address areas in the mail creation area. At step 1705, which follows step 1704, a character cursor is displayed in the receiver address input area. After the series of steps are completed, program flow goes to step 1706.

In the mail creation screen image, as areas in which a user performs character input, there are provided a receiver address input area, a subject input area and a text-input area. Character input can now be performed in an area in which a character cursor, not shown, is displayed among the input areas. Character input in each input area is realized in execution through steps 1706 to 1716.

First, at step 1706, it is determined whether or not one of the upper and lower switches of the cursor switch 202 has been turned on. If a user has operated one of the upper and lower switches, in which a determination result is YES, program flow goes to step 1707. If a user has not operated any of the upper and lower switches, in which a determination result is NO, program flow goes to step 1708.

At step 1707, there are performed a change of an area in which a character cursor is displayed according to a current display position of a character cursor and a kind of a switch which has been operated. After the change is completed, program flow goes to step 1708. The change of an area is performed, for example, if a user instructs by operating one of the upper and lower switches of the cursor switch 202 (so that a display position of a character cursor) is moved in a direction along which the character cursor can move out of an area in which the character cursor is now displayed.

At step 1708, it is determined whether or not data input has been made in one of the input areas. If a user has operated a switch for character input of the keyboard 105, in which a determination result is YES, program flow goes to step 1709. If a user has not operated the switch, in which a determination result is NO, program flow goes to step 1717 of FIG. 18.

At step 1709, it is determined which of the areas a character cursor is displayed, that is data input (character input) has been performed. If an area has been determined as the address input area, program flow goes to step 1710 and there is displayed the input data (characters) by the user in the area. At step 1711, which follows step 1710, the data (characters) are stored as name of a receiver address or data of a mail address in the mail creation area. Thereafter, program flow goes to step 1716.

If a character cursor is displayed in the subject input area, program flow goes from step 1709 to step 1712. At step 1712, in the area, there is displayed data (characters) which a user has input. At step 1713, which follows step 1712, the data (characters) are stored as data of the subject in the mail creation area. Thereafter, program flow goes to step 1716.

If a character cursor is displayed in the text input area, program flow goes from step 1709 to step 1714. At step 1714, in the area, there is displayed the data (characters) which a user has input. At step 1715, which follows step 1714, there is stored the data (characters) as data of the text in the mail creation area. Thereafter, program flow goes to step 1716.

At step 1716, a character cursor is moved in correspondence with data (characters) input by a user. By the movement, a character cursor is displayed in a position where data (characters) are input next time. After the positioning of the character cursor, program flow returns to step 1706.

On the other hand, at step 1717 which is performed when a determination result at step 1708 is NO, it is determined whether or not the OK switch 203 has been turned on. If a user has operated the OK switch 203, in which a determination result is YES, program flow goes to step 1718. If a user has not operated the OK switch 203, in which a determination result is NO, program flow returns to step 1716 of FIG. 17.

At step 1718, there is displayed a window "F" shown in FIG. 54 in which there are displayed operation items, as icons, which can be performed at that point of time, on the mail creation screen image in an overlapping manner. At step 1719, which follows step 1718, there is changed a display state of the "transmission" icon among the icons disposed in the window "F" as a selected icon. Thereafter, program flow goes to step 1720.

At step 1720, it is determined whether or not the ESC switch 206 has been turned on. If a user has operated the ESC switch 206, in which a determination result is YES, program flow goes to step 1721. If a user has not operated the ESC switch 206, in which a determination result is NO, program flow goes to step 1722. At step 1721, the window "F" is erased on the assumption that a user has instructed that no operations selected by icons in the window "F" are performed. Thereafter, program flow goes to step 1706 of FIG. 17.

On the other hand, at step 1722, it is determined whether or not one of the left and right switches of the cursor switch 202 has been turned on. If a user has operated one of the left and right switches, in which a determination result is YES, program flow goes to 1723. If a user has not operated any of the left and right switches, in which a determination result is NO, program flow goes to step 1724.

At step 1723, there is performed a change of a selected icon according to operation on the left or right switch of the cursor switch 202 by a user. After the change is completed, program flow goes to step 1724.

At step 1724, it is determined whether or not the enter switch 204 has been turned on. If a user has operated the enter switch 204, in which a determination result is YES, program flow goes to step 1725. If a user has not operated the enter switch 204, in which a determination result is NO, program flow returns to step 1720. For this reason, after the window "F" is displayed, there are only effective the ESC switch 206, the enter switch 204 and the cursor switch 202.

At step 1725 through steps thereafter, there is performed processing according to an icon which has been a selected icon when a user operates the enter switch 204.

First, at step 1725, it is determined whether or not the selected icon is the "transmission" icon. If a user has operated the enter switch 204 in a condition that the selected icon is in a different display state from others, in which a determination result is YES, program flow goes to step 1726. At step 1726, the transmission is executed and thereafter a series of processings are terminated. If a user has not operated the enter switch 204, in which a determination result is NO, program flow goes to step 1727 of FIG. 19.

At step 1727, it is determined whether or not a selected icon is the address list icon. If a user has operated the enter switch 204 in a condition that a display state of the icon is different form others, in which a determination result is YES, program flow goes to step 1728. At step 1728, the address list display processing is executed and thereafter a series of processings are terminated. If a user has not operated the enter switch 204, in which a determination result is NO, program flow goes to step 1729.

At step 1729, it is determined whether or not a selected icon is the "cancellation" icon in window "F". If a user has operated the enter switch 204 in a condition that a display state of the selected icon is different from others, in which a determination result is YES, program flow goes to step 1730. If a user has operated the enter switch 204, in which a determination result is NO, program flow goes to step 1732.

At step 1730, there is cleared all data stored in the mail creation area. At step 1731, which follows step 1730, there is cleared display of the screen 201 in response to the clearing of the data. Thereafter, a series of processings are terminated. If a function of the "cancellation" icon has been selected, accordingly, not only does data input thus far come to be ineffective but the mail creation operation is terminated at that point of time.

At step 1732, on the other hand, it is determined whether or not a selected icon is the "termination" icon. If a user has operated the enter switch 204 in a condition that a display state of the selected icon is different from others, in which a determination result is YES, program flow goes to step 1733. If a user has not operated the enter switch 204, that is if an operation other than a function of the icon has been operated, in which a determination result is NO, program flow goes to step 1720 of FIG. 28.

At step 1733 through steps thereafter, there is performed processing pertaining to reservation of data stored in the mail creation area thus far on the assumption that a user has instructed termination of the mail creation operation.

First, at step 1733, "1" is substituted in the variable "n" in order to detect an area where the data is reserved. At step 1734, which follows step 1733, it is determined whether or not data MAIL(n) specified by a value of the variable "n" is stored in the transmitted mail area (see FIG. 5). If the data MAIL(n) is not stored, in which a determination result is YES, program flow goes to step 1735. If the data MAIL(n) is stored in the transmitted mail area, in which a determination result is NO, program flow goes to step 1739 of FIG. 20.

At step 1735, there is stored data which is stored in the mail creation area is stored in the transmitted mail area as data MAIL(n). At step 1736, which follows step 1735, there is substituted "1" which indicates that transmission has not been performed as a transmitted flag of the data MAIL(n). Thereafter, at step 1737, there are performed clearing of the mail creation area and at step 1738, clearing a display on the screen 201 and thereafter, a series of processings are terminated.

Figure 20:
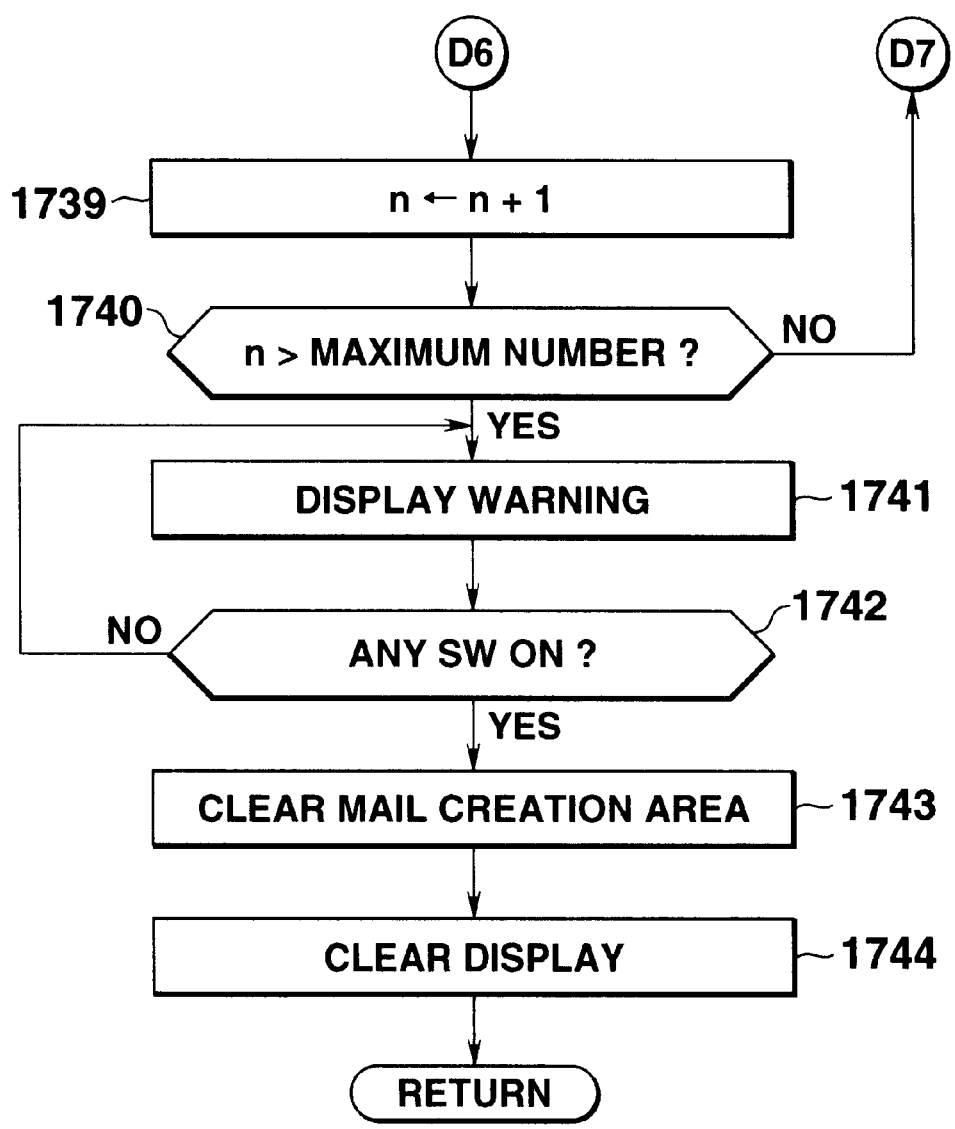
FIG. 20 is a flowchart for operation of mail creation processing (continuation 3)

On the other hand, at step 1739 of FIG. 20 which is executed when a determination result at step 1734 is NO, a value of the variable "n" is incremented by one. At step 1740, which follows step 1739, it is determined whether or not a value of the variable "n" is larger than the maximum number of mails which can be stored in the transmitted mail area. If there is available no room for storing new data in the transmitted mail area, in which a determination result is YES, program flow goes to step 1741. If there is available room for the storage, in which a determination result is NO, program flow returns to step 1734 of FIG. 19.

At step 1741, there is displayed a warning to the effect that no room for storage of new data is available in the transmitted mail area. The display is kept until one of the switches constituting the keyboard 202 is operated. Thereafter, if one of the switches has been operated, program flow goes to step 1743 and the mail creation area is cleared. At step 1744, which follows step 1743, there is cleared is a display on the screen 201 and a series of processings are terminated.

Figure 21:
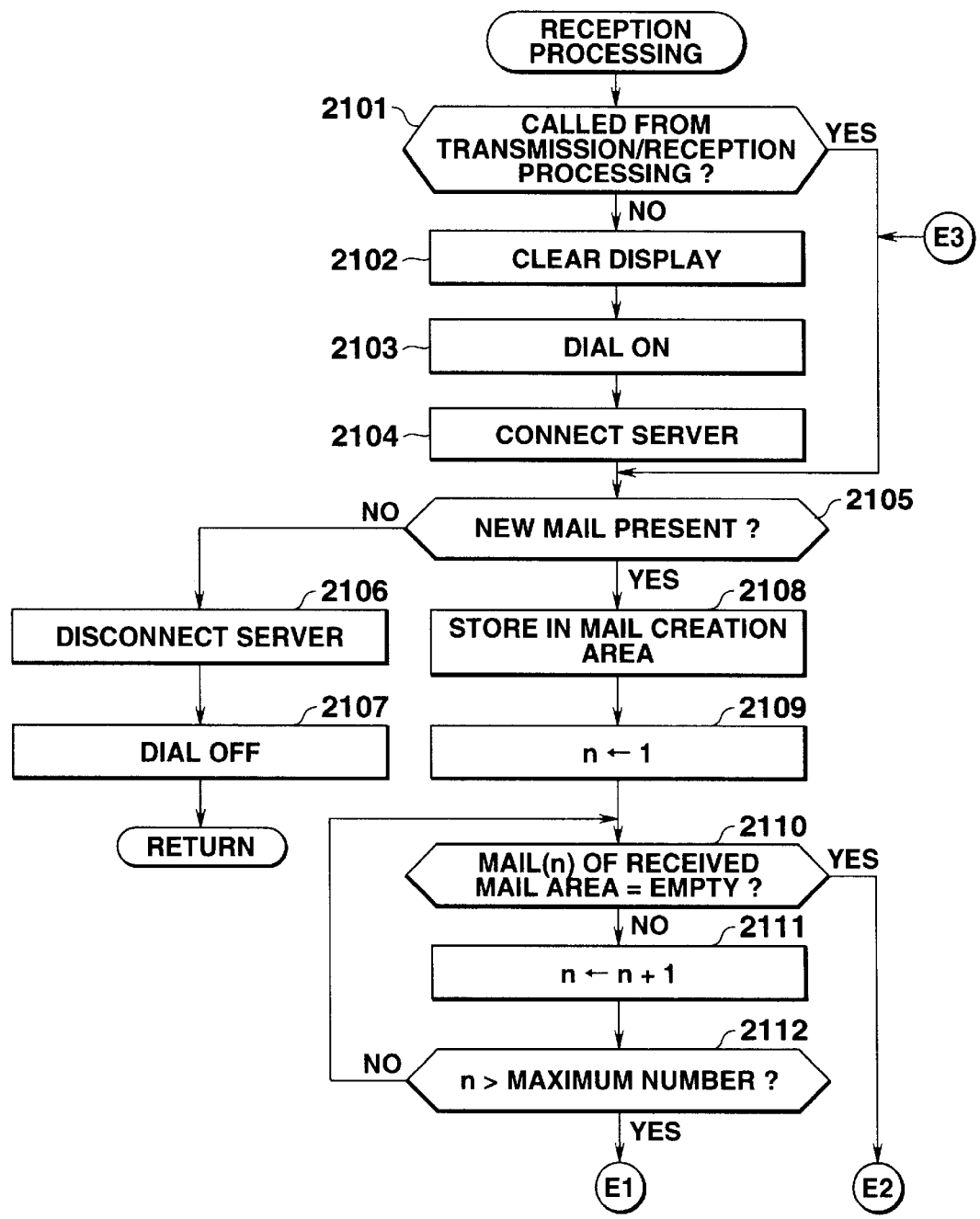
FIG. 21 is a flowchart for operation of reception processing.
Figure 22:
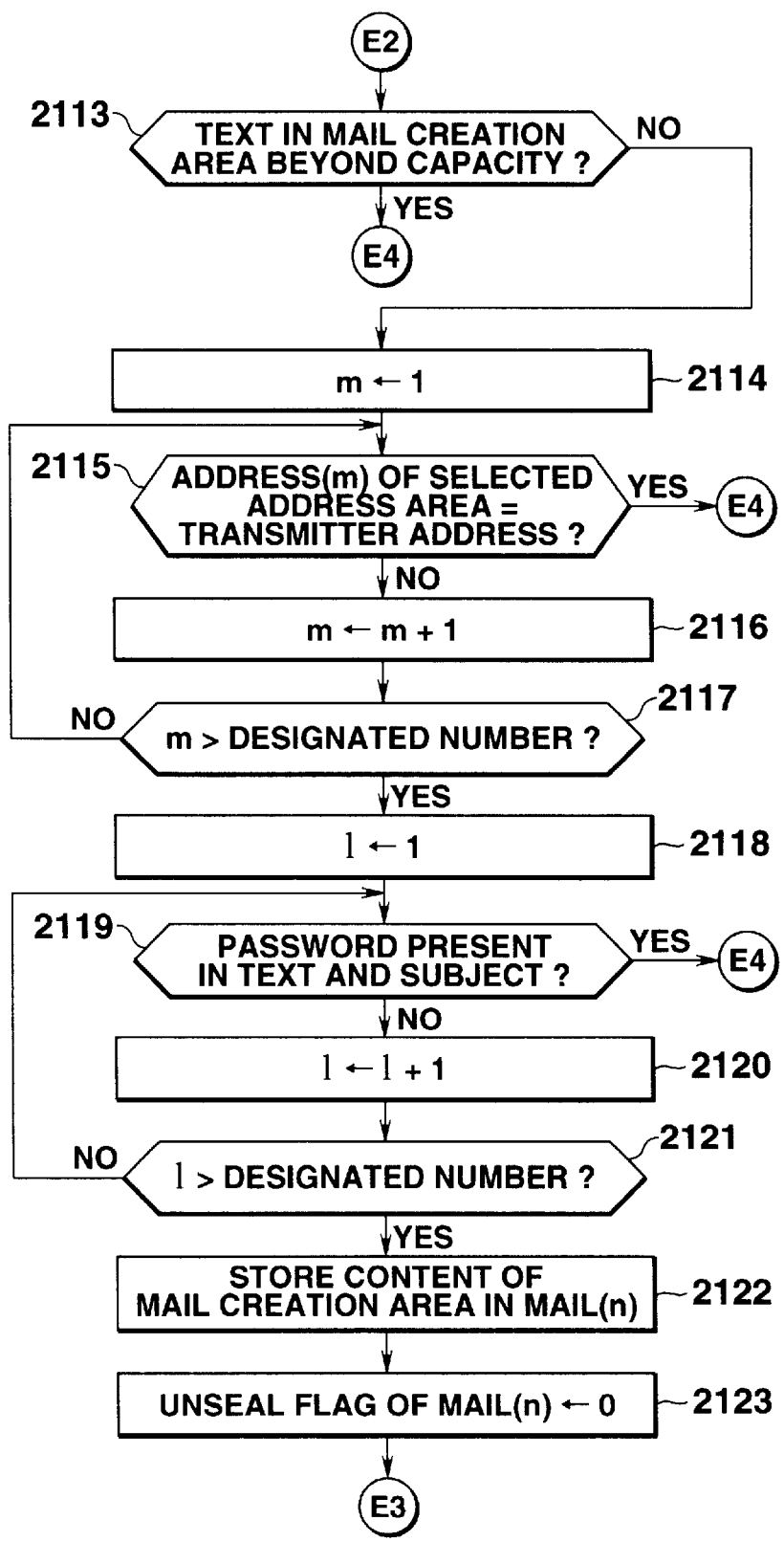
FIG. 22 is a flowchart for operation of reception processing (continuation 1)
Figure 23:
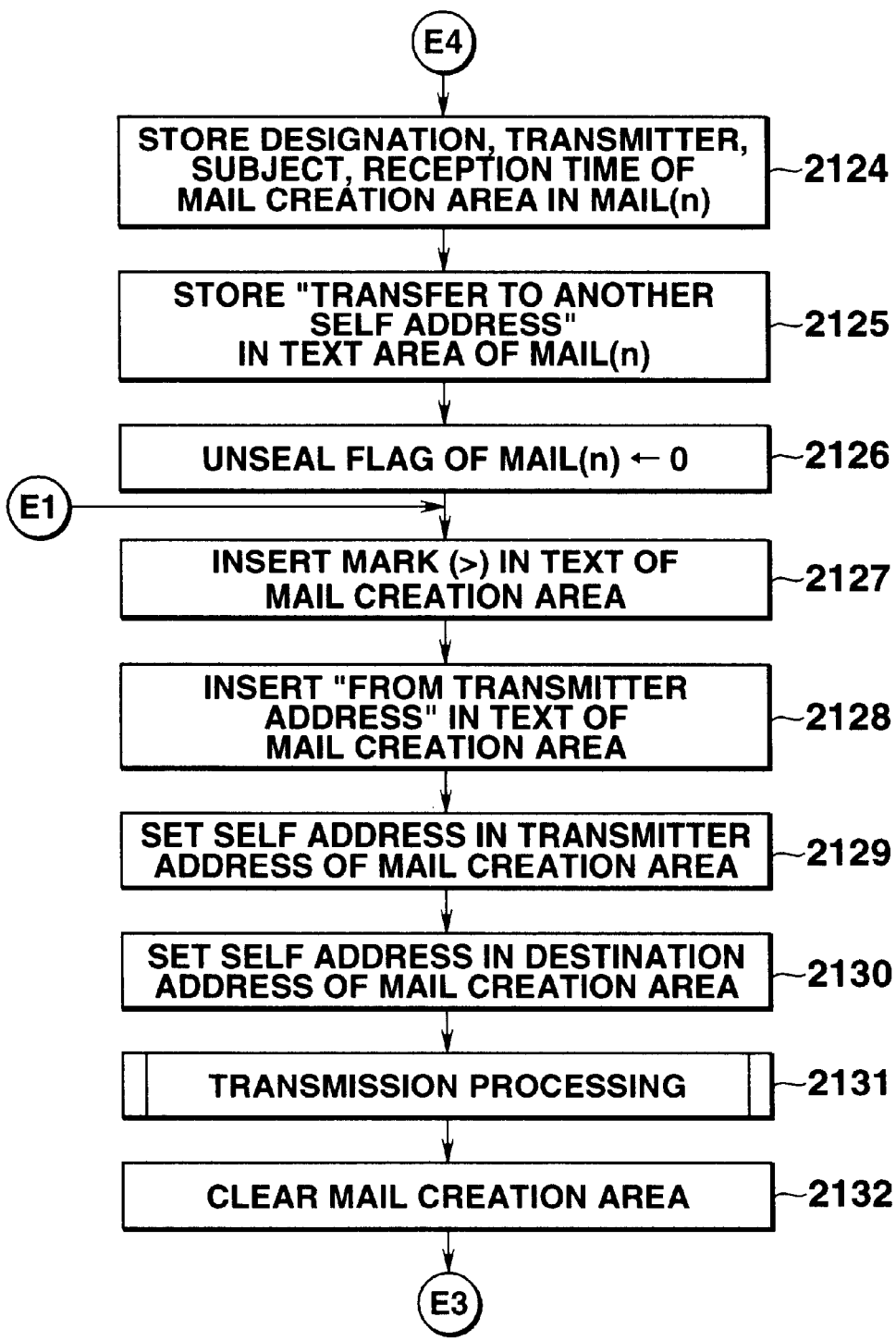
FIG. 23 is a flowchart for operation of reception processing (continuation 2)

FIGS. 21 to 23 show a flowchart for operation of reception processing which is executed as step 1128 in the received mail list display processing. The details of the processing will be described with reference to FIGS. 21 to 23. The reception processing is called from transmission/reception processing described later except for the received mail list display processing.

First, at step 2101, it is determined whether or not the reception processing has been called from the transmission/reception processing. If the reception processing has not been called from the transmission/reception processing, that is in the received mail list display processing, a determination result is NO and program flow goes to step 2102. If the reception processing has been called from the transmission/reception processing, a determination result is YES and program flow goes to step 2105. In the latter case, a connecting state with the sever is already established as described later.

At step 2102, there is cleared a display on the screen 201. At step 2103, which follows step 2102, there is performed a request, with a center, for connection (call origination) with the other party (a server side) at a dial number which is set in advance. If the connection has been permitted, program flow goes to step 2104 and the connection with the server is achieved. Thereafter, program flow goes to step 2105. On the contrary, if the connection has not been permitted, a series of processings are terminated.

Newly received mails, which are stored in the server, are processed (received) one by one by executing step 2105 through the following steps thereof.

At step 2105, it is determined whether or not there is present a newly received mail by accessing to the server. If the server has a new electronic mail whose mail address is that which a user has, in which a determination result is YES, program flow goes to step 2108. If the server does not have the new electronic mail, in which a determination result is NO, program flow goes to step 2106.

At step 2106, since there is no newly received mail, connection with the server is disconnected and at step 2107, which follows step 2106, there is performed a request for line disconnection with the center. Thereby, after the disconnection of line is completed a series of processings are terminated.

At step 2108, on the other hand, a newly received mail is downloaded and stored in the mail creation area in the RAM 103. At this time, the newly received mail is downloaded together with a reception time if the server receives the mail. At step 2109, which follows step 2108, "1" is substituted in the variable "n". Thereafter, program flow goes to step 2110. The variable "n" is used for detection of a storage area for the downloaded mail in the received mail area.

At step 2110, it is determined whether or not the MAIL(n) of the received mail are specified by a value of the variable "n" is empty. If the MAIL(n) is not empty, in which a determination result is NO, program flow goes to step 2111. If the MAIL(n) is empty, in which a determination result is YES, program goes to step 2113 of FIG. 22.

At step 2111, a value of the variable "n" is incremented by one. At step 2112, which follows step 2111, it is determined whether or not a value of the variable "n" is larger than the maximum number of data MAIL (data of an electronic mail) which can be stored in the received mail area. If the value of the variable "n" is larger than the maximum number, in which a determination result is YES, program flow goes to step 2127 of FIG. 23. If the value of the variable "n" is not larger than the maximum number, in which a determination result is NO, program flow returns to step 2110.

At step 2113 of FIG. 22 which is executed if a determination result at step 2110 is NO, that is if data MAIL in the maximum number are not stored in the received mail area, it is determined whether or not a data volume of a mail text downloaded in the mail creation area is larger than a predetermined data volume. If the data volume of the text is larger than the predetermined volume, in which a determination result is YES, program flow goes to step 2124 of FIG. 23. If the data volume of the text is not larger than the predetermined volume, in which a determination result is NO, program flow does to step 2114.

At step 2114, "1" is substituted in a variable "m". In a processing loop formed from step 2115 to step 2117, there is performed detection of a mail address which coincides with a mail address of a transmitter of a downloaded electronic mail by comparison of the mail address of a transmitter with a mail address of ADDRESS(m) specified by a value of the variable "m" in the selected address area shown in FIG. 7 while a value of the variable "m" is incremented. If a mail address which coincides with the transmitter mail address is detected in the selected address area before the processing loop has been repeated in the number of times which are designated in advance (the maximum number of data which can be stored in the selected address area), in which a determination result at step 2115 is YES, program flow goes step 2124 of FIG. 23. If a mail address which coincides with the transmitter mail address has not been detected in the selected address area after the processing loop is repeated in the designated number of times, in which a determination result at step 2117 is YES, program flow goes to step 2118.

At step 2118, "1" is substituted in a variable "1." In a processing loop from step 2119 to step 2121, which follows step 2118, it is determined whether or not there is present a word which coincides with a password (keyword) stored in PASSWORD(1) specified by a value of the variable "1" of the password area shown in FIG. 8, in a subject and text of a downloaded electronic mail, while a value of the variable "1" is incremented. If it is determined that the word which coincides with a password stored in the password area in the subject or the text before the processing loop is repeated in the predetermined number (the maximum of data to be stored in the password area), in which a determination result at step 2119 is YES, program flow goes to step 2124 of FIG. 23. If, though the processing loop is repeated in the predetermined number, the word which coincides with a password stored in the password area is not detected in the subject or the text, in which a determination result at step 2121 is YES, program flow goes to step 2122.

At step 2122, a content stored in the mail creation area is stored in the received mail area as data MAIL(n). At step 2123, which follows step 2122, "0" which indicates not being unsealed is stored in the data MAIL(n) as an unseal flag. Thereafter, program flow goes to step 2105 of FIG. 21.

If a determination result at step 2115 is YES, that is if it is determined that a mail address which coincides with a transmitter mail address is detected in the selected address area, or if a determination result at step 2119 is YES, that is if it is determined that a word which coincides with a password stored in the password area is detected in the subject or the text, steps 2124 to 2132 of FIG. 23 are in succession executed. By executing steps 2124 to 2132, a mail downloaded in the mail creation area is transferred to another mail address.

First of all, at step 2124, data which are stored in the mail creation area: a destination address, a transmitter address, a subject and a reception time, are stored in the received mail area as data MAIL(n). At step 2125, which follows step 2124, data of a sentence showing a transmitted side is stored as text data of data MAIL(n). As for the sentence, if the transmitted side is another address which a user has, for example, there is stored a sentence "transfer to another self address". After such a sentence is stored as data of the text, program flow goes to step 2126 and "0" is stored in the unseal flag in the data MAIL(n). Thereafter, program flow goes to step 2127.

At step 2127, a mark ">" is inserted in the text of the mail creation area. The mark ">" is inserted, for example, at the end of text data. At step 2128, which follows step 2127, a sentence data is inserted at the position following the mark ">", the sentence showing the destination address to which the mail is transferred. As the sentence, for example, "from another self mail address of the transmitter" is inserted. Thereafter, program flow goes to step 2129.

At step 2129, a self address is set in the transmitter mail address of the mail creation area. At step 2130, which follows step 2129, another self address of a user is set in the destination address of the mail creation area. In such a way, after data of a transmitter and a destination are stored in the mail creation area, program flow goes to step 2131 and transmission processing is executed. After execution of the transmission processing, the mail creation area is cleared at step 2132 and subsequently program flow returns to step 2105 of FIG. 21.

In the mean time, if a determination result at step 2112 of FIG. 21 is YES, that is if no empty area for a downloaded mail is available in the received mail area, then, program flow goes to step 2127 of FIG. 23. For this reason, in that case, data of the downloaded mail is not stored in the received mail area at all but transferred to a transfer address.

In the reception processing, a received mail has three processing examples in a broad sense. In a first processing example, a received mail is simply stored in the received mail area. In a second processing example, a received mail is transferred to a preset transfer address since there is available no room to store data in the received mail area. In a third processing example, a received mail is transferred if the mail meets a transfer condition (here, determined based on a transmitter mail address or a password (keyword) which is registered by a user) and as data of the mail, only bibliographical items (here, a receiver address, a transmitter address, a subject and a reception time) are stored in the received mail area. Priorities among the three processing example are decreased in the order of the second processing example, the third processing example and the first processing example.

By processing a received mail using the second processing example, even though a received mail cannot be stored in the received mail area because of no empty area available for storage, a user can read the received mail with ease by another device which can be used by the user. By processing a received mail using the third processing example, a received mail is automatically selected and a user can read the mail in a place, which is desirable for the reading. To be concrete, a private mail sent to a mail address, which is used for a business purpose, can automatically be transferred to a mail address, which the user has for a private purpose. At this time, since bibliographical items are left behind in a portable electronic terminal, a user can be provided with whether or not there is present a received mail, if yes a transmitter address, and in addition an summary content of the mail. In any of the second and third processing examples, if a user receives a mail addressed to one of the other parties than a user, the user can automatically transfer the mail to the one of the other parties. Such being the cases, in any case, there can be improved operability and a degree of convenience of a portable electronic mail apparatus.

In the embodiment, a mail, which has a large text volume, is processed in the second processing example. Thereby, a specified number of mails (data MAIL) can be stored in the received mail area with certainty and a user can keep a substantially more number of mails back in a portable electronic mail apparatus.

Figure 24:
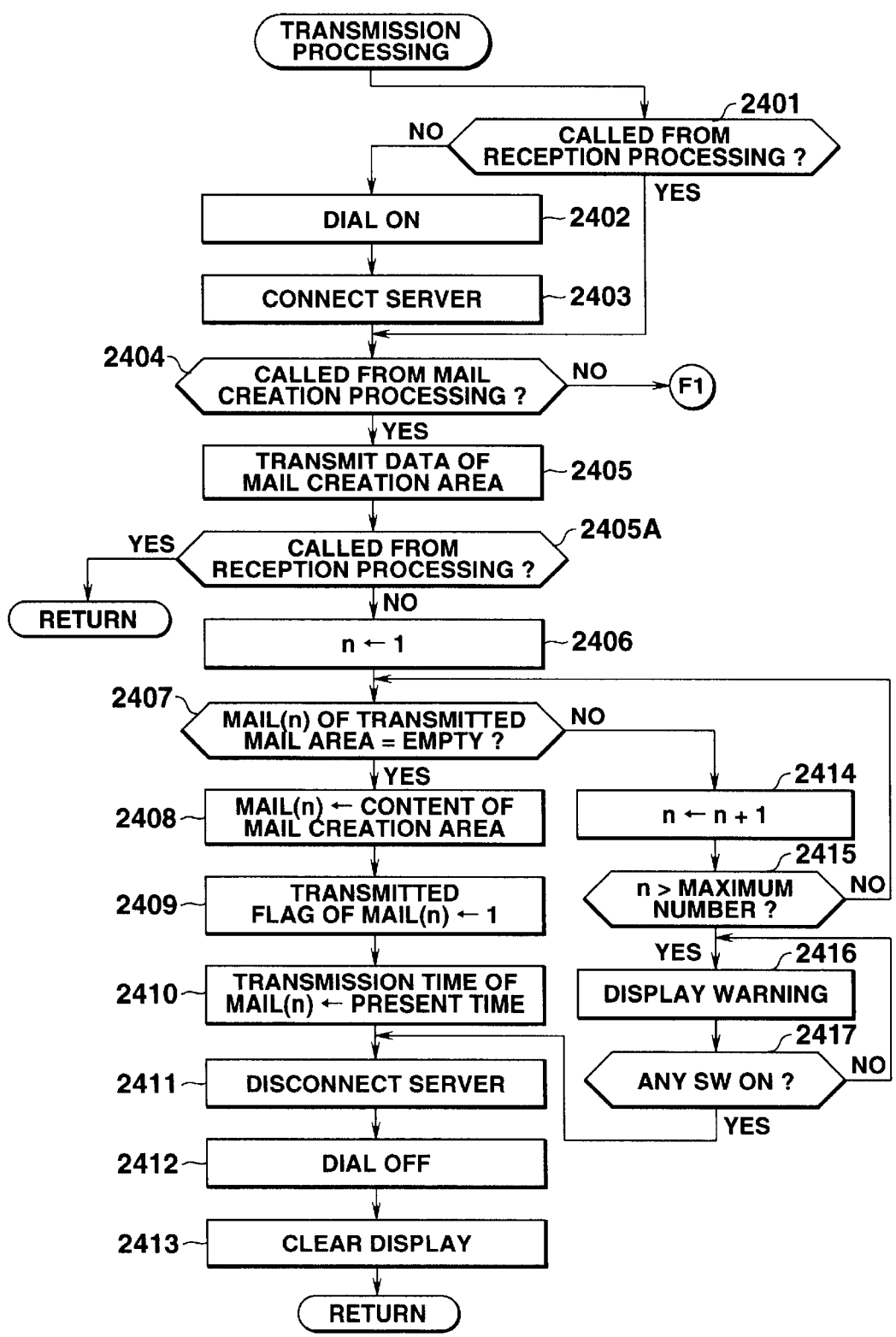
FIG. 24 is a flowchart for operation of transmission processing.
Figure 25:
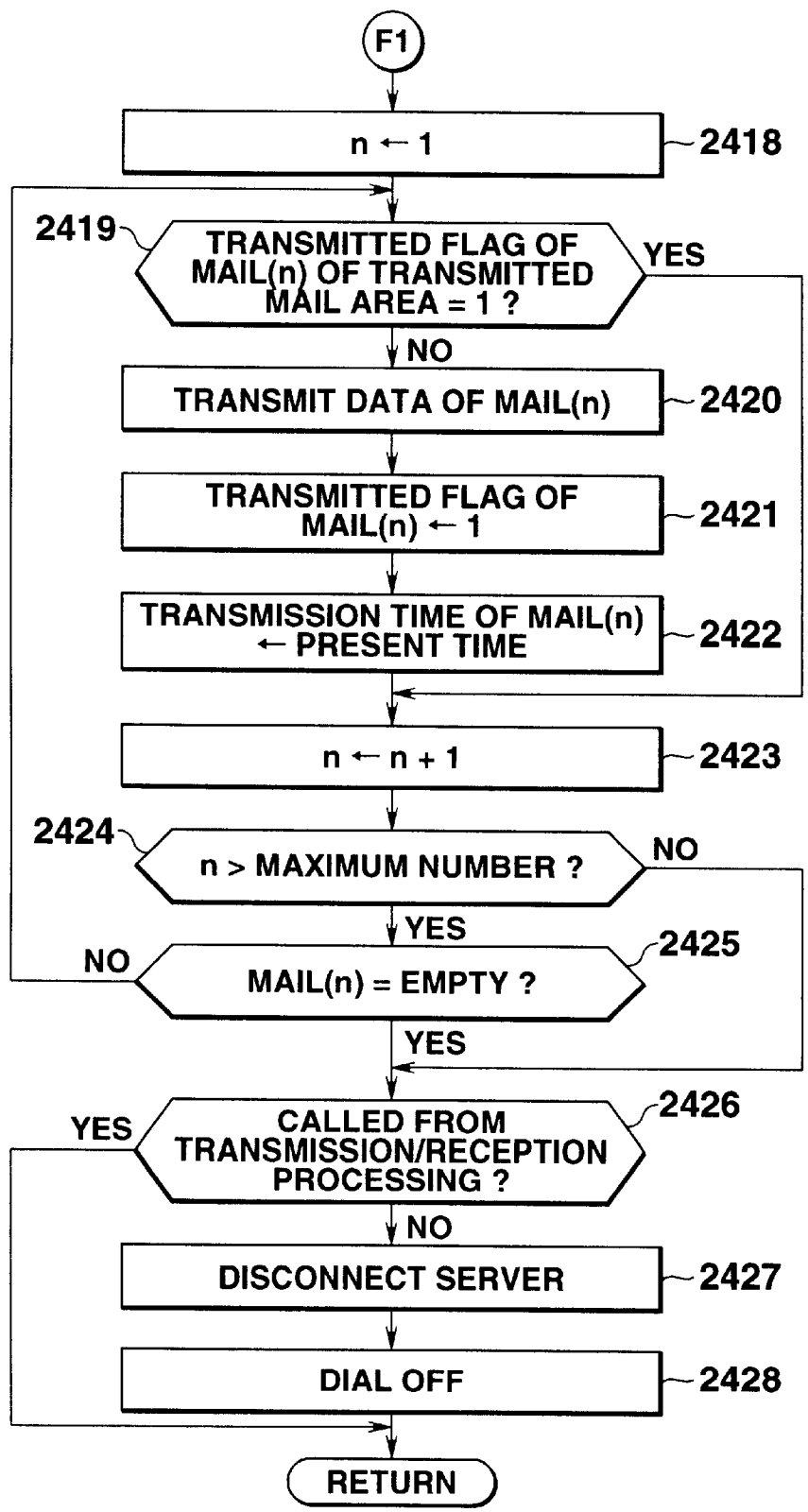
FIG. 25 is a flowchart for operation of transmission processing (continuation)
Figure 26:
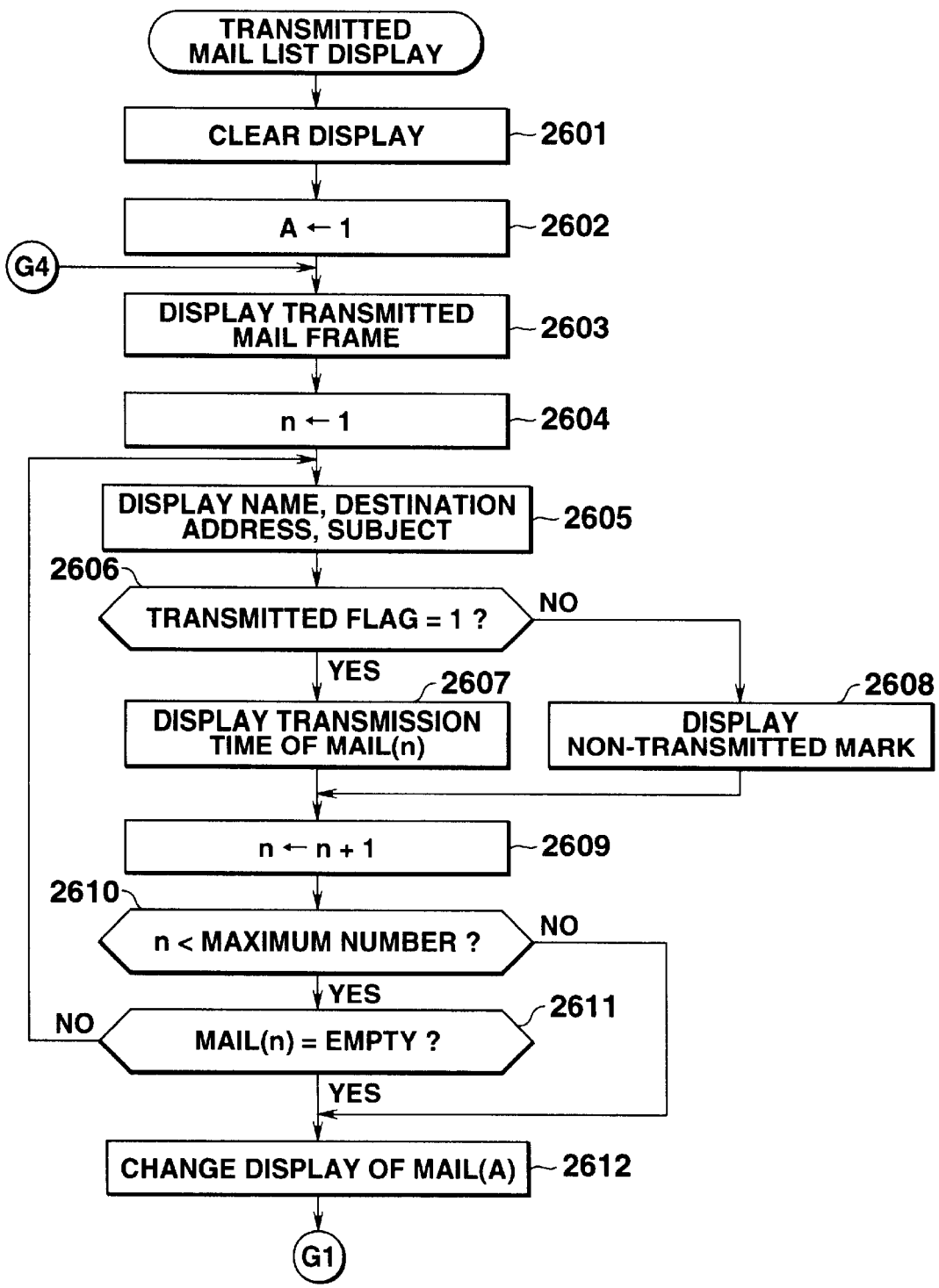
FIG. 26 is a flowchart for operation of transmitted mail list display processing.
Figure 27:
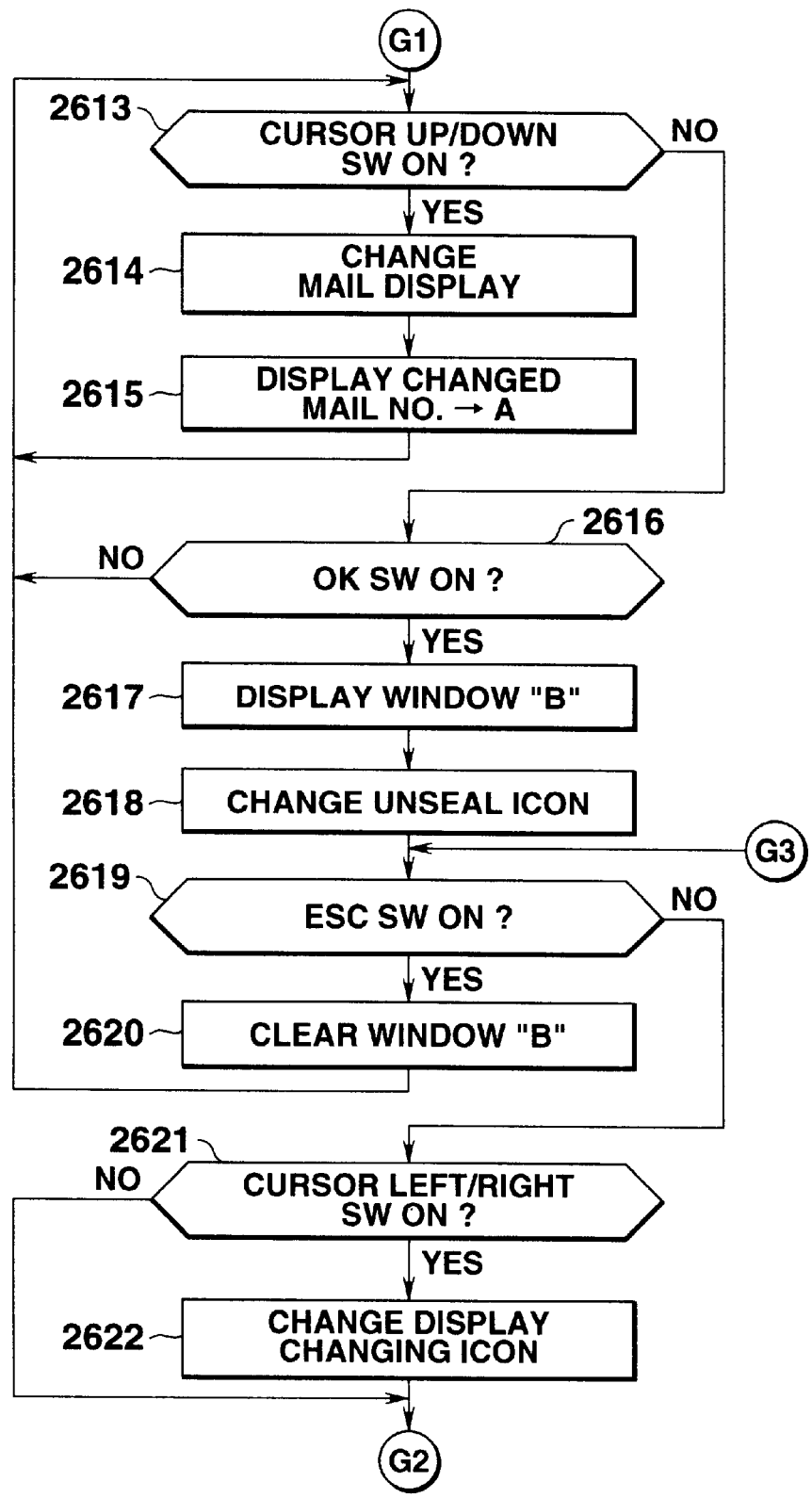
FIG. 27 is a flowchart for operation of transmitted mail list display processing (continuation 1)
Figure 28:
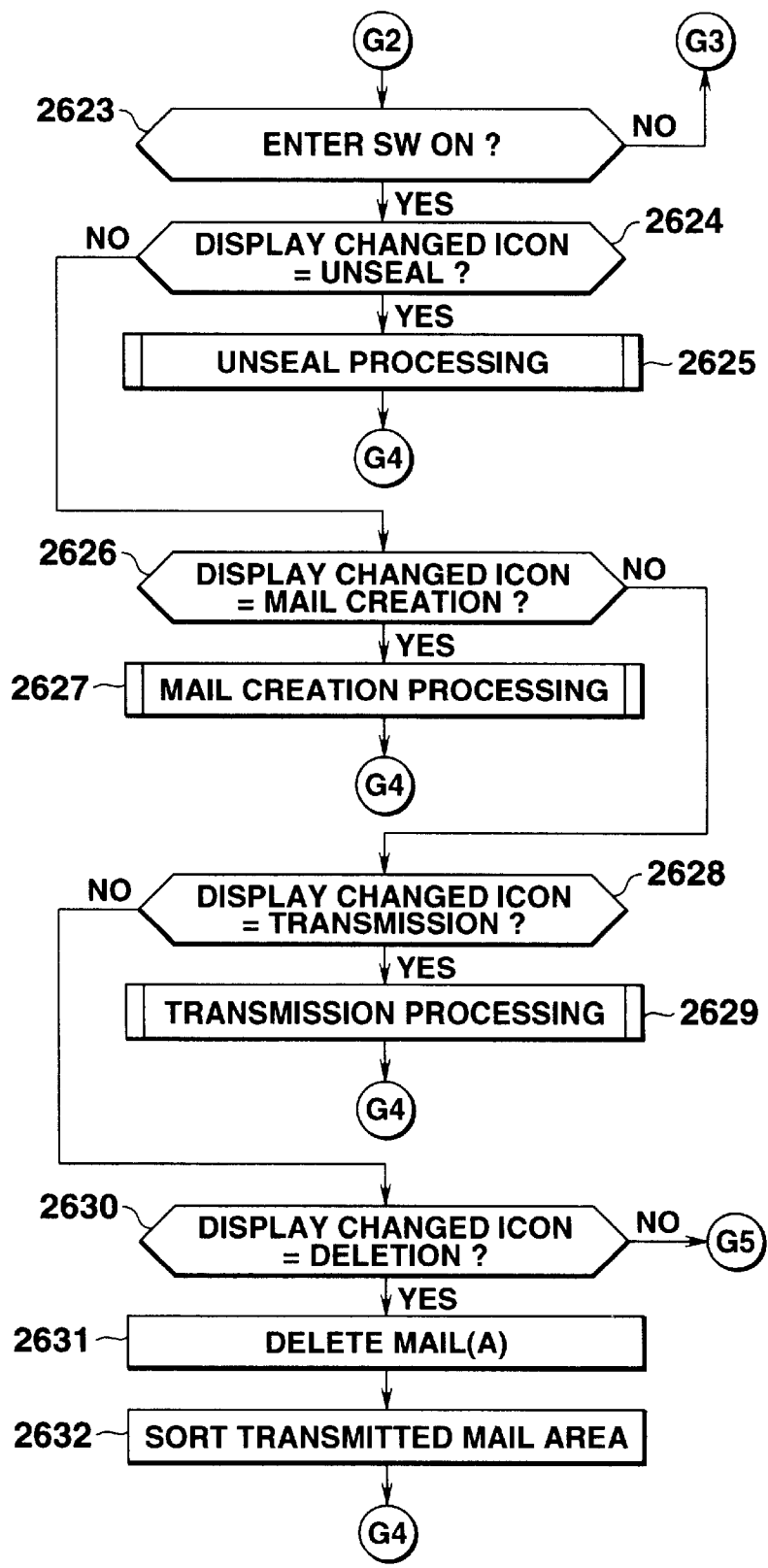
FIG. 28 is a flowchart for operation of transmitted mail list display processing (continuation 2)

FIGS. 24 and 25 are a flowchart for operation of transmission processing executed as step 2137 in the reception processing. Then, the transmission processing will, in detail, be described with reference to FIGS. 24 and 25. The transmission processing is called from the mail creation processing, transmitted mail list display processing and the transmission/reception processing, described later, except for the reception processing.

The transmission processing is to realize procedures in which not only data stored in the mail creation area is transmitted as a mail to a mail address which is designated as a receiver address, but the data is stored in the transmitted mail area.

At step 2401, it is determined whether or not the transmission processing has been called from the reception processing. If the transmission processing has been called from the reception processing, in which a determination result is YES, program flow goes to step 2404. If the transmission processing has not been called from the reception processing, in which a determination result is NO, program flow goes to step 2402. In the former case (a determination result is YES), connection with a server is already established, as described above.

At step 2402, a call origination request is issued to a center for connecting with the other party (a server side) at a dial number, which is set in advance. If the connection has been permitted, program flow goes to step 2403 and the connection with the server is achieved. Thereafter, program flow goes to step 2404. On the contrary, if the connection has not been permitted, a series of processings are terminated.

At step 2404, it is determined whether the transmission processing has been called from the mail creation processing or by the reception processing. If an object for transmission is data of the mail creation area, in which a determination result is YES, program flow goes to step 2405. If an object for transmission is not data of the mail creation area, in which a determination result is NO, program flow goes to step 2418 of FIG. 25.

At steps 2405 to 2413, there are performed a series of processings associated with transmission of a mail downloaded or an input content by a user on the mail creation image shown in FIG. 53.

First, at step 2405, data, which is stored in the mail creation area, is transmitted as a mail. At step 2405A, which follows step 2405, it is determined whether or not the transmission processing has been called from the reception processing. If the transmission processing has been called from the reception processing, in which a determination result is YES, a series of processings are terminated (in this time, a state is that reservation of data pertaining to a downloaded mail is already completed). If the transmission processing has not been called from the reception processing, in which a determination result is NO, program flow goes to step 2406.

At step 2406, "1" is substituted in the variable "n" which is used for detection of a storage area in which transmitted data is stored. Thereafter, program flow goes to step 2407. Data transmission is performed by the CPU 101 sending data stored in the mail creation area to the modem 106.

At step 2407, it is determined whether or not MAIL(n) of transmitted mail area which is specified by a value of the variable "n" is empty. If the MAIL(n) is empty, in which a determination result is YES, program flow goes to step 2048. If the MAIL(n) is not empty, in which a determination result is NO, program flow goes to step 2414.

At step 2408, data stored in the mail creation area is restored in the transmitted mail area as data MAIL(n). Subsequently, "1" is set to the transmitted flag of the data MAIL(n) at step 2409 and the present time is set to the reception time of the data MAIL(n) at step 2410. By the storage of both, storage of data MAIL(n) for one mail in the transmitted mail area is completed.

Thereafter, at step 2411, the server is disconnected and at step 2412, which follows step 2411, a request for disconnection is issued to the center. If the server has been disconnected, program flow goes to step 2413, where a display on the screen 201 is cleared, and a series of processings are terminated.

At step 2407, on the other hand, if a determination result is NO, that is if data MAIL(n) specified by a value of the variable "n" is not empty, a processing loop formed by steps 2407, 2414 and 2415 is repeated until a determination result at step 2407 or step 2415 is YES. If no empty area for storage of new mail data is available in the transmitted mail area, in which a determination result at step 2415 is YES, program flow goes to step 2416. If a determination result at step 2407 is YES before a determination result at step 2415 is YES, program flow goes to step 2408, as described above.

At step 2416, since no empty area to store new data is not available in the transmitted mail area, a warning showing the fact is displayed on the screen 201. The display is continued on until any of switches of the keyboard 105 is operated (step 2417). If a user operates one of the switches after the warning is displayed, in which a determination result at step 2417 is YES, program flow goes to 2411.

Steps 2418 to 2428 of FIG. 25 are a series of processings executed if the transmission processing is called from subroutine processing other than the mail creation processing. Here, all data with the transmitted flag of "0", that is all data which has not been transmitted among data MAIL stored in the transmitted mail area are transmitted.

First, at step 2418, "1" is substituted in the variable "n". In a processing loop formed by steps 2419 to 2425, data MAIL with the transmitted flag of "0" among all the data MAIL stored in the transmitted mail area are sequentially transmitted with incrementing a value of the variable "n". At this time, "1" is stored in each transmitted flag of data MAIL which have been transmitted and the present time is also stored in the reception time of each of the data MAIL. If all mails with the transmitted flag of "0" have been transmitted from among all the data MAIL stored in the transmitted mail area, in which a determination result at step 2424 is NO or a determination result at step 2425 is YES, program flow goes out the processing loop and to step 2426.

At step 2426, it is determined whether or not the transmission processing has been called from the transmission/reception processing. If the transmission processing has been called from the transmission/reception processing, in which a determination result is YES, a series of processings are terminated. If the transmission processing has not been called from the transmission/reception processing, in which a determination result is NO, program flow goes to step 2427. In the transmission/reception processing, as described later, after the transmission processing is terminated, subsequently, the reception processing is executed.

At step 2427, the server is disconnected and at step 2428, which follows step 2427, a request for disconnection is issued to the center. Thereafter, a series of processings are terminated awaiting the line being actually disconnected.

FIGS. 26 to 29 show a flowchart for operation of transmitted mail list display processing which is executed as step 910 (FIG. 9) in the overall processing. Then, there will be detailed on the processing with reference to FIGS. 26 to 29.

If a function of the "reception record" icon is selected, a user can perform operations that the user reads a content of data MAIL stored in the transmitted mail area and transmits a newly created mail or a non-transmitted mail. The received mail list display processing is processing in which the operations are realized.

First of all, at step 2601, there is cleared a display on the screen 201. At step 2602, which follows step 2601, "1" is substituted in the pointer "A" which is a variable. The pointer "A" is here used for management of effective data MAIL(A) among data MAIL stored in the transmitted mail area. After "1" is substituted, program flow goes to step 2603. The clearing of a display on the screen 201 is performed by the CPU 101, for example, clearing a data storage area of an image data to be displayed on the screen 201 allotted in a memory of the display section 104.

After the function of the "reception record" has been selected, the transmitted mail list image is displayed as shown in FIG. 55. At step 2603, a screen frame of the image is displayed. At step 2604, which follows step 2603, "1" is substituted in the variable "n" for sequential display of lists of transmitted mails (data MAIL). Thereafter, program flow goes to step 2605.

In a processing loop formed by steps 2605 to 2611, there is presented a list of transmitted mails corresponding to a value of the variable "n" until no transmitted mail which is an object for the processing loop is left behind or until the number of transmitted mail lists displayed on the screen 201 reaches the maximum number which can be displayed thereon, while a value of the variable "n" is incremented.

Figure 5:
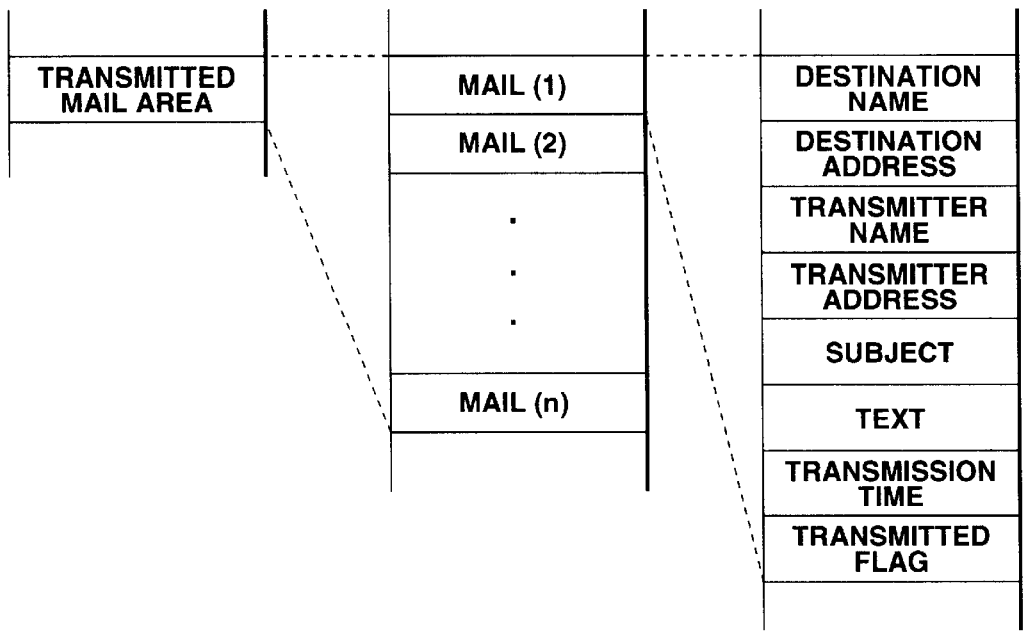
FIG. 5 is a representation showing a data structure of data stored in a transmitted mail area.

First of all, at step 2605, data MAIL(n) corresponding to a value of the variable "n" is read from the transmitted mail area shown in FIG. 5 in the RAM 103 and a name, a destination address and a subject in the data specified by a value of the variable "n" in display area are displayed on the screen 201.

At step 2606, which follows step 2605, it is determined whether or not a value of the transmitted flag in the data is "1". If data MAIL(n) has been transmitted, in which a determination result is YES, program flow goes to step 2607. If data MAIL(n) has not been transmitted, in which a determination result is NO, program flow goes to step 2608.

At step 2607, since the data has been transmitted, a transmission time is displayed. On the other hand, at step 2608, there is displayed a mark which indicates that the data has not been transmitted (non-transmitted mark, Δ shown in FIG. 55 is the mark). After step 2607 or step 2608 is terminated, program flow goes to step 2609.

At step 2609, a value of the variable "n" is incremented by one on the assumption that a display for one electronic mail has been completed. Thereafter, program flow goes to step 2610 and it is determined whether or not a value of the variable "n" is equal to or less than the maximum number of lists which can be displayed on the screen 201. If display of transmitted mail lists in the maximum number has been completed, in which a determination result is NO, program flow goes to step 2612. If display of transmitted mail lists in the maximum number has not been completed, in which a determination result is YES, program flow goes to step 2611.

At step 2610, it is determined whether or not data MAIL (n) corresponding to a value of the variable "n" is stored in the transmitted mail area. If the data is stored in the transmitted mail area, in which a determination result is NO, program flow returns to 2605. If the data is not stored in the transmitted area, in which a determination result is YES, program flow goes to 2612.

At step 2612, there is performed a change of a display state of a list specified by the pointer "A". Thereafter, program flow goes to step 2613 of FIG. 27. By termination at step 2612, display of a transmitted mail list after a function of the "transmission record" icon is selected is completed.

At step at step 2613 and steps thereafter, there is performed processing according to an operation of each of various kinds of switches by a user.

First, at step 2613, it is determined whether or not one of the upper and lower switches of the cursor switch 202 has been turned on. If a user has operated one of the upper and lower switches, in which a determination result is YES, program flow goes to step 2614. If a user has not operated any of the switches, in which a determination result is NO, program flow goes to step 2616.

At step 2614, a list which is made different in display state from others according to operation on the upper and lower switches is changed. At step 2615, which follows step 2614, a value of the pointer "A" is updated in response to the change of the list. The update is to change a value of a list whose display state is thus far different from others to a value of a list whose display date is newly made different. After the change is completed, program flow returns to step 2613.

On the other hand, at step 2616, it is determined whether or not the OK switch 203 has been turned on. If a user has operated the OK switch 203, in which a determination result is YES, program flow goes to step 2617. If a user has not operated the OK switch, in which a determination result is NO, program flow returns to step 2613.

At step 2617, there is displayed a window "B" shown in FIG. 56 on a transmitted mail list image shown in FIG. 55 in an overlapping manner. The window "B" is disposed thereon with, operation items each of which is applied on a electronic mail of a list which has been selected, as an object, if the OK switch 203 is operated, and a plurality of icons indicating the operation items which can be performed at the time in point. After the window "B" is displayed, program flow goes to step 2618 and a display state of the "unseal" icon is made different from others. Thereafter, program flow goes to step 2619.

After the window "B" is displayed, a user designates an operation content through an icon. There are realized designation of the operation content and operation of the designated content by execution of processing from step 2619 through steps thereafter.

At step 2619, it is determined whether or not the ESC switch 206 has been turned on. If a user has operated the ESC switch 206, in which a determination result is YES, program flow goes to step 2620. If a user has not operated the ESC switch 206, in which a determination result is NO, program flow goes to step 2621. At step 2620, a display of the window "B" is cleared on the assumption that a user does not perform operations indicated by the icons disposed on the window "B". Thereafter, program returns to step 2613.

At step 2621, it is determined whether or not one of the left and right switches of the cursor switch 202 has been turned on. If a user has operated one of the left and right switches, in which a determination result is YES, program flow goes to step 2622. If a user has not operated any of the switches, in which a determination result is NO, program flow goes to step 2623 of FIG. 28. At step 2622, an icon whose display state is made different from others is changed according to the left or right switch. Thereafter, program flow goes to step 2623.

At step 2623, it is determined whether or not the enter switch 204 has been turned on. If a user has operated the enter switch 204, in which a determination result is YES, program flow goes to step 2624. If a user has not operated the enter switch 204, in which a determination result is NO, program flow returns to step 2619 of FIG. 27.

At step 2624 and steps thereafter, there is specified an icon which has been selected (whose display state is made different from others) when a user operates the enter switch 204 and there is performed processing to realize a function assigned on the selected icon.

To be concrete, if a selected icon is the "unseal" icon, in which determination at step 2624 is YES, unseal processing at step 2625 is realized. If a selected icon is the "mail creation" icon, in which a determination result at step 2624 is NO and a determination result at step 2626 is YES, the mail creation processing at step 2627 is executed. If a selected icon is the "transmission" icon, in which determination results at steps 2624 and 2626 are NO, and in which a determination result at step 2628 is YES, the transmission processing at step 2629 is executed. After processing at steps 2625, 2627 or 2629 is completed, program flow returns to step 2603 of FIG. 26.

If the selected icon is the "deletion" icon, in which determination results at steps 2624, 2626 and 2628, are NO and in which a determination result at step 2630 is YES, program flow goes to step 2631.

At step 2631, there is performed deletion of data MAIL (A) of an electronic mail specified by the pointer "A." At step 2632, which follows step 2631, the transmitted mail area is sorted in response to the deletion. Thereafter, program flow returns to step 2603 of FIG. 26.

Figure 29:
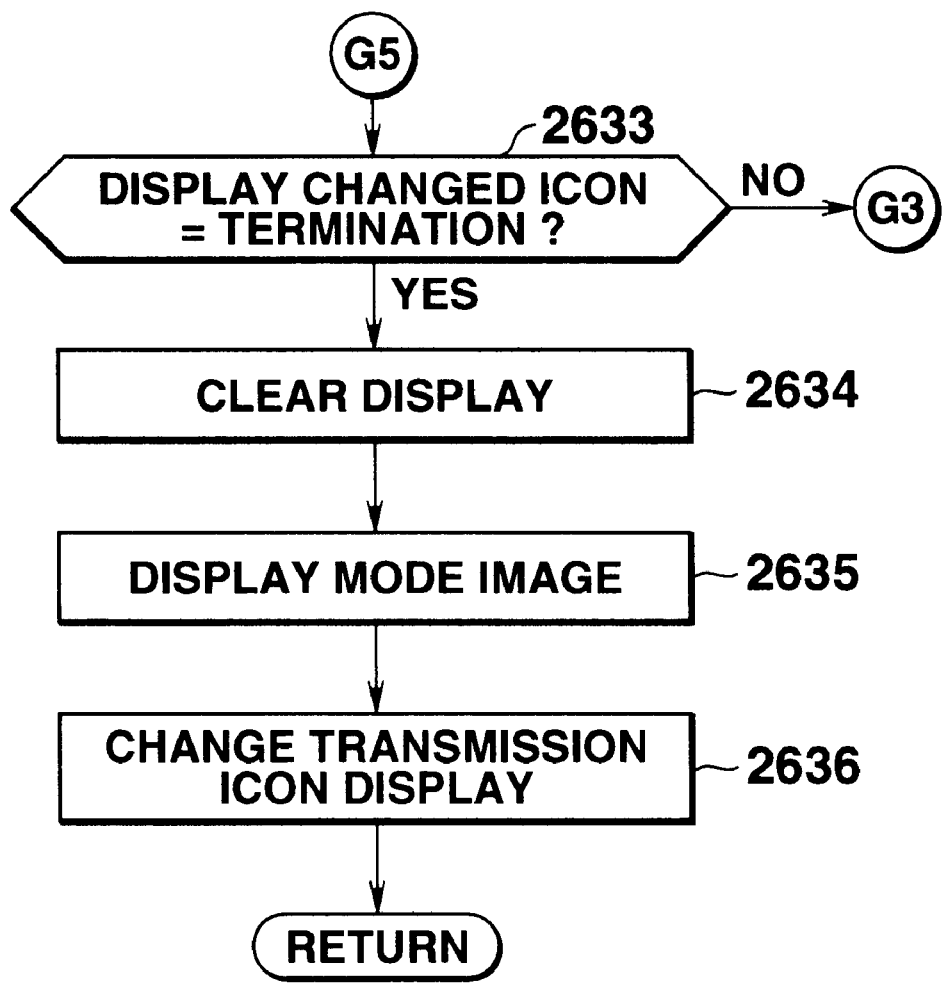
FIG. 29 is a flowchart for operation of transmitted mail list display processing (continuation 3)
Figure 30:
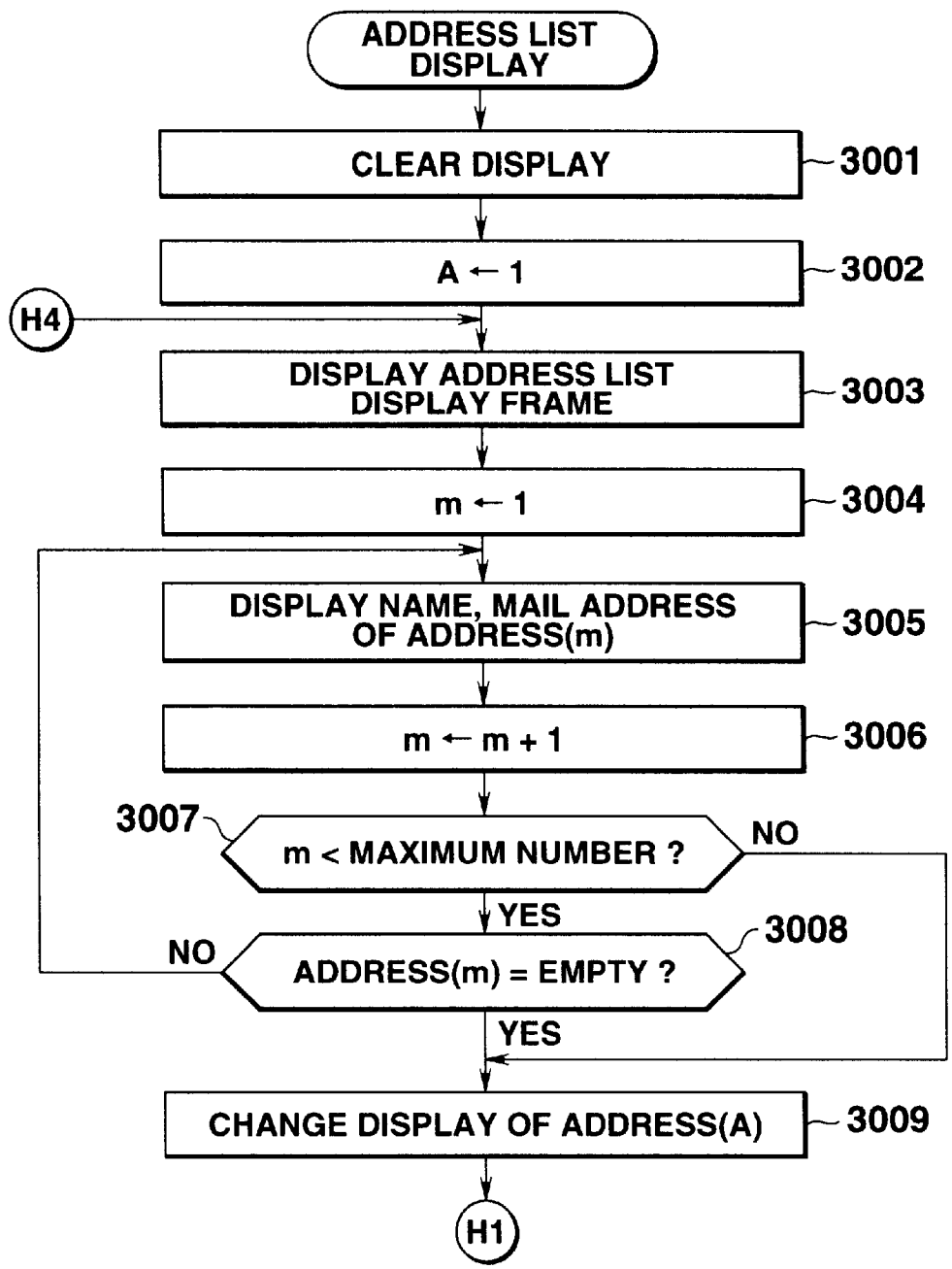
FIG. 30 is a flowchart for operation of address list display processing.
Figure 31:
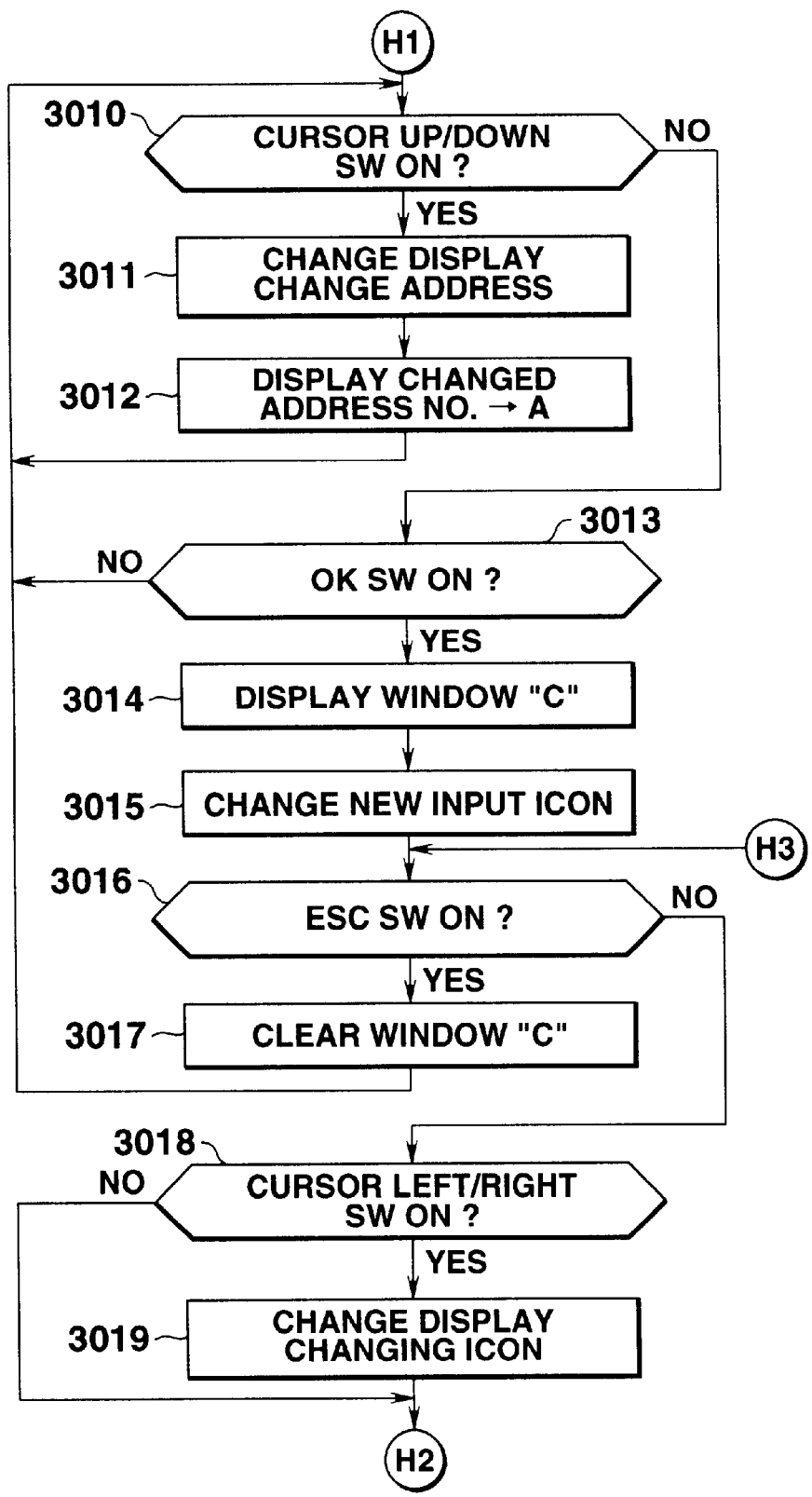
FIG. 31 is a flowchart for operation of address list display processing (continuation 1)
Figure 32:
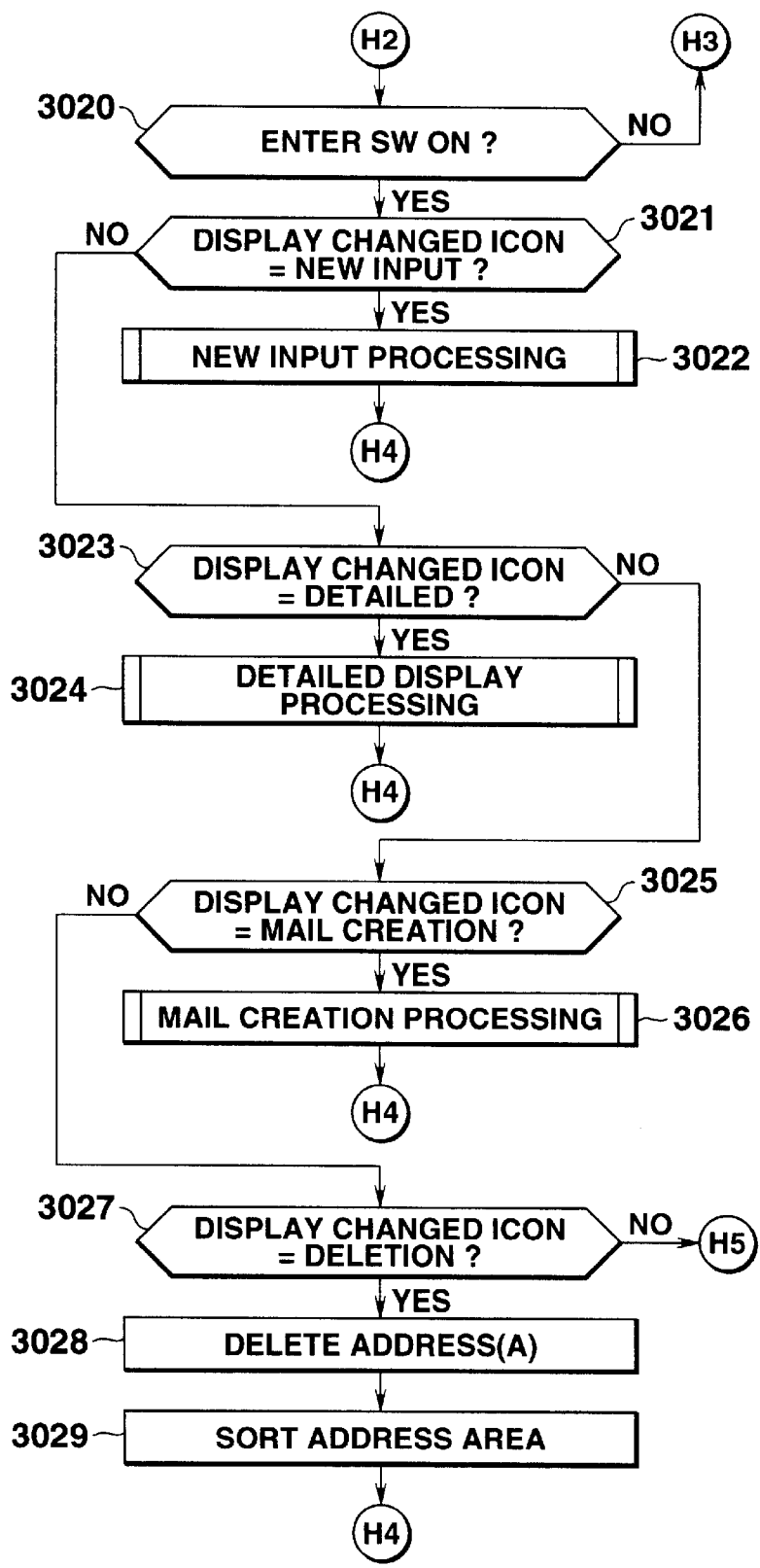
FIG. 32 is a flowchart for operation of address list display processing (continuation 2)

If the selected icon is the "termination" switch, in which determination results at steps 2624, 2626, 2628, and 2630 are NO and in which a determination result at 2633 of FIG. 29 is YES, program flow goes to 2634. At step 2634, a display currently shown on the screen 201 is cleared on the assumption that a user has instructed that there is terminated operation on a function allotted to the "transmission record" icon. Thereafter, a series of processings are terminated.

As described above, if a function of the "transmission record" icon is selected, a user can not only read a content of a transmitted mail but perform mail creation, reception, deletion of a transmitted mail and the like.

FIGS. 30 to 33 are a flowchart for operation of address list display processing executed as step 912 (FIG. 10) in the overall processing. Then, there will be detailed with reference to FIGS. 30 to 33. The address list display processing is called from the mail creation processing except for the overall processing.

If a function of the address list icon is selected, a user can perform not only reading of a content of data (address) stored in the address area shown in FIG. 6 and edit (change, deletion and new input) of data stored in the area, but also operations of mail creation and the like. The address list display processing is to realize the operations.

First, at step 3001, a display on the screen 201 is cleared. At step 3002, which follows step 3001, "1" is substituted in the pointer "A" which is a variable. The pointer "A" is here used for management of address data which are effective among address data stored in the address area. After "1" is substituted in the pointer "A", program flow goes to step 3003. Clearing of a display on the screen 201 is performed by the CPU 101, for example, clearing a storage area for image data which are presented on the screen 201, which are allotted in a memory of the display section 104.

Figures 57, 58:
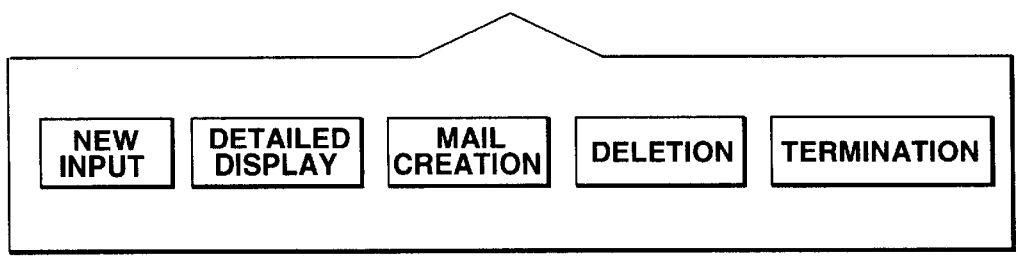
FIG. 57 is a representation showing an example of an address list image.
FIG. 58 is a representation showing an example of a window "C"

After a function of the address list icon is selected, an address list image, as shown in FIG. 57, is displayed. At step 3003, a screen frame of the image is displayed. At step 3004 which follows step 3003, "1" is substituted in the variable "m" for sequential display of address data stored in the address area. Thereafter, program flow goes to step 3005.

In a processing loop formed by steps from 3005 to 3008, name and a mail address of address data corresponding to a value of the variable "m" are displayed until there are available no address data which are an object for the processing loop or until the maximum number which can be displayed on the screen 201 is reached while a value of the variable "m" is incremented.

First, at step 3005, ADDRESS(m) corresponding a value of the variable "m" is read from the address area shown in FIG. 6 in the RAM 103 and name and a mail address of the data in a display area, specified by a value of the variable "m", are displayed on the screen 201.

At step 3006 which follows step 3005, a value of the variable "m" is incremented by one. Thereafter, program flow goes to step 3007 and it is determined whether or not a value of the variable "m" is equal to or less than the maximum number which can be displayed on the screen 201. If display of the maximum of address data lists has been completed, in which a determination result is NO, program flow goes to step 3009. If display of the maximum of address data lists has not been completed, in which a determination result is YES, program flow goes to step 3008.

At step 3008, it is determined whether or not ADDRESS (m) corresponding to a value of the variable "m" is empty. If the data are stored in the address area, in which a determination result is NO, program flow returns to step 3005. If the data are not stored in the address area, in which a determination result is YES, program flow goes to step 3009.

At step 3009, a display state of a list specified by a value of the pointer "A" is changed. Thereafter, program flow goes to step 3010 of FIG. 31. By finish at step 3009, there is completed display of an address list image presented after the selection of the address list icon.

At step 3010 and steps thereafter, there is performed processing according to operation on each switch by a user.

First, at step 3010, it is determined whether or not one of the upper and lower switches of the cursor switch 202 has been turned on. If a user has operated one of the upper and lower switches, in which a determination result is YES, program flow goes to step 3011. If a user has not operated any of the switches, in which a determination result is NO, program flow goes to step 3013.

At step 3011, a list (display area) whose display state is made different from others according to operation on the upper or lower switch is changed. At step 3012, a value of the pointer "A" is updated in response to the change. The update is performed by changing a value of a list whose display state is thus far made different from others to a value of a list whose display state is newly made different from others. After the change is completed, program flow returns to step 3010.

At step 3013, on the other hand, it is determined whether or not the OK switch 203 has been turned on. If a user has operated the OK switch 203, in which a determination result is YES, program flow goes to step 3014. If a user has not operated the OK switch, in which a determination result is NO, program flow returns to step 3010.

At step 3014, a window "C" shown in FIG. 58 is displayed on an address list image shown in FIG. 57 in an overlapping manner. The window "C" is disposed thereon with operation items each of which is performed on address data of a list, as an object, which has been selected if the OK switch is operated and a plurality of icons which indicate respective operation items which can be performed at that time in point. After the window "C" is displayed, program flow goes to step 3015 and a display state of the "new input" icon is made different from others. Thereafter, program flow goes to step 3016.

After the window "C" is displayed, a user designates an operation content through an icon. There are realized designation of an operation content and operation of the designated content are realized by executing processing from step 3016 through steps thereafter.

At step 3016, it is determined whether or not the ESC switch 206 has been turned on. If a user has operated the ESC switch 206, in which a determination result is YES, program flow goes to step 3017. If a user has not operated the ESC switch 206, in which a determination result is NO, program flow goes to step 3018. At step 3017, there is cleared a display of the window "C" on the assumption that a user has instructed that there are performed no operations indicated by an icon disposed in the window "C". Thereafter, program flow returns to step 3010.

At step 3018, it is determined whether or not one of the left and right switches of the cursor switch 202 has been turned on. If a user has operated one of the left and right switches, in which a determination result is YES, program flow goes to step 3019. If a user has not operated any of the switches, in which a determination result is NO, program flow goes to step 3020 of FIG. 32. At step 3019, an icon whose display state is made different from others according to operation on the right or left switch is changed. Thereafter, program flow goes to step 3020.

At step 3020, it is determined whether or not the Enter witch 204 has been turned on. If a user has operated the enter switch 204, in which a determination result is YES, program flow goes to step 3021. If a user has not operated the enter switch 204, in which a determination result is NO, program flow goes to step 3016 of FIG. 31.

At step 3021 and steps thereafter, processing is performed in which an icon (whose display state is made different from others) which has selected when a user operates the enter switch 204 is specified and a function which is assigned to the selected icon is realized.

To be concrete, if a selected icon is the "new input" icon, in which a determination result is YES, new input processing is executed at step 3022. If the selected icon is the "detailed display" icon, in which a determination result at step 3021 is NO and a determination result at step 3023 is YES, detailed display processing at step 3024 is executed. If the selected icon is the "mail creation" icon, in which determination results at steps 3021, 3023 are NO and a determination result at 3025 is YES, there is executed the mail creation processing at step 3026. After processings at steps 3022, 3024 and 3026 are completed or after processing at step 3026 is completed, program flow returns to step 3003 of FIG. 30.

If the selected icon is the "deletion" icon, in which determination at steps 3021, 3023 and 3025 are NO and a determination result at step 3027 is YES, program flow goes to step 3028. At step 3028, there is performed is deletion of ADDRESS(A) specified by a value of the pointer "A". At step 3029, which follows step 3028, the address area is sorted in response to the deletion. Thereafter, program flow returns to step 3003 of FIG. 30.

Figure 33:
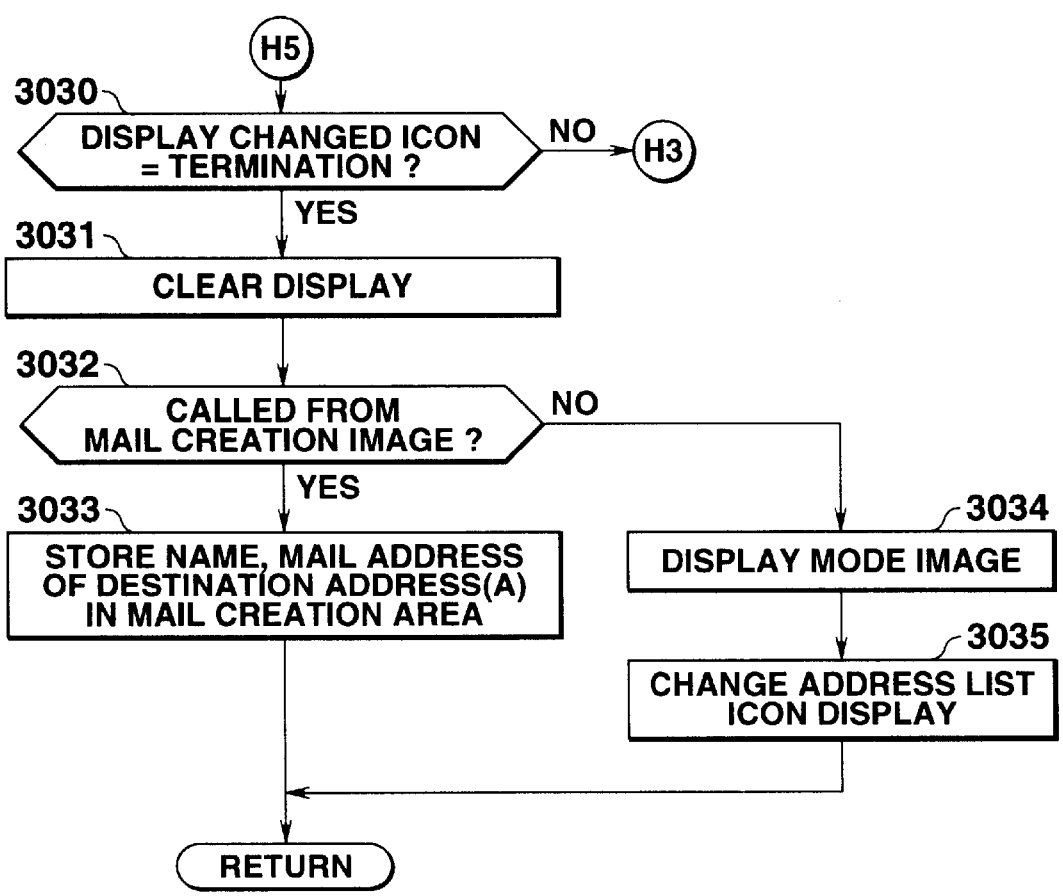
FIG. 33 is a flowchart for operation of address list display processing (continuation 3)
Figure 34:
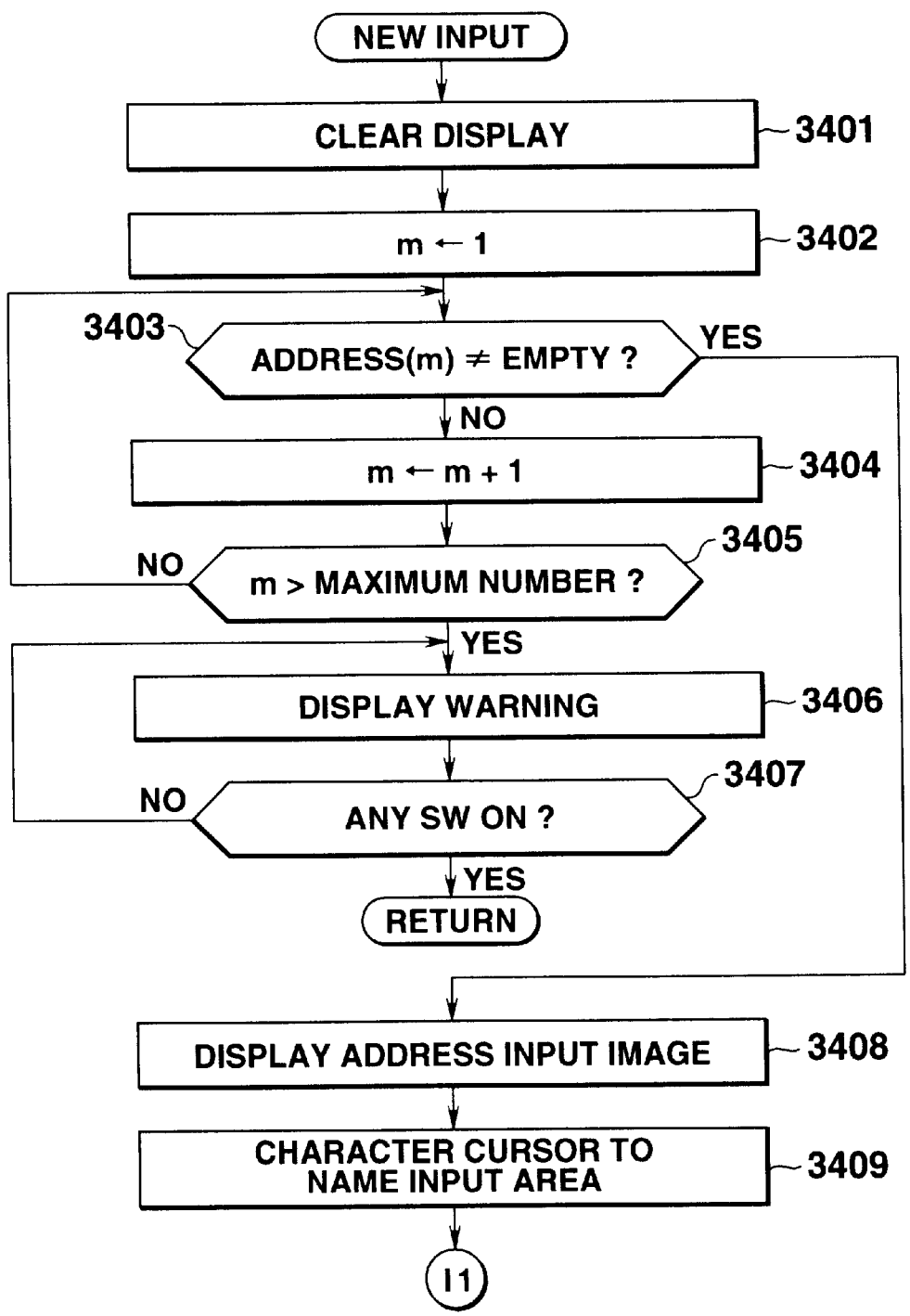
FIG. 34 is a flowchart for operation of new input processing.
Figure 35:
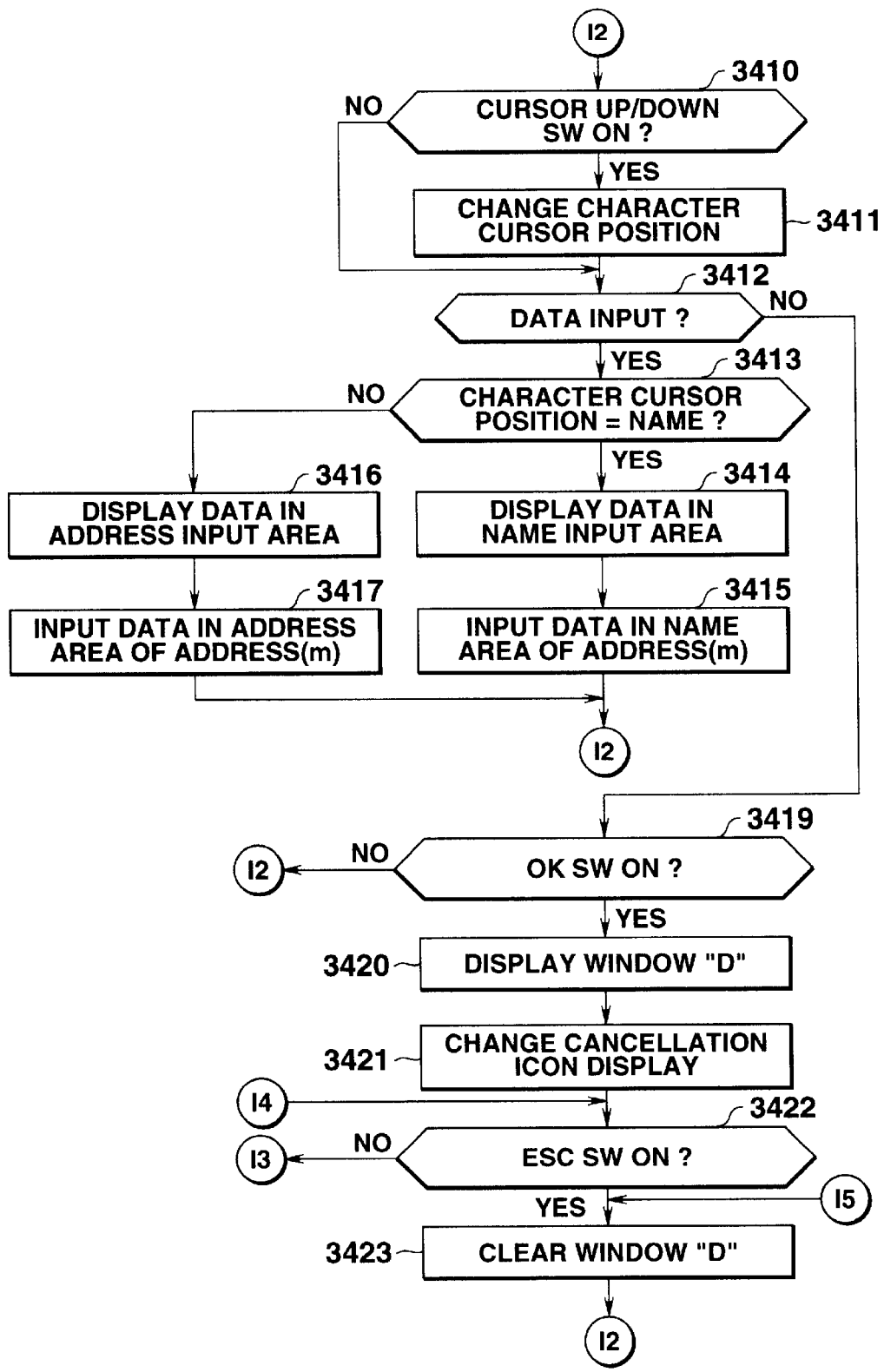
FIG. 35 is a flowchart for operation of new input processing (continuation 1)

If the selected icon is the "termination" icon, in which determination results at steps 3021, 3023, 3025 and 3027 are NO and a determination result at step 3030 of FIG. 33 is YES, program flow goes to step 3031. At step 3031, a display of an image currently presented on the screen 201 is cleared on the assumption that a user has instructed termination of operation on an allotted function of the "address" icon. Thereafter, program flow goes to step 3032.

At step 3032, it is determined whether or not the address list display processing is called from the mail creation processing. If a user has operated the enter switch 204 in a condition that the address list icon is the selected icon after there is displayed the window "F" shown in FIG. 54 on the mail creation image shown in FIG. 53 in an overlapping manner, in which a determination result is YES, program flow goes to step 3033. If a user has not operated the enter switch 204 in the condition after the display in an overlapping manner, in which a determination result is NO, program flow goes to step 3034.

At step 3033, name and a mail address of a list, (ADDRESS(A)) which has been selected (which has been effective) when the OK switch 203 is operated, are displayed and the name and the mail address are stored in the mail creation area. Thereafter, a series of processings are terminated.

At step 3034, on the other hand, the mode selection image shown in FIG. 2 is displayed. At step 3035, which follows step 3034, a display state of the address list icon is made different from others. A series of processings are terminated thereafter.

Then, there will be detailed subroutine processing to be executed in the address list display processing with reference to FIGS. 34 to 39.

FIGS. 34 to 39 are a flowchart for operation of new input processing executed as step 3022 in the address list display processing. Then, the processing will be detailed with reference to FIGS. 34 to 36.

The new input processing is processing in which data to be stored in the address area is input and the input data is stored as new address data in the address area.

First, at step 3401, a display on the screen 201 is cleared. At step 3402, which follows step 3401, "1" is substituted in the variable "m". Thereafter, by execution of a processing loop formed by steps 3403 to 3405, it is determined whether or not ADDRESS(m) corresponding to a value of the variable "m" is empty while a value of the variable "m" is incremented. If an empty area has been found in the address area as a result of the execution of the processing loop, in which a determination result is YES, processing goes out the processing loop to step 3408.

If a value of the variable "m" has been increment until the number of address data exceeds the maximum number of the data which can be stored in the address area, in which a determination result at step 3405 is YES, program flow goes to step 3406.

At step 3406, warning showing the fact that no empty area for storage of new data is available in the address area is displayed. The warning display is kept on until a determination result is YES at step 3407, by operation of a user on one of the switches of the keyboard 105. If a user has operated one of the switches and thereby a determination result at step 3407 is YES, a series of processings are terminated.

Figures 59, 60:
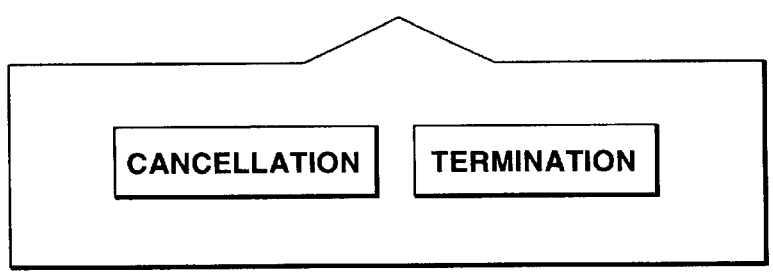
FIG. 59 is a representation showing an example of display at the time of new address input processing.
FIG. 60 is a representation showing an example of a window "D"

At step 3408, on the other hand, an new address input image shown in FIG. 59 is displayed. At step 3409, which follows step 3408, a character cursor is displayed in the name input area in the new address input image. Thereafter, program flow goes to step 3410 of FIG. 35.

The new address input image, as shown in FIG. 59, is provided with the name input area in which a user inputs a name of the other party and the address input area in which the user input a mail address, as areas for character input. Data input in the areas is realized by execution at step 3410 and steps which follows step.

First, at step 3410, it is determined whether or not the upper and lower switches of the cursor switch 202 has been turned on. If a user has operated one of the upper and lower switches, in which a determination result is YES, program flow goes to step 3411. If a user has not operated any of the switches, in which a determination result is NO, program flow goes to step 3412.

At step 3411, an area in which a character cursor is displayed is changed according to the current display position and a kind of switch, which has been operated. After the change is completed, program flow goes to step 3412. The area change is performed by displaying the character cursor in the address input area when the lower switch has been operated, for example, in a condition that a character cursor is displayed in the name input area, and by displaying the character cursor in the name input area when the upper switch has been operated in a condition that a character cursor is displayed in the address input area.

At step 3412, it is determined whether or not data input has been performed in one of the areas. If a user has operated a switch for character input of the keyboard 105, in which a determination result is YES, program flow goes to step 3413. If a user has not operated the switch, in which a determination result is NO, program flow goes to step 3419.

At step 3413, it is determined whether or not an area in which a character cursor is displayed, that is in which data input (character input) is performed, is the name input area. If the area is the name input area, in which a determination result is YES, program flow goes to step 3414. If the area is not the name input area, in which a determination result is NO, program flow goes to step 3416.

At step 3414, there is displayed data (characters) which a user inputs at a position at which a character cursor is displayed in the name input area. At step 3415, which follows step 3414, the data (characters) are input in the address area as data of name of an ADDRESS(m). Thereafter, program flow goes to step 3418. Contents at steps 3416, 3417 which are executed if a determination result at step 3413 is NO are similar to contents at steps 3414, 3415.

At step 3418, which is executed after execution at step 3415 or 3147, a character cursor is moved in correspondence with data (characters) input by a user. By the movement, the character cursor displays a position at which data (characters) are input in next time. After the cursor is displayed, program flow returns to step 3410.

At step 3419, on the other hand, which is executed if a determination result at step 3412 is NO, it is determined whether or not the OK switch 203 has been turned on. If a user has operated the OK switch 203, in which a determination result is YES, program flow goes to step 3420. If a user has not operated the OK switch 203, in which a determination result is NO, program flow returns to step 3410.

At step 3420, a window "D" shown in FIG. 60 in which operation items which can be performed at that point of time are disposed, as icons, is displayed on the new address input image in an overlapping manner. At step 3421, which follows step 3420, there is changed a display state of a "cancellation" icon of the icons disposed in the window "D" as a selected icon. Thereafter, program flow goes to step 3422.

At step 3422, it is determined whether or not the ESC switch 206 has been turned on. If a user has operated the ESC switch 206, in which a determination result is YES, program flow goes to step 3423. If a user has not operated the ESC switch 206, in which a determination result is NO, program flow goes to step 3424 of FIG. 36. At step 3423, the window "D" is erased on the assumption that a user has instructed that there are performed no operations to be selected by the icons in the window "D". Thereafter, program flow goes to step 3410.

Figure 36:
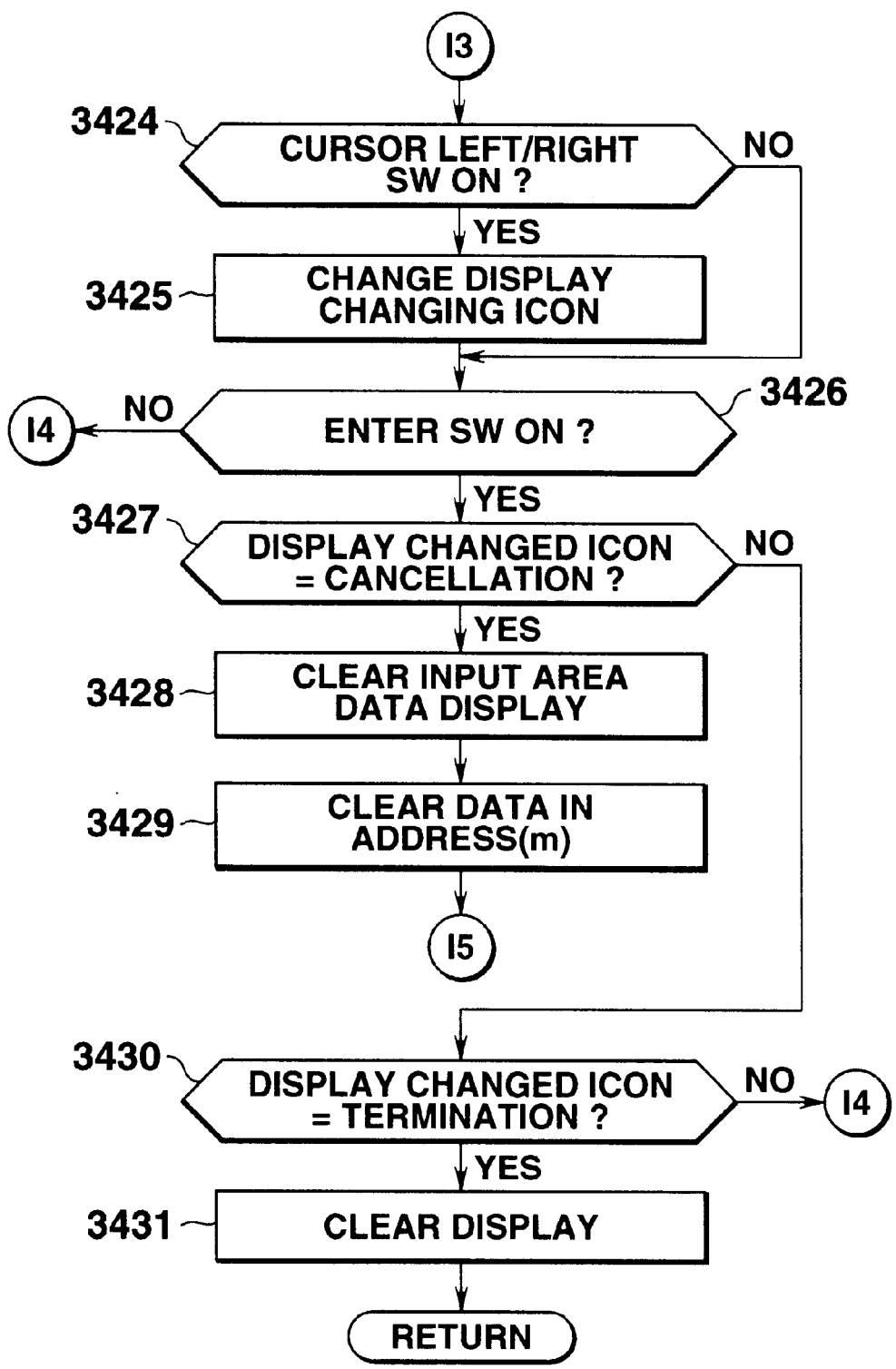
FIG. 36 is a flowchart for operation of new input processing (continuation 2)

At step 3424 of FIG. 36 on the other hand, it is determined whether or not one of the left and right switches of the cursor switch 202 has been turned on. If a user has operated one of the left and right switches, in which a determination result is YES, program flow goes to step 3425. If a user has not operated any of the switches, in which a determination result is NO, program flow goes to step 3426.

At step 3425, a display of the selected icon is changed according to operation on the left or right switch of the cursor switch 202 by a user. After the change is completed, program flow goes to step 3426.

At step 3426, it is determined whether or not the enter switch 204 has been turned on. If a user has operated the enter switch 204, in which a determination result is YES, program flow goes to step 3427. If a user has not operated the enter switch 204, in which a determination result is NO, program flow returns to step 3422 of FIG. 35. For this reason, after the window "D" is displayed, only effective are the ESC switch 206, the enter switch 204 and the cursor switch 202.

At step 3427 through those which follow step, processing is performed according to an icon which has been a selected icon when a user operates the enter switch 204.

First, at step 3427, it is determined whether or not the selected icon is the "cancellation" icon. If a user has operated the enter switch 204 in a condition that a display state of the "cancellation" icon is different form others, in which a determination result is YES, program flow goes to step 3428. If a user has not operated the enter switch 204, in which a determination result is NO, program flow goes to step 3430.

At step 3428, all data (characters) displayed in the name input area and the address input area in the new address input image are cleared. At step 3429, which follows step 3428, data which is already stored in the address area as ADDRESS(m) is cleared in response to clearing of the display. Thereafter, program flow returns to step 3423 of FIG. 35.

At step 3430 on the other hand, it is determined whether or not a selected icon is the "termination" icon. If a user has operated the enter switch 204 in a condition that a display state of the icon is different from others, in which a determination result is YES, program flow goes to step 3431 and at step, after a display on the screen 201 is cleared, a series of processings are terminated. If a user has not operated the enter switch 204, in which a determination result is NO, program flow returns to step 3422 of FIG. 35.

Figure 37:
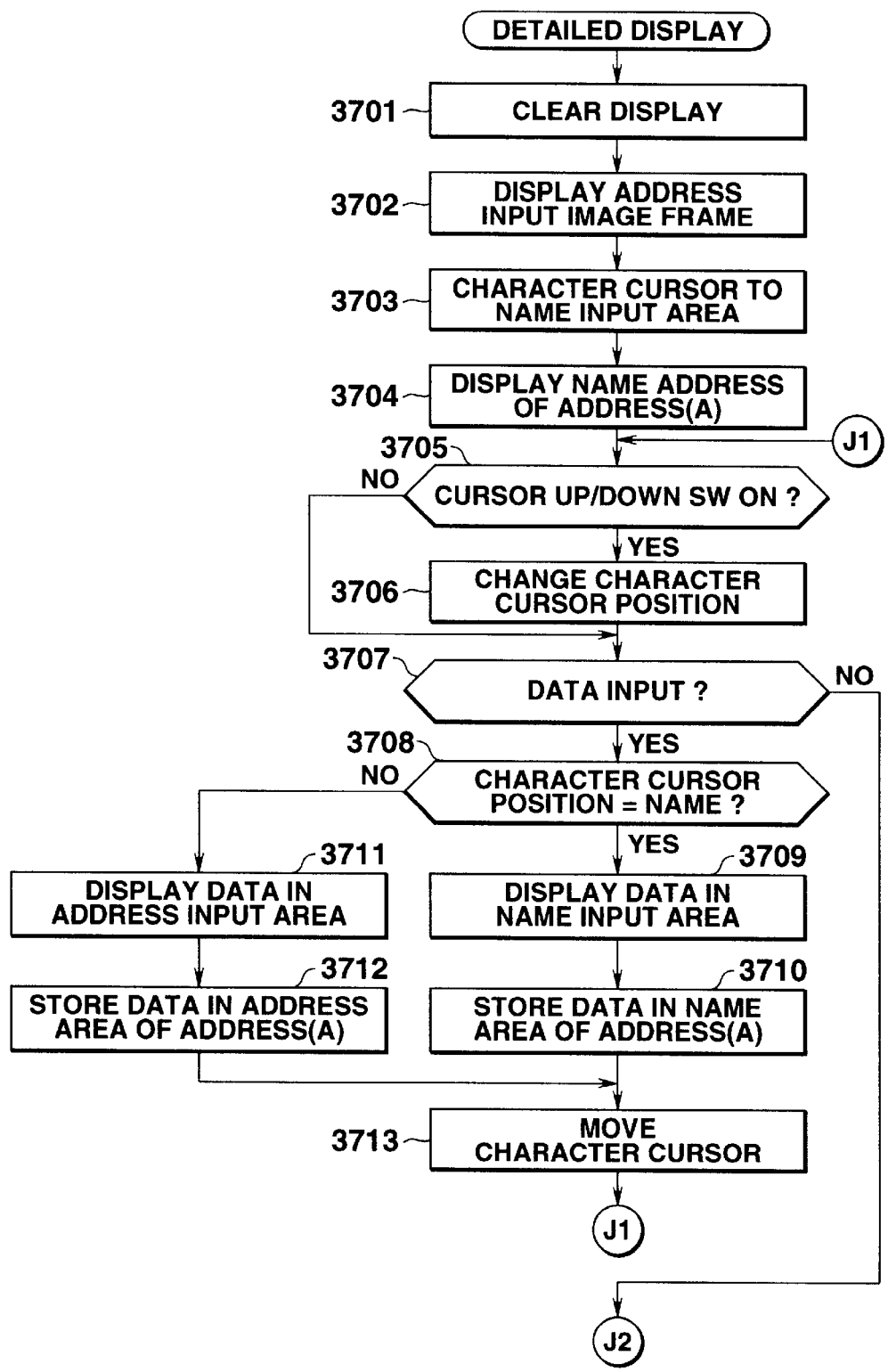
FIG. 37 is a flowchart for operation of detailed display processing.
Figure 38:
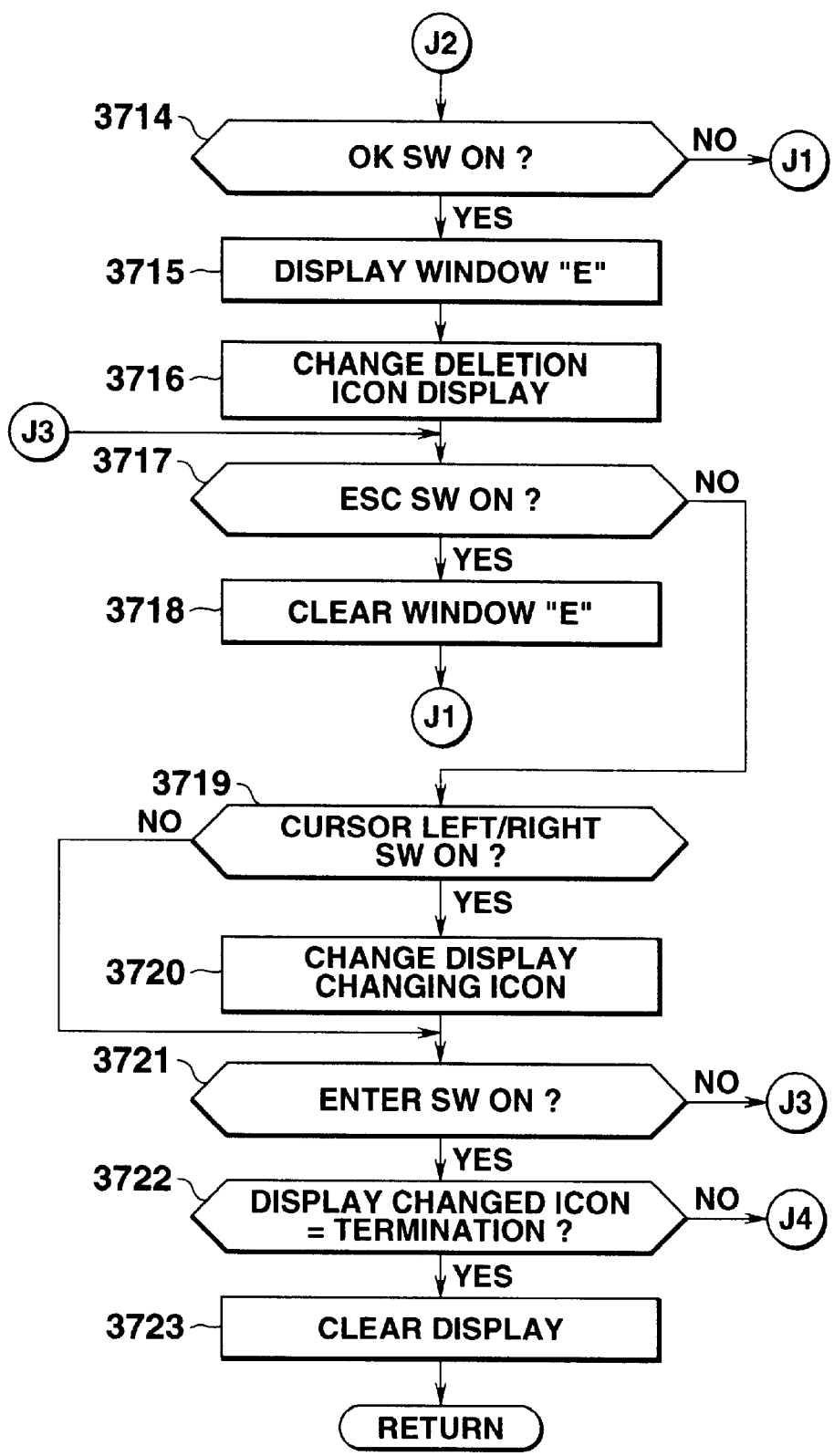
FIG. 38 is a flowchart for operation of detailed display processing (continuation 1)
Figure 39:
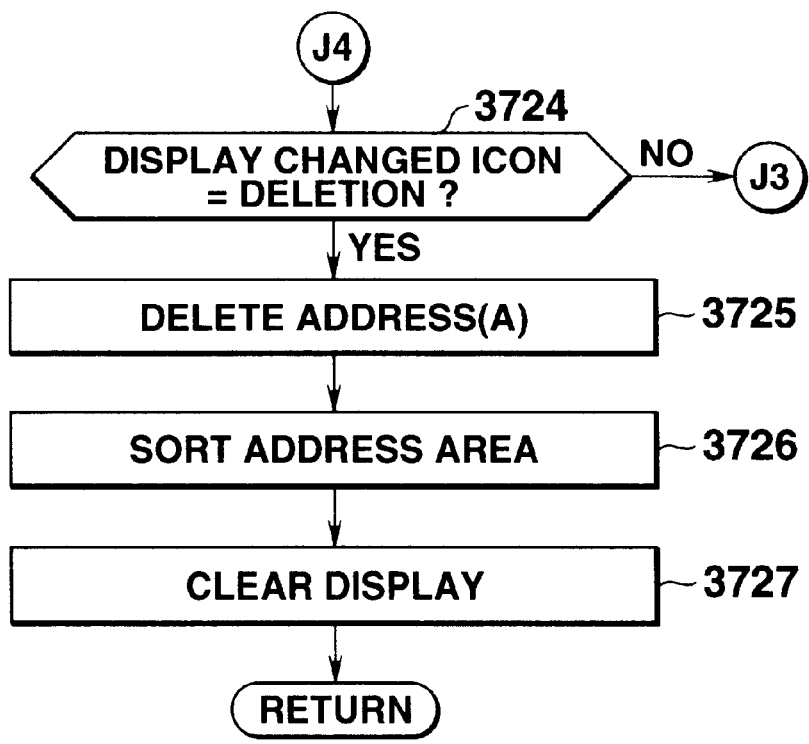
FIG. 39 is a flowchart for operation of detailed display processing (continuation 2)

FIGS. 37 to 39 are a flowchart for operation of detailed display processing executed as step 3024 in the address list display processing. The processing will be detailed with reference to FIGS. 37 to 39.

The detailed display processing is processing in which a user can perform edit of address data stored in the address area. In the detailed display processing, a value of the pointer "A" is given from the address list display processing as an argument. The argument is here referred to as argument "A".

First, at step 3701, a display on the screen 201 is cleared. At step 3702, which follows step 3701, a screen frame of the new address input image shown FIG. 59 is displayed on the screen 201. Thereafter, at step 3703, a character cursor is displayed in the name input area, at step 3704 the name address of ADDRESS(A) corresponding to the argument "A" is read and corresponding data is displayed in the address input area. Thereafter, program flow goes to step 3705. On completion at step 3704, an image as shown in FIG. 61 is displayed as a detailed display image.

There is realized editing operation by a user on a content which is displayed on the detailed display image by execution at step 3705 through the following steps thereof.

First, at step 3705, it is determined whether or not one of the upper and lower switches of the cursor switch 202 has been turned on. If a user has operated one of the upper and right switches, a determination result is YES, program flow goes to step 3706. If a user has not operated any of the switches, in which a determination result is NO, program flow goes to step 3707.

At step 3706, an area in which a character cursor is displayed is changed according to a current display position of the character cursor and a kind of a switch which has been operated. After the change is completed, program flow goes to step 3707. The area change is performed in such a manner that if the lower switch has been operated, for example, in a condition that the character cursor is displayed in the name input area, the character cursor is displayed in the address input area, and if the upper switch ha en operated in a condition that the character cursor is displayed in the address input area, the character cursor is displayed in the name input area.

At step 3707, it is determined whether or not data has been input in one of the areas. If a user has operated a switch for character input of the keyboard 105, in which a determination result is YES, program flow goes to step 3708. If a user has not operated the switch for character input, in which a determination result is NO, program flow goes to step 3714 of FIG. 38.

At step 3708, it is determined whether or not an area in which a character cursor is displayed, that is an area in which data (character) input has been performed, is the name input area. If the area is the name input area, in which a determination result is YES, program flow goes to step 3709. If the area is not the name input area, in which a determination result is NO, program flow goes to step 3711.

At step 3709, data (characters) input by a user are displayed at a position in the name input area at which a character cursor is displayed. At step 3710, which follows step 3709, the data (characters) are stored in the address area as name data of ADDRESS(m). Thereafter, program flow goes to step 3713. Contents at steps 3711 and 3712, which are executed if a determination result at step 3708 is NO, are similar to those at steps 3709 and 3710.

At step 3710, which is executed after step 3712 or step 3713, a character cursor is moved in correspondence with data (characters) input by a user. By the movement, the character cursor indicates a position at which data (characters) are input next time. After movement of the character cursor is completed, program flow goes to step 3705.

At step 3714, on the other hand, which is executed if a determination result at step 3707 is NO, it is determined whether or not the OK switch 203 has been turned on. If a user has operated the OK switch 203, in which a determination result is YES, program flow goes to step 3715. If a user has not operated the OK switch 203, in which a determination result is NO, program flow returns to step 3705 of FIG. 37.

At step 3715, there is displayed the window "E" shown in FIG. 52, in which there are disposed operation items which can be performed at that point of time as icons, on the detailed display image in an overlapping manner. At step 3716, which follows step 3715, a display state of the "deletion" icon in the icons disposed in the window "E" is changed, as a selected icon. Thereafter, program flow goes to step 3717.

At step 3717, it is determined whether or not the ESC switch 206 has been turned on. If a user has operated the ESC switch 206, in which a determination result is NO, program flow goes to step 3718. If a user has not operated the ESC switch 206, a determination result is NO, program flow goes to step 3719. At step 3718, the window "E" is erased on the assumption that a user has instructed that there are performed no operations, which can be selected by the icons in the window "E." Thereafter, program flow goes to step 3705 of FIG. 37.

At step 3719, on the other hand, it is determined whether or not one of the left and right switches of the cursor switch 202 has been turned on. If a user has operated one of the left and right switches, in which a determination result is YES, program flow goes to step 3720. If a user has not operated any of the switches, in which a determination result is NO, program flow goes to step 3721.

At step 3720, there is performed a change of a selected icon according to operation on the left or right switch of the cursor switch 202 by a user. After the change is completed, program flow goes to step 3721.

At step 3721, it is determined whether or not the enter switch 204 has been turned on. If a user has operated the enter switch 204, in which a determination result is YES, program flow goes to step 3722. If a user has not operated the enter switch 204, in which a determination result is NO, program flow returns to step 3717. For such a reason, after display of the window "E", only effective are the ESC switch 206, the enter switch 204 and the cursor switch 202.

At step 3722 and those which follows step, operation is performed according to an icon which has been a selected icon if a user operates the enter switch 204.

First, at step 3722, it is determined whether or not the selected icon is the "termination" switch. If a user has operated the enter switch 204 in a condition that a display state of the icon is different from others, in which a determination result is YES, program flow goes to step 3723 and at step, after a display on the screen 201 is cleared, a series of processings are terminated. If a user has not operated the enter switch 204, in which a determination result is NO, program flow goes to step 3724 of FIG. 39.

At step 3724, it is determined whether or not the selected icon is the "deletion" icon. If a user has operated the enter switch 204 in a condition that a display state of the "deletion" icon is different from others, in which a determination result is YES, program flow goes to step 3725. If a user has not operated the enter switch 204, in which a determination result is NO, program flow returns to step 3717 of FIG. 38.

At step 3725, ADDRESS(A) which is now an object for operation is deleted from the address area. At step 3726, which follows step 3725, the address data in the address area is sorted in response to the deletion. Thereafter, program flow goes to step 3727 and a display on the screen 201 is cleared. Thereafter, a series of processings are terminated.

Figure 40:
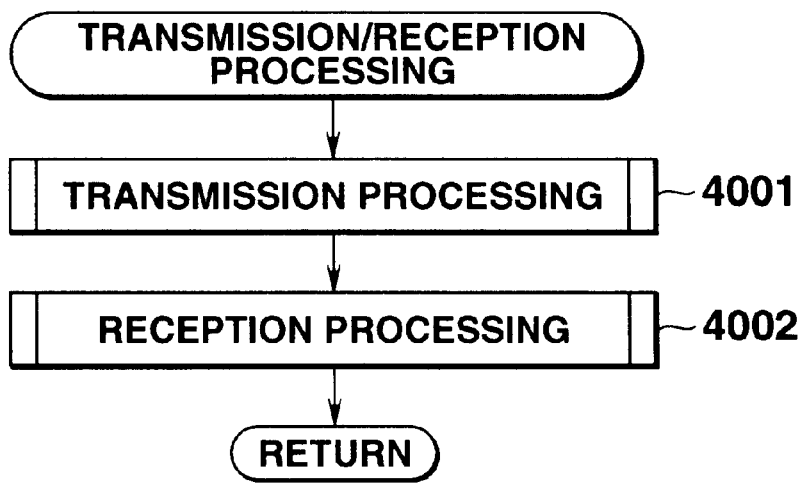
FIG. 40 is a flowchart for operation of transmission/reception processing.

FIG. 40 is a flowchart for operation of transmission/reception processing executed as step 914 (FIG. 10) in the overall processing shown in FIGS. 9 and 10. Then, a content of the processing will be described in a detailed manner with reference to FIG. 40.

In the transmission/reception processing, as shown in FIG. 40, at first the transmission processing at step 4001 is executed, thereafter the reception processing at step 4002 is executed, whereby a series of processings are terminated. For this reason, here, after non-transmitted data MAIL in the transmitted mail area are all transmitted, a newly received mail is stored in the received mail area.

Figure 41:
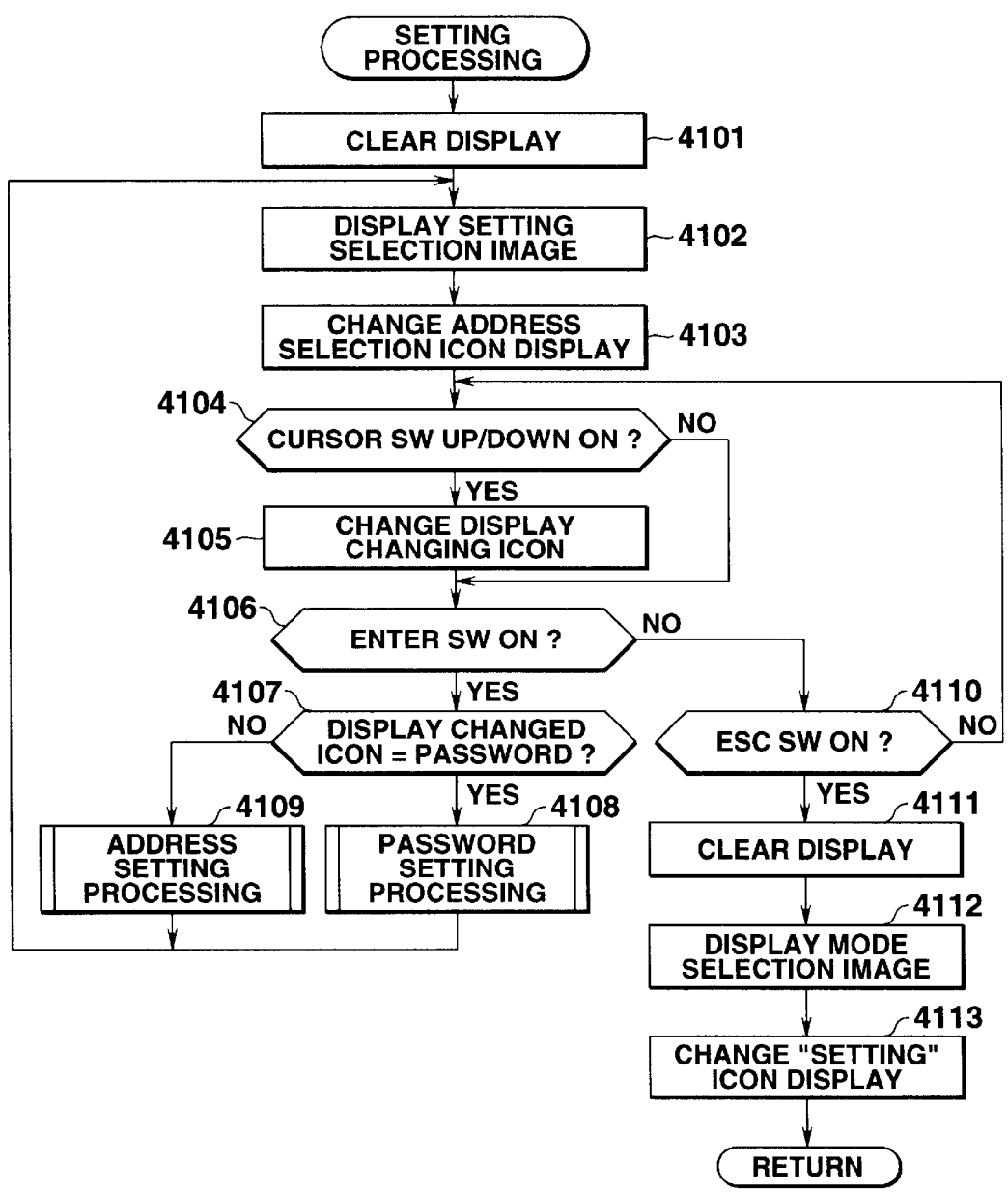
FIG. 41 is a flowchart for operation of setting processing.

FIG. 41 is a flowchart for operation of setting processing to be executed as step 916 (FIG. 10) in the overall processing shown in FIGS. 9 and 10. Then, a content of the processing will be detailed with reference to FIG. 41.

In the embodiment, as a condition in which a received mail is transferred, a user should set a transmitter mail address and a password (keyword). The setting processing is processing which is executed in order to make a user perform those settings.

First, at step 4101, a display on the screen 201 is cleared. At step 4102, which follows step 4101, a setting selection image shown in FIG. 62 is displayed on the screen 201. The setting selection image is an image which is used for a user to select an object for setting, and an "address setting" icon and a "password setting" icon are disposed in the image. After the setting selection image is displayed, program flow goes to step 4103 and a display state of the "address setting" icon is changed as a selected icon.

At step 4104, which follows step 4103, it is determined whether or not one of the upper and lower switches of the cursor switch 202 has been turned on. If a user has operated one of the upper and lower switches, in which a determination result is YES, program flow goes to step 4105. If a user has not operated any of the upper and lower switches, in which a determination result is NO, program flow goes to step 4106.

At step 4105, an icon, as a selected icon, whose display state is made different from others, is changed. At step 4106, which follows step 4105, it is determined whether or not the enter switch 204 has been turned on. If a user has operated the enter switch 204, in which a determination result is YES, program goes to step 4107. If a user has not operated the enter switch 204, in which a determination result is NO, program goes to step 4110.

At step 4107, it is determined whether or not a selected icon when the enter switch 204 is operated is the "password setting" icon. If a user has operated the enter switch 204 in a condition that the icon is presented in a display state of the selected icon, in which a determination result is YES, program flow goes to step 4108 and the password setting processing is executed. If a user has not operated the enter switch 204, in which a determination result is NO, program flow goes to step 4109 and the address setting processing is executed. After the password setting processing at step 4108 or the address setting process at step 4109 is completed, program flow returns to step 4102.

At step 4110, on the other hand, it is determined whether or not the ESC switch 206 has been turned on. If a user has operated the ESC switch 206, in which a determination result is YES, program flow goes to step 4111. If a user has not operated the ESC switch 206, in which a determination result is NO, program flow returns to step 4104.

At step 4111, a display on the screen 201 is cleared. At step 4112, which follows step 4111, the mode selection image shown in FIG. 2 is displayed. Thereafter, program flow goes to step 4113 and a display state of the "setting" icon is changed as a selected icon. A series of processings are terminated.

In such a way, only effective are the cursor switch 202, the enter switch 204 and the ESC switch 206 in a fundamental sense in a condition in which there is displayed the setting selection image shown in FIG. 62. A user selects an object for setting by operating a switch according to necessity.

Below, there will be described in detail subroutine processing executed in the setting processing with reference to a flowchart for operation shown in FIGS. 42 to 48.

Figure 42:
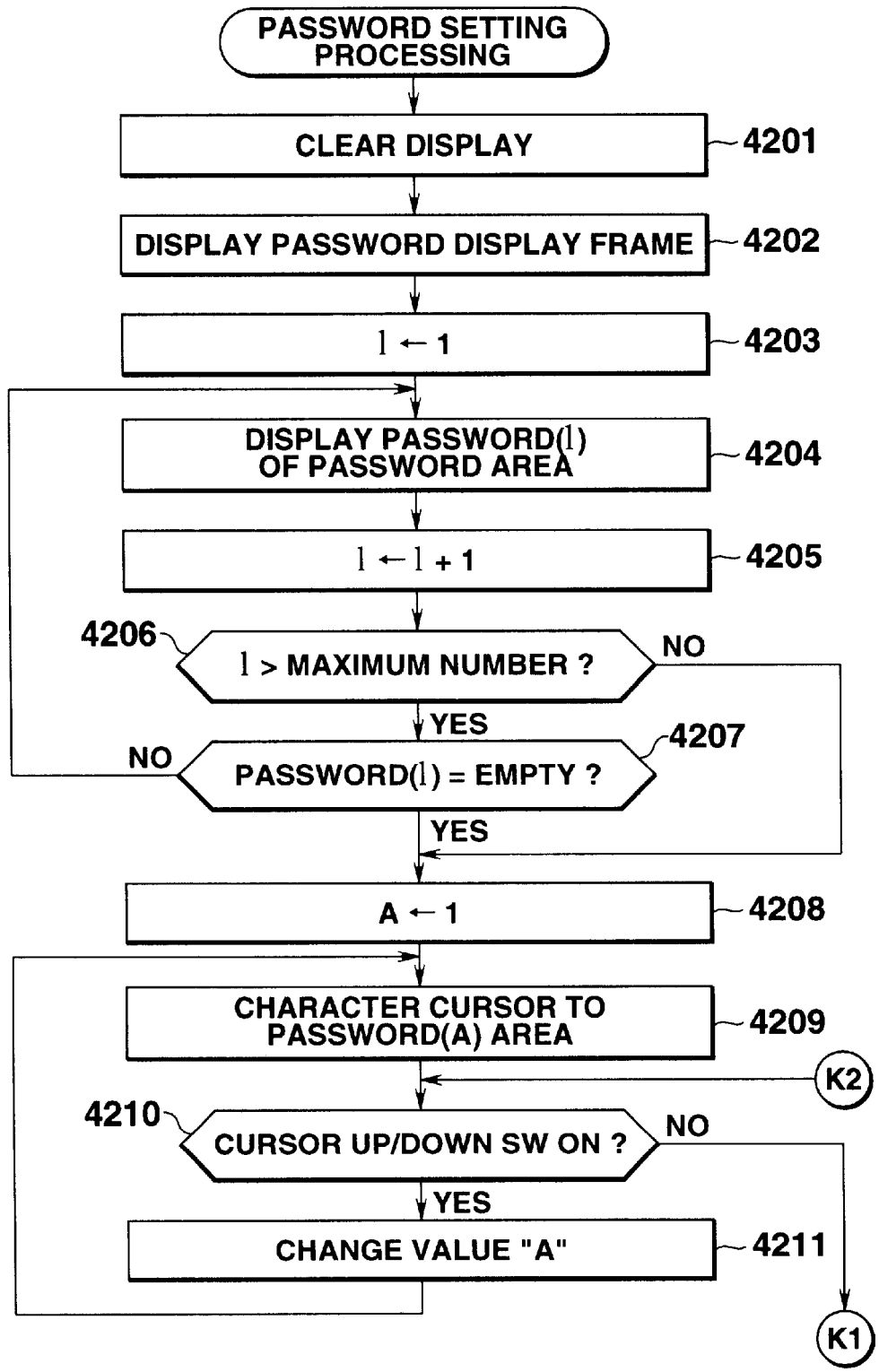
FIG. 42 is a flowchart for operation of password setting processing.
Figure 43:
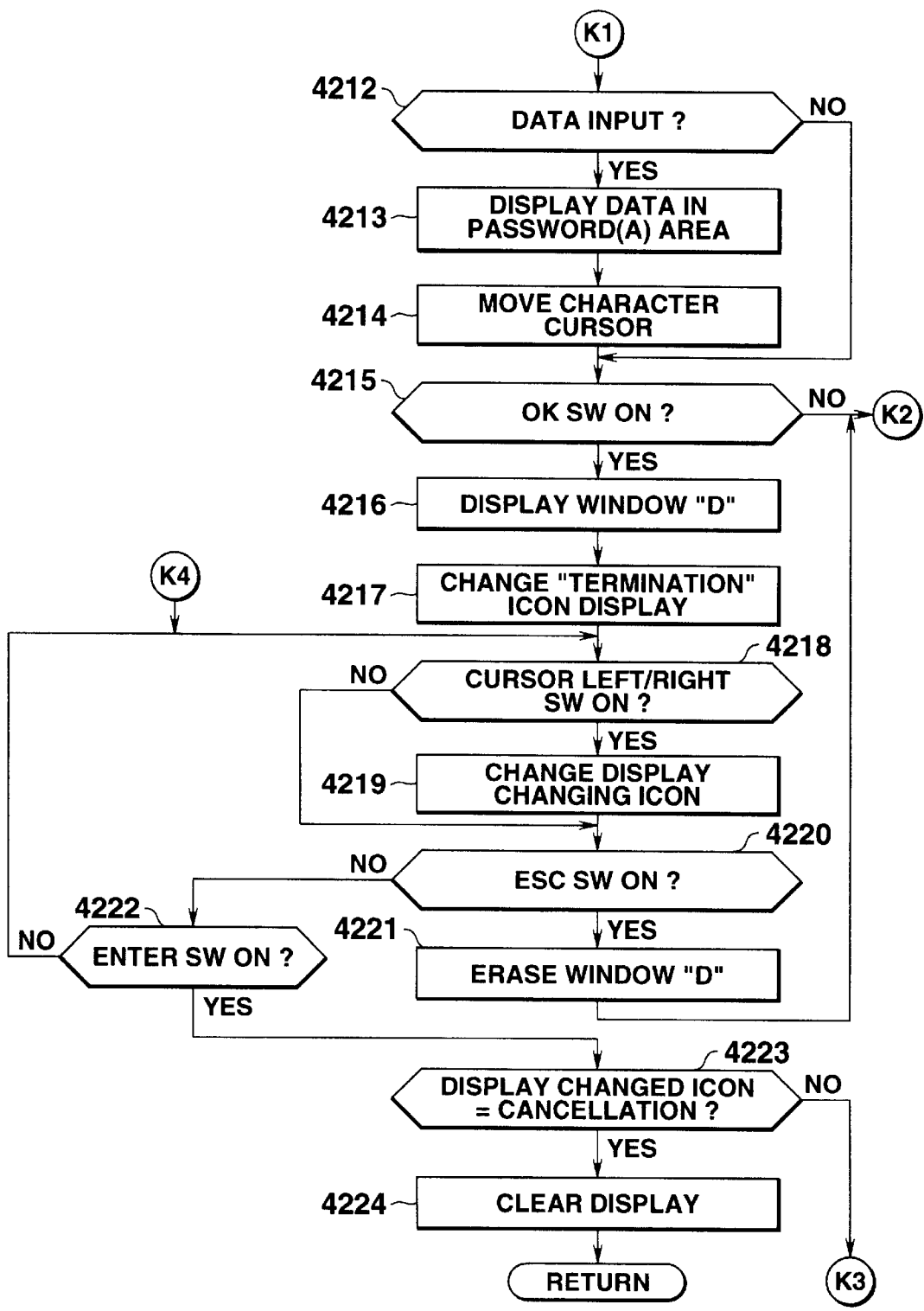
FIG. 43 is a flowchart for operation of password setting processing (continuation 1)
Figure 44:
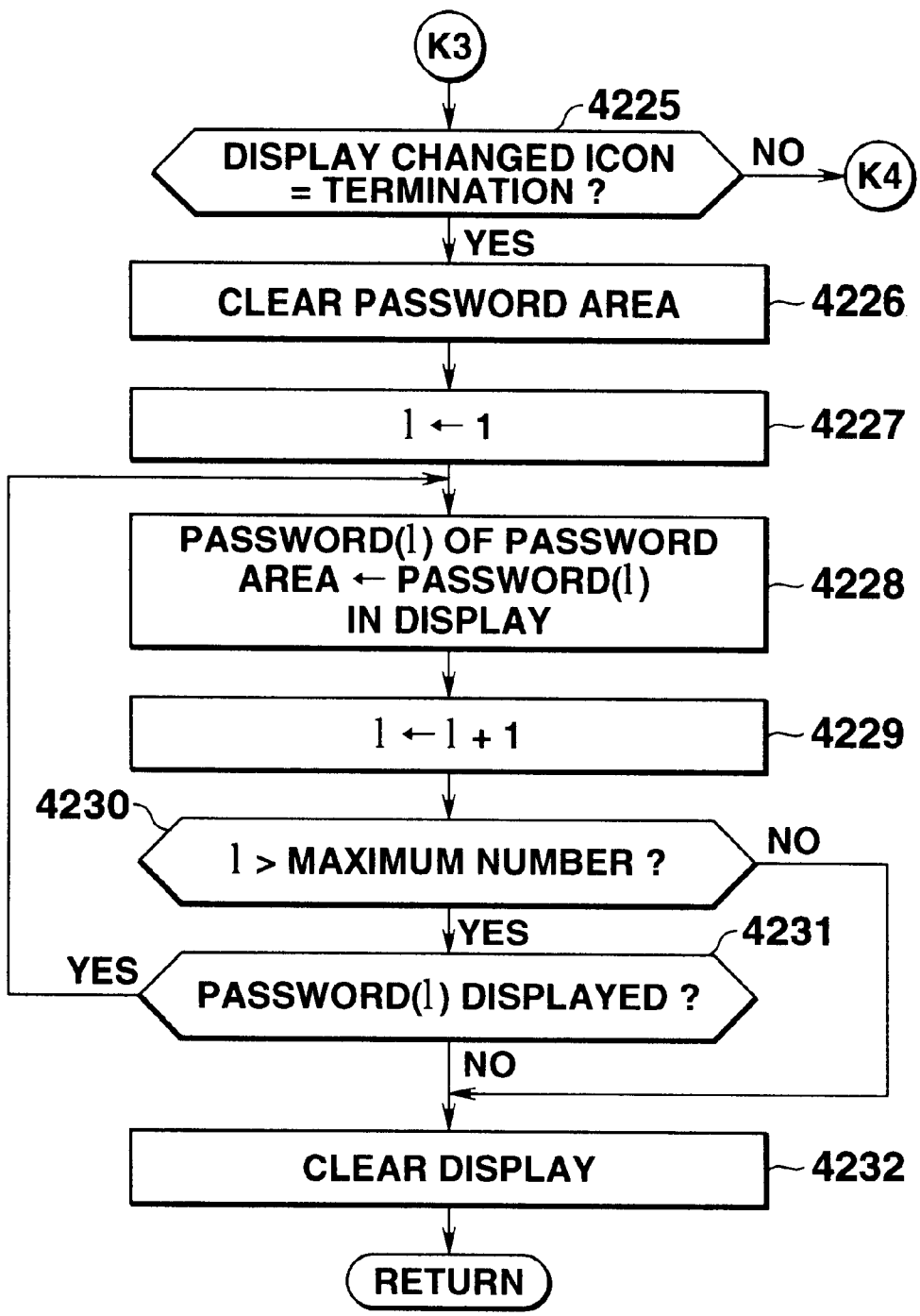
FIG. 44 is a flowchart for operation of password setting processing (continuation 2)
Figure 45:
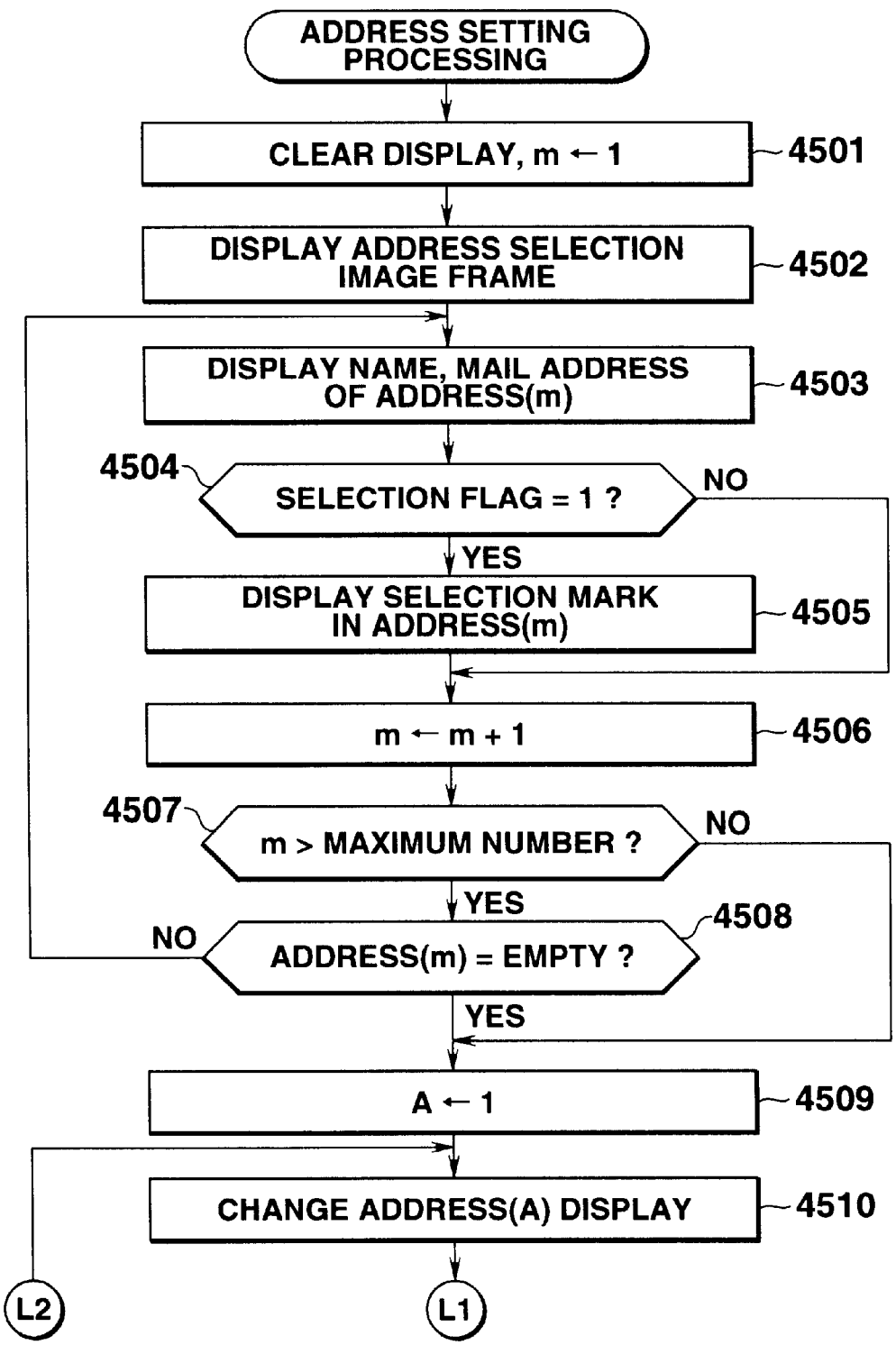
FIG. 45 is a flowchart for operation of address setting processing.
Figure 46:
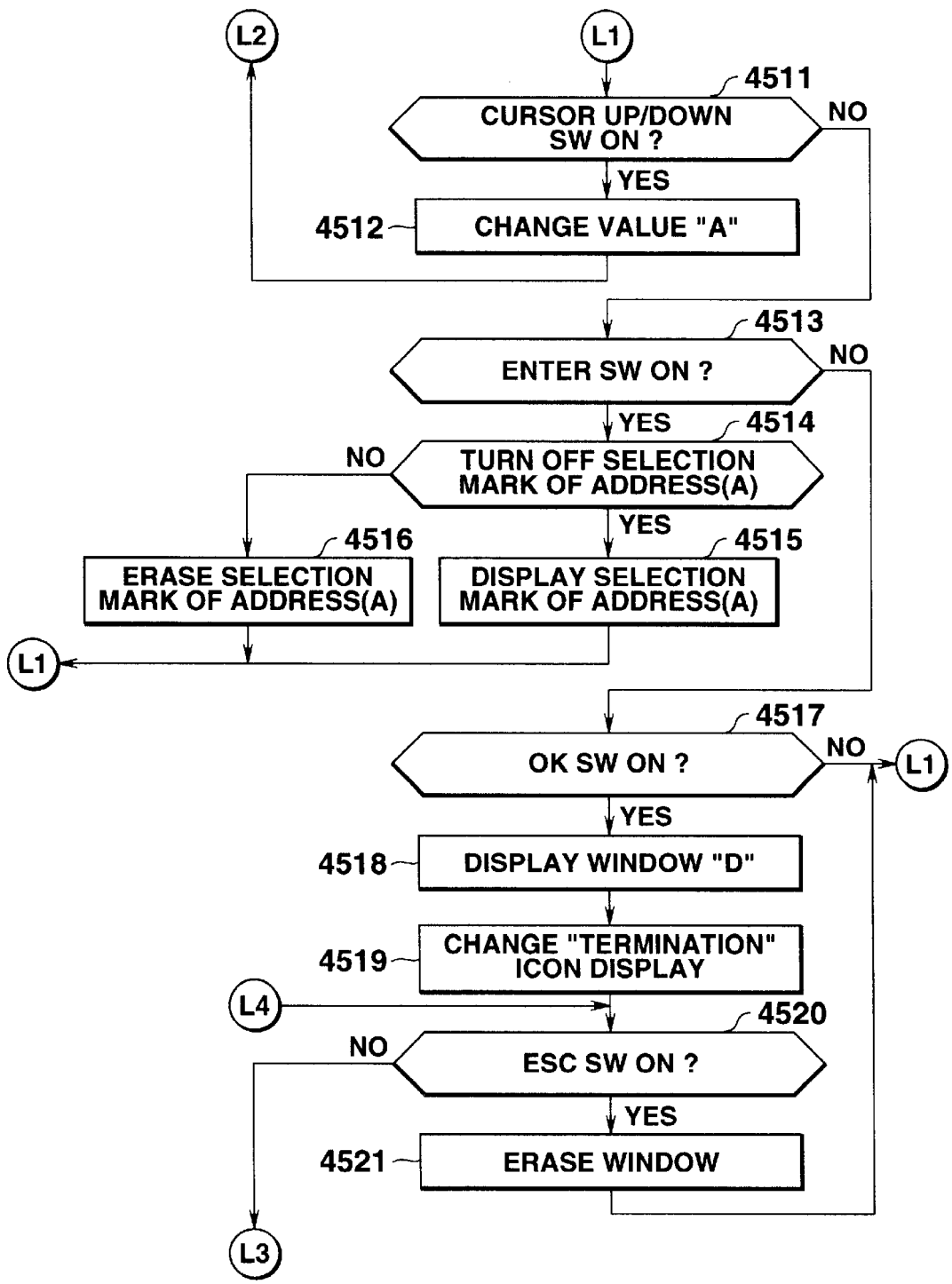
FIG. 46 is a flowchart for operation of address setting processing (continuation 1)

FIGS. 42 to 44 is a flowchart for operation of password setting processing executed as step 4108 in the password setting processing. First of all, there will be detailed the password setting processing with reference to FIGS. 42 to 44.

Figure 63:
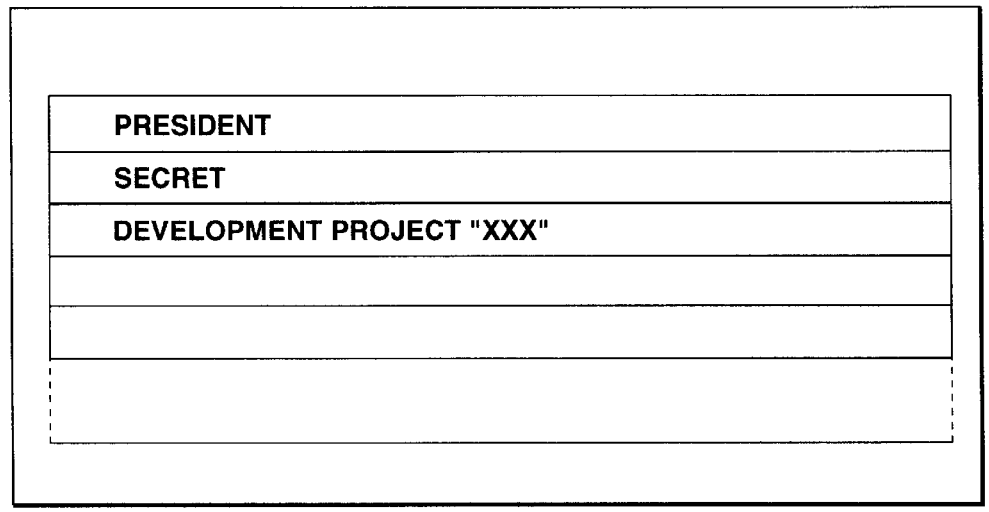
FIG. 63 is a representation showing an example of a password display image.

At first, at step 4201, a display on the screen 201 is cleared. Then, at step 4202, a screen frame of a password display image shown in FIG. 63 is displayed on the screen 201. At step 4203, which follows step 4202, "1" is substituted in the variable "1". Thereafter, program flow goes to step 4204.

In a processing loop formed by steps 4204 to 4207, there is completed display of one screenful of PASSWORD(1) or all PASSWORD(1) of the password area specified by a value of the variable "1" while a value of the variable "1" is incremented. If one screenful of password data is displayed, in which a determination result at step 4206 is NO, program flow goes to step 4208 and if all password data are displayed before display of one screenful of password data is completed, in which a determination result at step 4207 is YES, program flow goes to step 4208. All the area in the screen frame in which a password is displayed or to be displayed is a character-input area.

At step 4208, "1" is substituted in the pointer "A" which is a variable. The pointer "A" is here used for management of an effective password among passwords in display. After "1" is substituted in the pointer "A", program flow goes to step 4209.

At step 4209, a character cursor is displayed in an input area specified by a value of the pointer "A". An area in which the character cursor is displayed is an area in which character (data) input can currently be performed. At step 4210, which follows step 4209, it is determined whether or not one of the upper and right switches of the cursor switch 202 has been turned on. If a user has operated one of the upper and right switches, in which a determination result is YES, program flow goes to step 4211. If a user has not operated any of the switches, in which a determination result is NO, program flow goes to step 4212 of FIG. 43.

At step 4211, a value of the pointer "A" is changed according to a display area in which a character cursor is thus far displayed and a kind of a switch which a user has operated. Thereafter, program flow returns to step 4207.

At step 4212 of FIG. 43, on the other hand, it is determined whether or not data input has been performed. If a user has operated the data input switch among the switches of the keyboard 105, in which a determination result is YES, program flow goes to step 4213. If a user has not operated the data input switch, in which a determination result is NO, program flow goes to step 4215.

At step 4213, there are displayed data input at a position at which a character cursor is currently displayed. After completion of the data display, program flow goes to step 4214 and the character cursor is moved to a position at which data input next time is displayed. Thereafter, program flow goes to step 4215.

At step 4215, it is determined whether or not the OK switch 203 has been turned on. If a user has operated the OK switch 203, in which a determination result is YES, program flow goes to step 4216. If a user has not operated the OK switch, in which a determination result is NO, program flow returns to step 4210.

At step 4216, there is displayed the window "D" shown in FIG. 60 in which there are disposed operation items, as icons, which can be performed at that point of time on the new address input image in an overlapping manner. At step 4217, which follows step 4216, there is changed a display state of the "termination" icon among the icons disposed in the window "D" as a selected icon. Thereafter, program flow goes to step 4218.

At step 4218, it is determined whether or not one of the left and right switches of the cursor switch 202 has been turned on. If a user has operated one of the left and right switches, in which a determination result is YES, program flow goes to step 4219. If a user has not operated any of the switches, in which a determination result is NO, program flow goes to step 4220.

At step 4220, it is determined whether or not the ESC switch 206 has been turned on. If a user has operated the ESC switch 206, in which a determination result is YES, program flow goes to step 4221. If a user has not operated the ESC switch, in which a determination result is NO, program flow goes to step 4222. At step 4221, the window "D" is erased on the assumption that a user has instructed that there are performed no operations, which are selected with an icon in the window "D". Thereafter, program flow returns to step 4210 of FIG. 42.

At step 4222, on the other hand, it is determined whether or not the enter switch 204 has been turned on. If a user has operated the enter switch 204, in which a determination result is YES, program flow goes to step 4223. If a user has not operated the enter switch 204, in which a determination result is NO, program flow returns to step 4218. For this reason, after the window "D" is displayed, only effective are the ESC switch 206, the enter switch 204 and the cursor switch 202.

At step 4223 and those which follows step, operation is performed according to an icon which has been a selected icon if a user operates the enter switch.

First, at step 4223, it is determined whether or not the selected icon is the "cancellation" icon. If a user has operated the enter switch 204 in a condition that a display state of the "cancellation" icon is different form others, in which a determination result is YES, program flow goes to step 4224. If a user has not operated the enter switch 204, in which a determination result is NO, program flow goes to step 4225 of FIG. 44.

At step 4224, a display on the screen 201 is cleared on the assumption that a user has instructed cancellation of operations which haven been performed on the password display image. Thereafter, a series of processings are terminated. In this case, data (passwords) stored in the password area are remained as they were.

At step 4225 of FIG. 44, on the other hand, it is determined whether or not the selected icon is the "termination" icon. If a user has operated the enter switch 204 in a condition that a display state of the "termination" icon is different form others, in which a determination result is YES, program flow goes to step 4226. If a user has not operated the enter switch 204, in which a determination result is NO, program flow returns to step 4218 of FIG. 43.

At step 4226 and those which follows step, there is performed processing to store a password which is displayed in the password display image in the password area as new data.

First, at step 4226, the interior of the password area is cleared. At step 4227, which follows step 4226, "1" is substituted in the variable "1". The variable "1" is used for sequential storage of passwords displayed on the password display image in the password area.

At step 4228, which follows step 4227, a password displayed in an input area specified by a value of the variable "1" is stored in the password area as PASSWORD(1). At next step 4229, a value of the variable "1" is incremented by one. Thereafter, program flow goes to step 4230.

At step 4230, it is determined whether or not a value of the variable "1" is larger than the maximum number of password data which can be stored in the password area. If there is still available an empty area in the password area, in which a determination result is YES, program flow goes to step 4231. If no empty area is available, in which a determination result is NO, program flow goes to step 4232.

At step 4231, it is determined whether not a password is displayed in an input area specified by a value of the variable "1". If a password is not displayed in the input area, in which a determination result is NO, program flow goes to step 4232. If a password is displayed in the input area, in which a determination result is YES, program flow returns to step 4228.

At step 4232, a display on the screen 201 is cleared on the assumption that there have been stored all passwords displayed in the password display image. Thereafter, a series of processings are terminated.

If a password input as described above is used for determination of whether or not a received mail is transmitted, the transfer is determined according to a content of a mail. Passwords ("president", "secret" and the like) shown in FIG. 63 are set in order that it is avoidable that a mail is read by third party if the mail is read on a portable electronic mail apparatus.

FIGS. 45 to 48 are a flowchart for operation of address setting processing executed as step 4109 (FIG. 41) in the setting processing. Then the address setting processing will be detailed with reference to FIGS. 45 to 48.

In the embodiment, a mail, which is sent from a preset mail address among received mails, is transferred. The address setting processing is processing in which mail address setting is performed by a user.

Figure 64:
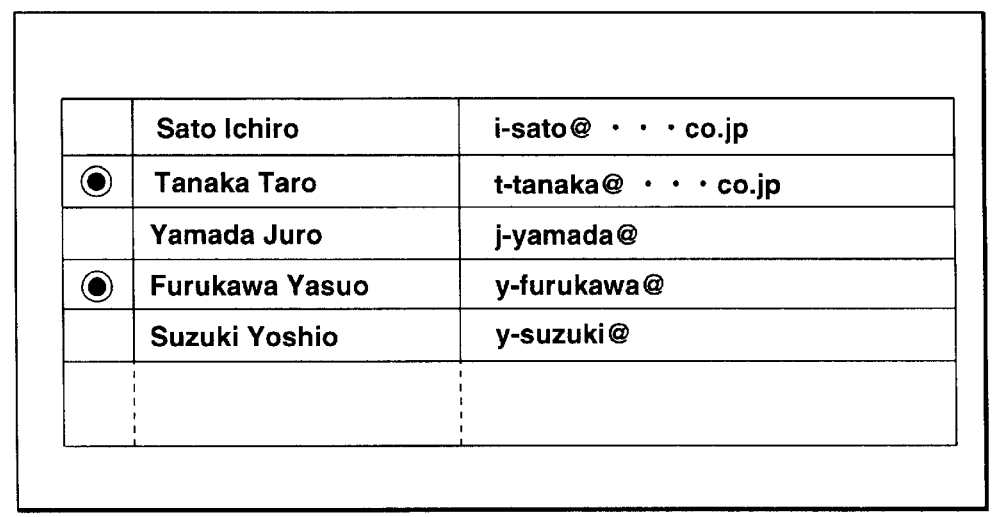
FIG. 64 is a representation showing an example of an address selection image.

At step 4501, display is cleared and "1" is substituted in the variable "m". The variable "m" is used for sequentially displaying address data stored in the address area (see FIG. 6). At step 4502, which follows step 4501, a screen frame of an address selection image shown in FIG. 64 is displayed on the screen 201. After a screen frame of the address selection image is displayed, program flow goes to step 4503.

In the address selection image, as shown in FIG. 64, a display area is provided for each address data stored in the address area. In each display area, there are displayed a content of a corresponding address data and a selection mark which indicates whether or not the mail address is set (selected) as a transmitter mail address for transfer. The selection mark is a double circle shown in FIG. 64.

In a processing loop from steps 4503 to 4508, there is performed processing of displaying one screenful of address data or all address data currently stored in the address area in the display areas of the address selection image.

First, at step 4503, ADDRESS(m) corresponding a value of the variable "m" is read from the address area and name and a mail address is displayed in a display area specified by a value of the variable "m". At step 4504, which follows step 4503, it is determined whether or not a value of a selection flag in the ADDRESS(m) is "1". If a user sets (selects) a mail address of the ADDRESS(m) as a transmitter mail address for transfer, in which a determination result is YES, program flow goes to step 4505. If a user does not set a mail address of the ADDRESS(m) as a transmitter mail address for transfer, in which a determination result is NO, program flow goes to step 4506. At step 4505, a selection mark, which indicates that the mail address is selected, is displayed at a display position specified by a value of the variable "m". Thereafter, program flow goes to step 4506.

At step 4506, the variable "m" is incremented by one. At step 4507, which follows step 4506, it is determined whether or not a value of the variable "m" is larger than the maximum number of mail addresses which can be displayed in one screenful of the address selection image. If no empty area, in which a mail address is to be displayed, is left behind in the address selection image displayed on the screen 201, in which a determination result is NO, program flow goes to step 4509. If an empty area is left behind, in which a determination result is YES, program flow goes to step 4508.

At step 4508, it is determined whether or not ADDRESS (m) corresponding to a value of the variable "m" are stored in the address area. If the data are stored in the address area, in which a determination result is NO, program flow returns to step 4503. If the data are not stored in the address area, in which a determination result is YES, program flow goes to step 4509.

At step 4509, "1" is substituted in the pointer "A" (variable) for use in management of address data on which selecting operation is effective. At step 4510, which follows step 4509, and steps thereafter, there is performed processing in which a user's operation is realized.

At step 4510, a display state of a display area corresponding to a value of the pointer "A" is changed as an effective area for selecting operation. At step 4511 of FIG. 46, it is determined whether or not one of the upper and lower switches of the cursor switch 202 has been turned on. If a user has operated one of the upper and right switches, in which a determination result is YES, program flow goes to step 4512. If a user has not operated any of the switches, in which a determination result is NO, program flow goes to step 4513.

At step 4512, a value of the pointer "A" is changed according to a position of a display area whose display state is thus far been different from others and a kind of a switch which a user has operated. Thereafter, program flow returns to step 4510 of FIG. 45.

At step 4513, on the other hand, it is determined whether or not the enter switch 204 has been turned on. If a user has operated the enter switch 204, in which a determination result is YES, program flow goes to step 4514. If a user has not operated the enter switch 204, in which a determination result is NO, program flow goes to step 4517.

At step 4514, it is determined whether or not a selection mark is indicated in a display area specified by a value of the pointer "A". If a selection mark is not displayed in the display area, in which a determination result is YES, program flow goes to step 4515. If a selection mark is displayed there, in which a determination result is NO, program flow goes to step 4516.

At step 4515, a selection mark is displayed in a display area specified by a value of the pointer "A". At step 4516, on the other hand, a selection mark which has been displayed in the display area is erased. After processing at step 4515, or 4516 is completed, program flow returns to step 4511.

At step 4517, on the other hand, it is determined whether or not the OK switch 203 has been turned on. If a user has operated the OK switch 203, in which a determination result is YES, program flow goes to step 4518. If a user has not operated the OK switch 203, in which a determination result is NO, program flow returns to step 4511. As seen from the above description, there is performed selection (setting) of a transmitter mail address for transfer by a user through operation on the upper and lower switches of the cursor switch 202 and the enter switch 204.

At step 4518, the window "D" shown in FIG. 60 is displayed, on which there are disposed operation items, as icons, which can be performed at that point of time, on the address selection image in an overlapping manner. At step 4519, which follows step 4518, a display state of the "termination" icon, as a selected icon, among the icons disposed in the window "D" is changed. Thereafter, program flow goes to step 4520.

At step 4520, it is determined whether or not the ESC switch 206 has been turned on. If a user has operated the ESC switch 206, in which a determination result is YES, program flow goes to step 4521. If a user has not operated the ESC switch, in which a determination result is NO, program flow goes to step 4522 of FIG. 47. At step 4521, the window "D" is erased on the assumption that a user has instructed that there are performed no operations selected by icons in the window "D". Thereafter, program flow returns to step 4511.

Figure 47:
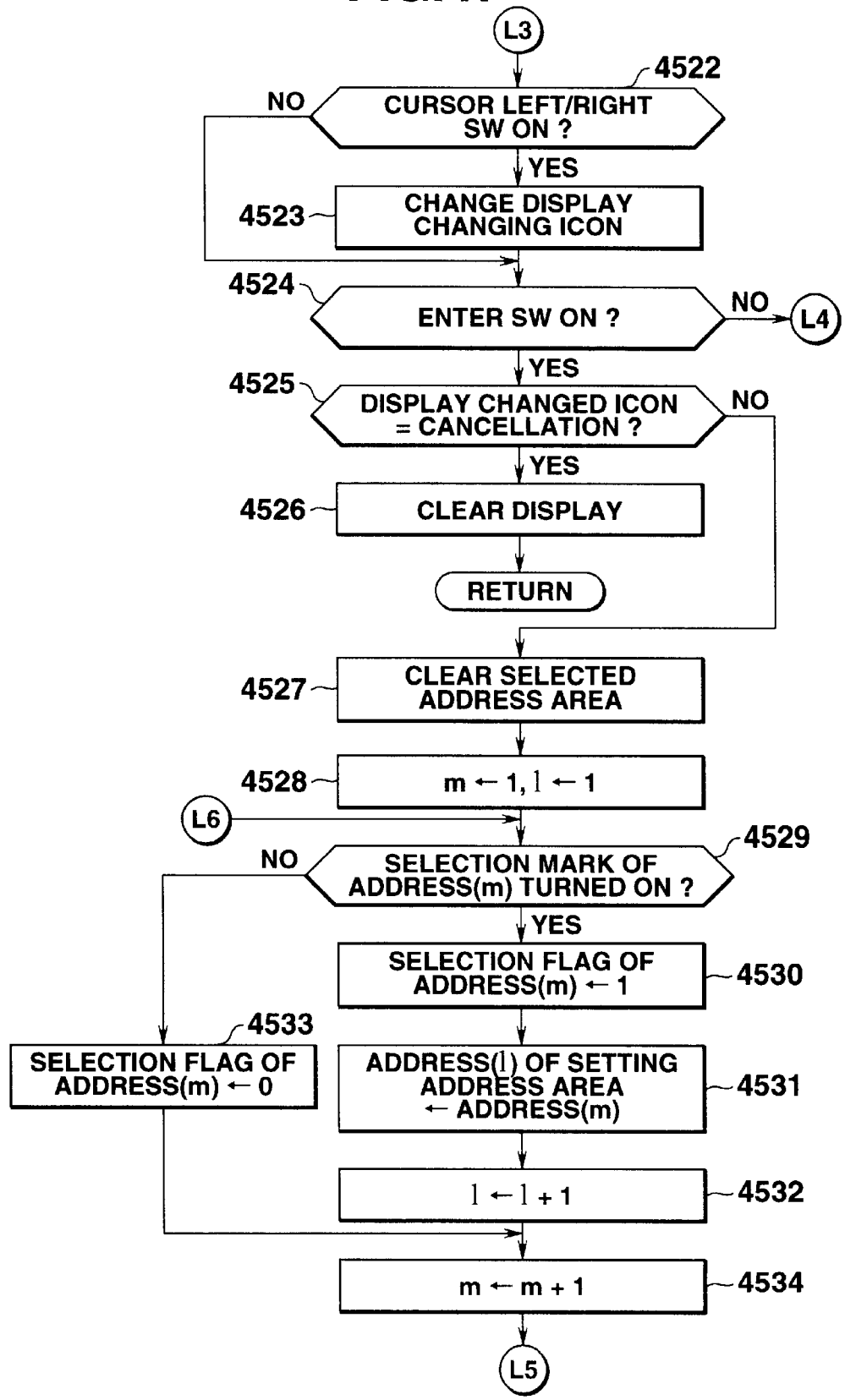
FIG. 47 is a flowchart for operation of address setting processing (continuation 2)

At step 4522 of FIG. 47, on the other hand, it is determined whether or not one of the left and right switches has been turned on. If a user has operated one of the left and right switches, in which a determination result is YES, program flow goes to step 4523. If a user has not operated any of the upper and right switches, in which a determination result is NO, program flow goes to step 4524. At step 4523, a selected icon is changed according to a display position of an icon which is used as a selected icon and a kind of an icon on which a user has operated. Thereafter, program flow goes to step 4524.

At step 4524, it is determined whether or not the enter switch 204 ha been turned on. If a user has operated the enter switch 204, a determination result is YES, program flow goes to step 4525. If a user has not operated the enter switch 204, in which a determination result is NO, program flow returns to step 4520 of FIG. 46. From the above description, after the window "D" is displayed, only effective are the ESC switch 206, the enter switch 204 and the cursor switch 202.

At step 4525 through those which follows step, processing is performed according to an icon which is a selected icon if a user operates the enter switch 204.

First, at step 4525, it is determined whether or not the selected icon is the "cancellation" icon. If a user has operated the enter switch 204 in a condition that a display state of the "cancellation" icon is different from others, in which a determination result is YES, program flow goes to step 4526. If a user has not operated the enter switch 204, in which a determination result is NO, program flow goes to step 4527.

At step 4526, a display on the screen 201 is cleared on the assumption that a user has instructed that effective are no selecting operations which have been performed on the address selection image. Thereafter, a series of processings are terminated. In this case, data (address) stored in the address area are remained unchanged.

In the window "D", as shown in FIG. 60, only two icons: the "cancellation" icon and the "termination" icon are disposed. For this reason, at step 4527 through those which follow step, there is performed processing corresponding to judgment that a user has operated the enter switch 204 in a condition that the "termination" icon is a selected icon.

First, at step 4527, the selected address area shown in FIG. 7 is cleared. At step 4528, which follows step 4527, 1s are respectively substituted in the variables m and 1. The variable "m" is used for storage of a content, in the address area, which is displayed in the address selection image as individual address data as a unit, while the variable "1" is used for storage of only address data on which a selection mark is indicated in the selected address area. After 1s are respectively substituted in the variables m and 1, program flow goes to step 4529.

At step 4529, it is determined whether or not a selection mark is displayed in a display area on the address selection image specified by a value of the variable "m". If a selection mark is displayed in the display area, in which a determination result is YES, program flow goes to step 4530. If a selection mark is not displayed in the display area, in which a determination area is NO, program flow goes to step 4533.

At step 4530, "1" is substituted in a value of the selection flag of ADDRESS(m) stored in the address area corresponding to a value of the variable "m". At step 4531, which follows step 4530, name and a mail address of the ADDRESS(m) is stored in the set address area as ADDRESS(1) corresponding to a value of the variable "1". Thereafter, at step 4532, a value of the variable "1" is incremented and subsequently, program flow goes to step 4534.

At step 4533, on the other hand, since a selection mark is not displayed in a display area of the address selection image corresponding to a value of the variable "m", "0" is substituted in a value of the selection flag of ADDRESS(m) stored in the address area corresponding to a value of the variable "m".

Thereafter, program flow goes to step 4534.

At step 4534, a value of the variable "m" is incremented by one. Thereafter, program flow goes to step 4535 of FIG. 48 and it is determined whether or not a value of the variable "m" is larger than the maximum number of address data which can be stored in the address area. If there is available an empty area to store address data in the address area, in which a determination result is YES, program flow goes to step 4536. If there is available no empty area to store address area in the address area, in which a determination result is NO, program flow goes to step 4537.

At step 4536, it is determined whether or not ADDRESS (m) corresponding to a value of the variable "m" is empty. If the ADDRESS(m) is not empty, in which a determination result is result in NO, program flow returns to step 4529 of FIG. 47. If the ADDRESS(m) corresponding to a value of the variable "m" is empty, in which a determination result is YES, program flow goes to step 4537. At step 4537, a display on the screen 201 is cleared on the assumption that there have been completed change of a content stored in the address area and storage of data in the selected address area. Thereafter, a series of processings are terminated.

A user can, in an arbitrary manner, set a transmitter mail address for transfer and thereby, for example, a mail, which is transmitted from a friend only in a private relation to a mail address which is adopted for business use, can automatically be transferred to another mail address which is adopted for private use. From such a reason, a user can manage to read only a mail which is suitable for a current situation on his or her portable electronic mail apparatus.

While in the embodiment, the number of mails which can be stored in the received mail area is set in advance and it is determined whether or not an empty area is available based on the number of mails already stored in the received mail area, a determination may be effected on whether or not a received mail can be stored or, in other words, whether or not a received mail should be transferred, based on an actual free capacity, since it is conceivable that a data volume of each mail is fluctuated. In those cases, not only it is determined whether or not a received mail should be transferred, but also there may be selected data to be stored in the received mail area, among received mails. The selection may be performed such that as an actual free capacity is decreased, a data volume is smaller.

While in the embodiment, there are only partly stored a mail which is sent from the mail address stored in the set address area and a mail with a password stored in the password area, all the mails may be stored if there is available an empty area in the received mail area. In that case, the stored mails can be transferred for the purpose to back-up the mails, or the like purpose.

While in the embodiment, a transfer address of a received mail is limited to only one address, the number of transfer addresses is not necessarily limited to one. For example, there is set at least one of a mail address and a password for each transfer address and a received mail may be transferred to a plurality of transfer addresses. As described above, there can be various modifications to be achieved.

While the embodiment is the case in which the present invention is applied to a portable electronic mail apparatus (portable information terminal), it should be noted that application of the present invention is not limited to that. For example, the present invention can also be applied to a personal computer (specifically a notebook type). The application of the present invention to a personal computer is basically achieved by loading a program to realize the operation of the above described CPU 101. The program may be distributed in the form of a storage media, on which the program is stored, such as a floppy disk and CD-ROM, or directly distributed through some communication means.

Industrial Applicability

The present invention can provide an electronic mail apparatus, which has improved operability and degree of convenience.

What is claimed is:

1. A portable electronic mail apparatus comprising:

receiving means for receiving an electronic mail;

a storage device capable of storing an electronic mail received by the receiving means;

specific mail determining means for determining whether or not an electronic mail received by the receiving means is a specific mail by determining whether or not a data volume of the received mail is equal to or larger than a predetermined data volume;

a transmitter capable of transmitting an electronic mail received by the receiving means; and control means for controlling the storage device to store an electronic mail which has been determined as a non-specific mail by the specific mail determining means, and for controlling the transmitter to transmit an electronic mail which has been determined as the specific mail by the specific mail determining means to a predetermined destination without storing the specific electronic mail.

2. A portable electronic mail apparatus comprising:

receiving means for receiving an electronic mail;

a storage device capable of storing an electronic mail received by the receiving means;

specific mail determining means for determining whether or not an electronic mail received by the receiving means is a specific mail which meets a specific condition;

a transmitter capable of transmitting an electronic mail received by the receiving means; and control means for controlling the storage device to store part of an electronic mail which has been determined as the specific mail by the specific mail determining means, for controlling the transmitter to transmit the specific electronic mail to a predetermined destination, and for controlling the storage device to store an electronic mail which has been determined as a non-specific mail by the specific mail determining means.

3. The portable electronic mail apparatus according to claim 2, wherein the specific mail determining means determines whether or not an electronic mail received by the receiving means is the specific mail by determining whether or not a transmitter of the electronic mail coincides with another predetermined destination.

4. The portable electronic mail apparatus according to claim 2, wherein the specific mail determining means determines whether or not an electronic mail received by the receiving means is the specific mail by determining whether or not a predetermined word is included in the electronic mail.

5. The portable electronic mail apparatus according to claim 2, wherein the specific mail determining means determines an electronic mail received by the receiving means as the specific mail if a data volume of the electronic mail is equal to or larger than a predetermined data volume.

6. The portable electronic mail apparatus according to claim 2, wherein the specific mail determining means determines whether or not an electronic mail received by the receiving means is the specific mail based on an empty capacity of the storage device when the electronic mail is received by the receiving means.

7. The portable electronic mail apparatus according to claim 2, wherein the control means controls the storage device to store data other than a text of an electronic mail detected by the specific mail determining means as the specific mail.

8. A computer-readable program comprising:

reception processing program code for receiving an electronic mail;

storage processing program code for enabling a received electronic mail to be stored in a memory;

determination processing program code for determining whether or not a received electronic mail is a specific mail by determining whether or not a data volume of the received mail is equal to or larger than a predetermined data volume;

transmission processing program code for enabling transmission of a received electronic mail; and control processing program code for controlling an electronic mail which has been determined as a non-specific mail to be stored in the memory, and for controlling an electronic mail which has been determined as the specific mail to be transmitted to a predetermined destination without being stored.

9. A computer-readable program comprising:

reception processing program code for receiving an electronic mail;

storage processing program code for enabling a received electronic mail to be stored in a memory;

determination processing program code for determining whether or not a received electronic mail is a specific mail which meets a specific condition;

transmission processing program code for enabling transmission of a received electronic mail; and control processing program code for controlling part of an electronic mail which has been determined as the specific mail to be stored in the memory, for controlling the specific electronic mail to be transmitted to a predetermined destination, and for controlling an electronic mail which has been determined as a non-specific mail to be stored in the memory.

* * * * *